(12) United States Patent
Tasaka et al.

(10) Patent No.: US 9,481,830 B2
(45) Date of Patent: Nov. 1, 2016

(54) CHOLESTERIC LIQUID CRYSTAL MIXTURE, FILM, SELECTIVE REFLECTIVE PLATE, LAMINATE, LAMINATED GLASS

(71) Applicant: FUJIFILM CORPORATION, Tokyo (JP)

(72) Inventors: Tomoki Tasaka, Ashigarakami-gun (JP); Yasuhiro Ishiwata, Ashigarakami-gun (JP); Minoru Uemura, Ashigarakami-gun (JP); Takao Taguchi, Ashigarakami-gun (JP); Masao Nakajima, Ashigarakami-gun (JP); Shunya Katoh, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 129 days.

(21) Appl. No.: 14/204,822

(22) Filed: Mar. 11, 2014

(65) Prior Publication Data

US 2014/0192286 A1     Jul. 10, 2014

Related U.S. Application Data

(63) Continuation of application No. PCT/JP2012/072594, filed on Sep. 5, 2012.

(30) Foreign Application Priority Data

Sep. 12, 2011 (JP) .................. 2011-198264
Apr. 3, 2012 (JP) .................. 2012-084520

(51) Int. Cl.
   *C09K 19/42*           (2006.01)
   *C09K 19/56*           (2006.01)
   (Continued)

(52) U.S. Cl.
CPC ......... *C09K 19/56* (2013.01); *B32B 17/10036* (2013.01); *B32B 17/10293* (2013.01);
(Continued)

(58) Field of Classification Search
CPC .. C09K 19/2007; C09K 19/54; C09K 19/56; C09K 2019/0448; C09K 2019/2078; G02B 5/208; B32B 17/10504; B32B 17/10036; G02F 1/1335; G02F 2201/343
See application file for complete search history.

(56) References Cited

U.S. PATENT DOCUMENTS 6,599,443 B1    7/2003   Sharples et al.
6,733,689 B1    5/2004   Meyer et al.
(Continued)

FOREIGN PATENT DOCUMENTS

CN        1132796 C      12/2003
JP        2000-98133 A      4/2000
(Continued)

OTHER PUBLICATIONS

Japanese Office Action, dated Dec. 2, 2014, for corresponding Japanese Application No. 2012-084520, with partial English translation.

(Continued)

*Primary Examiner* — Shean C Wu
(74) *Attorney, Agent, or Firm* — Birch, Stewart, Kolasch & Birch, LLP

(57) ABSTRACT

A cholesteric liquid-crystal mixture containing a compound represented by the general formula (Ia), a compound represented by the general formula (Ib), a fluorine-containing horizontal alignment agent and a polymerization initiator is capable of forming a film which is prevented from precipitation of liquid-crystal compounds therein, of which the haze is reduced and which has a broad reflection width.

$Z^1-Y^1-A^1-Y^3-M^1-Y^4-A^2-Y^2-Z^2$      General Formula (Ia)

$Z^3-Y^5-A^3-Y^7-M^2-P$      General Formula (Ib)

16 Claims, 2 Drawing Sheets

(51) Int. Cl.
  *B32B 17/10*  (2006.01)
  *C09K 19/20*  (2006.01)
  *G02B 5/20*  (2006.01)
  *B60J 3/04*  (2006.01)
  *C09K 19/04*  (2006.01)

(52) U.S. Cl.
  CPC ... *B32B17/10504* (2013.01); *B32B 17/10761* (2013.01); *B60J 3/04* (2013.01); *C09K 19/2007* (2013.01); *G02B 5/208* (2013.01); *C09K 2019/0448* (2013.01); *C09K 2019/2078* (2013.01); *G02F 2201/343* (2013.01)

(56) References Cited

U.S. PATENT DOCUMENTS

| | | | |
|---|---|---|---|
| 6,800,337 B1 | 10/2004 | Siemensmeyer et al. | |
| 6,899,824 B2 | 5/2005 | Meyer et al. | |
| 7,292,296 B2* | 11/2007 | Kanbe | G02F 1/133536 349/114 |
| 7,597,942 B2* | 10/2009 | May | C09K 19/18 252/299.01 |
| 2002/0154379 A1* | 10/2002 | Tonar | B60Q 1/2665 359/267 |
| 2004/0140451 A1 | 7/2004 | Meyer et al. | |
| 2008/0143943 A1* | 6/2008 | May | C09K 19/18 349/117 |
| 2011/0086186 A1* | 4/2011 | Kim | C09J 7/0207 428/1.51 |
| 2011/0181820 A1* | 7/2011 | Watanabe | C03C 17/3405 349/115 |

FOREIGN PATENT DOCUMENTS

| | | |
|---|---|---|
| JP | 2002-536529 A | 10/2002 |
| JP | 2011-138147 A | 7/2011 |
| WO | WO 99/45082 A1 | 9/1999 |

OTHER PUBLICATIONS

International Search Report, issued in PCT/JP2012/072594, dated, Dec. 11, 2012.
Written Opinion Opinion of the International Searching Authority, issued in PCT/JP2012/072594, dated, Dec. 11, 2012.
Chinese Office Action dated Jun. 8, 2015, issued in corresponding Chinese Patent Application No. 201280044094.1.
International Preliminary Report on Patentability dated Mar. 20, 2014, issued in PCT/JP2012/072594 (Forms PCT/IB/338, PCT/IB/373, PCT/ISA/237 and PCT/ISA/326).
Chinese Office Action dated Sep. 19, 2014, issued in corresponding Chinese Patent Application No. 201280044094.1.
Chinese Office Action dated Dec. 22, 2015, issued in corresponding Chinese Patent Application No. 201280044094.1.

* cited by examiner

CHOLESTERIC LIQUID CRYSTAL MIXTURE, FILM, SELECTIVE REFLECTIVE PLATE, LAMINATE, LAMINATED GLASS

CROSS-REFERENCE TO RELATED APPLICATIONS

This application is a continuation application of International Application No. PCT/JP2012/072594, filed Sep. 5, 2012, which in turn claims the benefit of priority from Japanese Application No. 2011-198264, filed Sep. 12, 2011, and Japanese Application No. 2012-084520, filed Apr. 3, 2012, the disclosures of which Applications are incorporated by reference herein in their entirety.

BACKGROUND OF THE INVENTION

1. Field of the Invention

The present invention relates to a cholesteric liquid-crystal mixture, a film, a selective reflector, a laminate and a laminated glass.

2. Background Art

A laminated glass with a heat-shielding film sandwiched between two glass sheets is used for windshields of automobiles and for windowpanes of buildings. The heat-shielding film for use in these applications is desired to be flat and hazeless and have good visibility.

As the heat-shielding film, known is one that comprises a liquid-crystal film formed by fixing a cholesteric liquid-crystal phase on a support. The liquid-crystal film of the type may be formed, for example, by applying a coating liquid that contains a polymerizable cholesteric liquid-crystal compound onto a support and drying it thereon, followed by polymerization to thereby fix the cholesteric liquid-crystal layer. Here, there often occurs a problem of solid deposition that contains the liquid-crystal compound during coating and drying. Solid deposition that contains a liquid-crystal compound brings about a trouble of optical unevenness of the obtained heat-shielding film, and is therefore desired to be solved.

On the other hand, in addition to such a single type of liquid-crystal compound, there is known a liquid-crystal mixture that further contains, as mixed therein as a second liquid-crystal compound, a monomer or a liquid crystal that exhibits liquid crystallinity after polymerized, and contains, as further added thereto, a horizontal alignment agent, a polymerization initiator, a chiral agent and the like (see Patent Literatures 1 and 2). In these references, there is disclosed a liquid-crystal mixture that comprises liquid-crystal compounds each satisfying the general formula (Ia) and the general formula (Ib) described therein. In addition, these references describe, as a method for producing such liquid-crystal compounds, a method of reacting specific compounds to give a mixture of one type of a liquid-crystal compound having two polymerizable groups, two types of liquid-crystal compounds each having one polymerizable group and one type of a liquid-crystal compound not having a polymerizable group, or that is, such four different types of liquid-crystal compounds in total, for example, in Examples in Patent Literature 1.

CITATION LIST

Patent Literature

Patent Literature 1: JP-T 2002-536529
Patent Literature 2: JP-A 2011-138147

SUMMARY OF INVENTION

The present inventors investigated the characteristics of the liquid-crystal mixtures described in Patent Literatures 1 and 2, and have known that blending these liquid-crystal compounds makes it possible to prevent solid deposition that contains the liquid-crystal compounds.

However, the inventors have further investigated the characteristics of the liquid-crystal compounds satisfying the general formula (Ia) and the general formula (Ib) described in these references and, as a result, have known that the configurations described in Patent Literatures 1 and 2 increase haze and therefore could not be used in applications of heat-shielding films of which the haze is desired to be reduced, for example, for windshields of automobiles and windowpanes of buildings, etc.

In addition, nothing is investigated in Patent Literatures 1 and 2 relating to application to a heat-shielding film with a cholesteric liquid-crystal layer fixed therein. Therefore, as the case now stands, nothing has heretofore been investigated relating to the reflection width of the characteristic reflection peaks in production of a heat-shielding film by the use of the liquid-crystal mixture described in these references.

In addition, recently, characteristic reflection of UV rays and visible light has become desired in addition to the heat-shield filming for characteristic reflection of IR rays as described above; however, nothing has heretofore been investigated relating to the above-mentioned problems and characteristics relative to the characteristic reflection films with a cholesteric liquid-crystal layer fixed therein.

An object of the invention is to solve the above-mentioned problems and to improve the characteristics that have heretofore been investigated in the art. Specifically, the technical problem to which the invention is directed is to provide a cholesteric liquid-crystal mixture capable of forming a film which is prevented from precipitation of liquid-crystal compounds therein, of which the haze is reduced and which has a broad reflection width, and to provide a film using the mixture.

The present inventors have assiduously studied for the purpose of solving the above-mentioned problems and, as a result, have found that, when the alignment agent used in Patent Literatures 1 and 2 is changed to a fluorine-containing horizontal alignment agent, then the haze of the formed film can be reduced.

Further, the inventors have found out some new problems. Briefly, the mixture of liquid-crystal compounds satisfying the general formula (Ia) and the general formula (Ib) described in Patent Literatures 1 and 2 could surely prevent solid precipitation that contains the liquid-crystal compounds; however, though not adhering to any theory, some types of liquid-crystal compounds (monomers or liquid crystals) described in these references are problematic in that the characteristic reflection width reduces in forming a film that has a cholesteric liquid-crystal layer fixed therein since the alignment of the liquid crystal molecules therein is disordered to lower $\Delta n$, and therefore the heat-shielding performance of the film is thereby lowered.

Against the above-mentioned problems, the inventors have found that, when a combination of liquid-crystal compounds each having a specific structure as defined more specifically than the general formula (Ia) and the general formula (Ib) described in Patent Literatures 1 and 2 is used and, in addition, when a fluorine-containing horizontal alignment agent is added thereto, then there can be obtained a cholesteric liquid-crystal mixture which, when formed into a liquid-crystal film with a cholesteric liquid-crystal layer fixed therein, prevents precipitation of a solid that contains the liquid-crystal compounds, and that the characteristic reflection width of the formed film is broadened and the haze of the film is reduced.

The invention that provides means for solving the above-mentioned problems is as follows:

[1] A cholesteric liquid-crystal mixture containing a compound represented by the following general formula (Ia), a compound represented by the following general formula (Ib), a fluorine-containing horizontal alignment agent and a polymerization initiator:

$Z^1-Y^1-A^1-Y^3-M^1-Y^4-A^2-Y^2-Z^2$   General Formula (Ia)

$Z^3-Y^5-A^3-Y^7-M^2-P$   General Formula (Ib)

(In the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of from 1 to 30 (provided that the spacer represents an alkylene group, or a linking group of multiple alkylene groups bonding to each other via —O— or —CO—); $M^1$ and $M^2$ each independently represent (-$T^1$-$Y^8$)$_n$-$T^2$-; n indicates a natural number; when n is 2 or more, then multiple (-$T^1$-$Y^8$)'s may be the same or different; $T^1$ and $T^2$ each independently represent a saturated or unsaturated hydrocarbon ring, or a saturated or unsaturated hetero ring (provided that the hydrocarbon ring and the hetero ring may have a substituent); $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—; P represents a hydrogen atom or an alkyl group having from 1 to 15 carbon atoms.)

[2] Preferably, in the cholesteric liquid-crystal mixture according to [1], $T^1$ and $T^2$ in the general formulae (Ia) and (Ib) each independently represent a saturated or unsaturated hydrocarbon ring, or a saturated or unsaturated hetero ring (provided that the hydrocarbon ring and the hetero ring may have an alkyl group or an alkoxy group as the substituent).

[3] Preferably, in the cholesteric liquid-crystal mixture according to [1] or [2], the content of the compound represented by the general formula (Ib) relative to the content of the compound represented by the general formula (Ia) is from 5 to 40% by mass.

[4] Preferably, in the cholesteric liquid-crystal mixture according to any one of [1] to [3], the compound represented by the general formula (Ia) is a compound in which at least one hydrocarbon ring or hetero ring of the hydrocarbon ring and the hetero ring represented by $T^1$ and $T^2$ has an alkyl group or an alkoxy group, and the compound represented by the general formula (Ib) is a compound in which the hydrocarbon ring and the hetero ring represented by $T^1$ and $T^2$ each are an unsubstituted hydrocarbon ring or hetero ring.

[5] The cholesteric liquid-crystal mixture according to any one of [1] to [4], wherein in the compound represented by the general formula (Ia), n that indicates $M^1$ is from 2 to 4.

[6] A film comprising a support and, as formed on the support, a liquid-crystal layer where a cholesteric liquid-crystal phase formed by polymerizing the cholesteric liquid-crystal mixture according to any one of [1] to [5] is fixed.

[7] Preferably, the film according to [6] contains two or more liquid-crystal layers each with the cholesteric liquid-crystal phase fixed therein.

[8] Preferably, the film according to [6] or [7] exhibits a selective reflection characteristic in an IR wavelength region.

[9] Preferably, the film according to [6] or [7] exhibits a selective reflection characteristic in a UV or visible wavelength region.

[10] A selective reflector comprising the film of any one of [6] to [9].

[11] Preferably, the selective reflector according to [10] contains a 2/2 plate.

[12] Preferably, the selective reflector according to [10] or [11] has a highly-adhesive layer as the outermost layer.

[13] A laminate which is formed by the use of the selective reflector of any one of [10] to [12] and which has at least a liquid-crystal layer formed by fixing the cholesteric liquid-crystal phase of the selective reflector.

[14] A laminated glass comprising the laminate of [13] and at least two glass sheets, wherein the laminate is sandwiched between the two glass sheets.

[15] A windshield for automobiles, comprising the laminate glass of [14].

[16] Glass for building materials, comprising the laminated glass of [14].

According to the invention, there are provided a cholesteric liquid-crystal mixture capable of forming a film which is prevented from precipitation of liquid-crystal compounds therein, of which the haze is reduced and which has a broad reflection width, and a film using the mixture.

DESCRIPTION OF EMBODIMENTS

Figure 1:
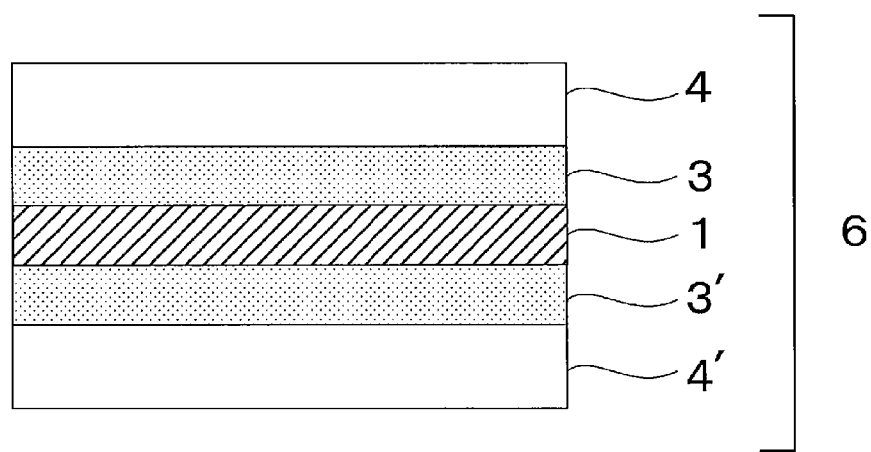
FIG. 1 is a schematic view showing a cross section of one example of the laminated glass of the invention.

The invention is described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lower limit of the range and the latter number indicating the upper limit thereof.

In this description, the solid that contains a liquid-crystal compound may comprise the crystal of the liquid-crystal compound, or may be a non-crystalline amorphous one. The solid may contain any other component such as a polymerization initiator, a chiral agent, etc. All or a part of these may be mixed in the solid.

[Cholesteric Liquid-Crystal Mixture]

The cholesteric liquid-crystal mixture of the invention contains a compound represented by the following general formula (Ia), a compound represented by the following general formula (Ib), a fluorine-containing horizontal alignment agent and a polymerization initiator.

$Z^1-Y^1-A^1-Y^3-M^1-Y^4-A^2-Y^2-Z^2$   General Formula (Ia)

$Z^3-Y^5-A^3-Y^7-M^2-P$   General Formula (Ib)

(In the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of from 1 to 30 (provided that the spacer represents an alkylene group, or a linking group of multiple alkylene groups bonding to each other via —O— or —CO—); $M^1$ and $M^2$ each independently represent $(-T^1-Y^8)_n-T^2-$; n indicates a natural number; when n is 2 or more, then multiple $(-T^1-Y^8)$'s may be the same or different; $T^1$ and $T^2$ each independently represent a saturated or unsaturated hydrocarbon ring, or a saturated or unsaturated hetero ring (provided that the hydrocarbon ring and the hetero ring may have a substituent); $Y^1, Y^2, Y^3, Y^4, Y^5, Y^7$ and $Y^8$ each independently represent a single bond, —O—, —CO—, —O—CO—, —CO—O— or —O—CO—O—; P represents a hydrogen atom or an alkyl group having from 1 to 15 carbon atoms.)

Having the constitution as above, the cholesteric liquid-crystal mixture of the invention can form a film which is prevented from precipitation of liquid-crystal compounds therein, of which the haze is reduced and which has a broad reflection width. The components of the cholesteric liquid-crystal mixture of the invention are described below.

<Compound Represented by General Formula (Ia), Compound Represented by General Formula (Ib)>

The cholesteric liquid-crystal mixture of the invention contains a compound represented by the above-mentioned general formula (Ia) and a compound represented by the above-mentioned general formula (Ib). First described are these compounds.

($Z^1, Z^2$ and $Z^3$)

In the above general formulae (Ia) and (Ib), $Z^1, Z^2$ and $Z^3$ each independently represent a polymerizable group.

In relation to the crosslinking component of $Y^1$ to $Y^8$, the polymerizable group of $Z^1$ to $Z^3$ corresponds to, for example, the following:

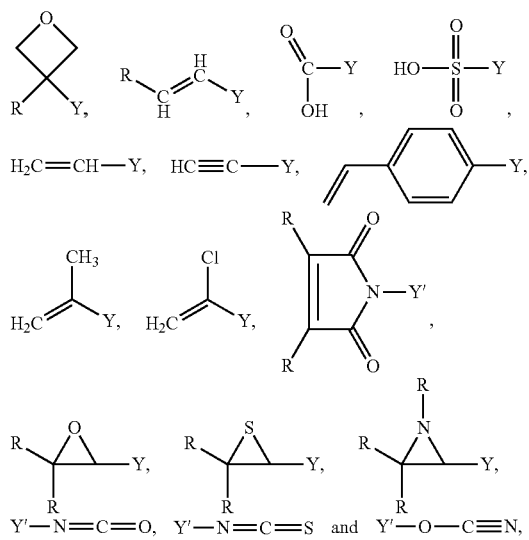

[In the formulae, Y represents the definition of the crosslinking groups $Y^1$ to $Y^8$, or that is, a chemical single bond, oxygen, sulfur, —O—CO—, —CO—O—, —O—CO—O—, —CO—NR—, —NR—CO—, —O—CO—NR—, —NR—CO—O— or —NR—CO—NR—; R represents hydrogen or $C_1$-$C_4$-alkyl, or that is, methyl, ethyl, n-propyl, i-propyl, n-butyl, i-butyl, sec-butyl or t-butyl; and Y' represents a chemical single bond (in the following, the polymerizable group of $Z^1$ to $Z^3$ is represented as a polymerizable unit and as Z—Y and/or Z—Y' in relation to the crosslinking component of $Y^1$ to $Y^8$).]

Of those polymerizable units, the cyanate can be spontaneously trimerized into a cyanurate. The maleinimide group is especially suitable for radical copolymerization with the liquid-crystal compound of the formula Ia and/or Ib having a styryl group as the polymerizable group therein.

The compound of the formula Ia and/or Ib having any of an epoxide group, an oxetane group, a carboxyl group, a sulfonic acid group, a thiirane group, an aziridine group, an isocyanate group and an isothiocyanate group needs any other compound having a complementary reactive unit for polymerization. Specifically, for example, a suitable isocyanate may polymerize with an alcohol to give a urethane, or may polymerize with an amine to give a urea derivative. The same may apply to the corresponding thiirane and aziridine.

The complementary reactive unit may be contained in the liquid-crystal compound that is composed of a liquid-crystal compound similar to the formula Ia and/or Ib of the component A) in the liquid-crystal substance mixture. However, in place of the group $Z^1$—$Y^1$—, $Z^2$—$Y^2$— and/or $Z^3$—$Y^5$—, these compounds contain a hydroxyl group, a mercapto group or an NHR group, in which the last R means hydrogen or $C_1$-$C_4$-alkyl. Further, the complementary reactive unit may also be contained in the auxiliary compound that is brought in the liquid-crystal substance mixture.

Depending on the matter whether or not the component A) may contain a liquid-crystal compound of the formula Ib that contains one or two polymerizable units, or in relation to the proportion of these compounds as the case may be, especially above all, in relation to the ratio of the amount of the polymerizable unit-having liquid-crystal compound to the amount of the complementary unit-having liquid-crystal compound, as well as to the ratio of the amount of the polymerizable unit-having liquid-crystal compound to the amount of the complementary unit-having auxiliary compound, polymer products may be obtained that are cross-linked in a different degree and that can therefore satisfy the corresponding requirements.

($A^1, A^2$ and $A^3$)

In the above-mentioned general formulae (Ia) and (Ib), $A^1, A^2$ and $A^3$ each independently represent a spacer having an atom-bonding chain length of from 1 to 30 (provided that the spacer represents an alkylene group, or a linking group of multiple alkylene groups bonding to each other via —O— or —CO—).

Preferably, $A^1, A^2$ and $A^3$ each are independently a spacer having an atom-bonding chain length of from 1 to 12. More preferably, $A^1, A^2$ and $A^3$ each are independently a spacer having from 1 to 12 carbon atoms (provided that the spacer is an unsubstituted alkylene group), even more preferably a spacer having from 2 to 8 carbon atoms (provided that the spacer is an unsubstituted alkylene group).

The spacer of $A^1$ and $A^2$ generally has from 1 to 30 carbon atoms but advantageously from 1 to 12 carbon atoms, and is mainly composed of a linear aliphatic group. Further, the carbon chain may be interrupted by one or more methyl, fluorine, chlorine or bromine and/or oxygen in an ether functional group or sulfur in a thioether functional group, or by a non-neighboring imino group or a $C_1$-$C_4$-alkylimino group. Methyl, ethyl, n-propyl, i-propyl, n-butyl, i-butyl, sec-butyl and t-butyl correspond to the $C_1$-$C_4$-alky group for the latter.

Typical spacers include, for example:

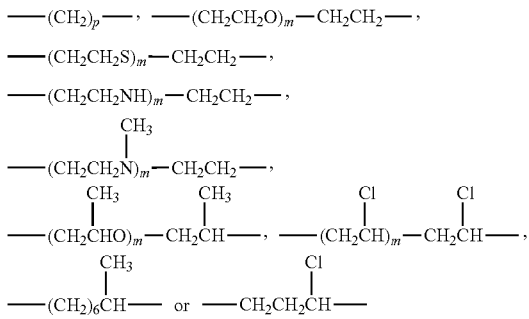

[In the formulae, p indicates an integer of from 1 to 30, advantageously 1, 2, 3, 4, 5, 6, 7, 8, 9, 10, 11 or 12; and m indicates an integer of from 1 to 14, advantageously 1, 2 or 3.]

(P)

In the above general formula (Ib), P represents a hydrogen atom or an alkyl group having from 1 to 15 carbon atoms.

The $C_1$-$C_{15}$-alkyl for P is advantageously a non-branched alkyl group, for example, corresponding to methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl or n-pentadecyl.

Of those, P is preferably an alkyl group having from 1 to 15 carbon atoms. The $C_1$-$C_{15}$-alkyl group may be substituted with one or more and generally up to three substituents of methyl, fluorine, chlorine and bromine. Accordingly, for example, P includes i-propyl("1-methylethyl"), sec-butyl ("1-methylpropyl"), i-butyl ("2-methylpropyl"), t-butyl ("1,1-dimethylethyl"), 1-methylbutyl, 2-methylbutyl, 3-methylbutyl, 2,2-dimethylpropyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1,1,2-trimethylpropyl, 1,2,2-trimethylpropyl, or n-methyl, n-heptyl, n-octyl, n-nonyl, n-decyl, n-undecyl, n-dodecyl, n-tridecyl, n-tetradecyl or n-pentadecyl group substituted with one, two or three methyl groups, as well as their isomers. External substitution of the methyl group in the exemplified substituents with fluorine, chlorine or bromine gives corresponding halogen-substituted $C_1$-$C_{15}$-alkyl groups.

Of the above compounds represented by the general formula (Ib) in the invention, preferred are those in which P is an unsubstituted alkyl group having from 1 to 15 carbon atoms, more preferably an unsubstituted alkyl group having from 2 to 8 carbon atoms, even more preferably an unsubstituted alkyl group having from 5 to 8 carbon atoms.

Different from the compounds represented by the general formulae described in JP-T 2002-129162 and JP-A 2011-138147, in the compounds represented by the general formula (Ib) in the invention, the non-neighboring group $CH_2$— in the $C_1$-$C_{15}$-alkyl group of P is not interrupted by oxygen, sulfur, —CO—, —O—CO—, —CO—O— or —O—CO—O—. When such a compound in which P is $C_1$-$C_{15}$-alkyl with the non-neighboring group $CH_2$— therein is interrupted by oxygen, sulfur, —CO—, —O—CO—, —CO—O— or —O—CO—O— is used in film formation, then the formed film would have a small reflection width. In addition, the compound represented by the general formula (Ib) where P contains a sulfur atom tends to be poor in lightfastness.

($M^1$ and $M^2$)

In the general formulae (Ia) and (Ib), $M^1$ and $M^2$ each independently represent $(-T^1-Y^8)_n-T^2-$.

n indicates a natural number; when n is 2 or more, then multiple $(-T^1-Y^8)$'s may be the same or different.

In the cholesteric liquid-crystal mixture of the invention, n in $M^1$ in the above general formula (Ia) is preferably from 1 to 5, more preferably from 2 to 5, even more preferably from 2 to 4, still more preferably 2 or 3, further more preferably 2.

n in $M^2$ in the above general formula (Ib) is preferably from 1 to 5, more preferably from 2 to 5, even more preferably from 2 to 4, still more preferably 2 or 3, further more preferably 2.

The group of $T^1$ and $T^2$ may have a substituent within a possible range, and for example, the group may be substituted with the same or different, three or less substituents selected from $C_1$-$C_{20}$-alkyl, $C_1$-$C_{20}$-alkoxy, $C_1$-$C_{20}$-alkoxycarbonyl, $C_1$-$C_{20}$-monoalkylaminocarbonyl, $C_1$-$C_{20}$-alkylcarbonyl, $C_1$-$C_{20}$-alkylaminocarbonyloxy, $C_1$-$C_{20}$-alkylcarbonylamino, formyl, halogen, cyano, hydroxy or nitro. The hydrocarbon ring and the hetero ring preferably have an alkyl group or an alkoxy group as the substituent. Advantageously, however, the substituent of $T^1$ and/or $T^2$ is monosubstituted.

In particular, the group of $T^1$ and $T^2$ corresponds to the following:

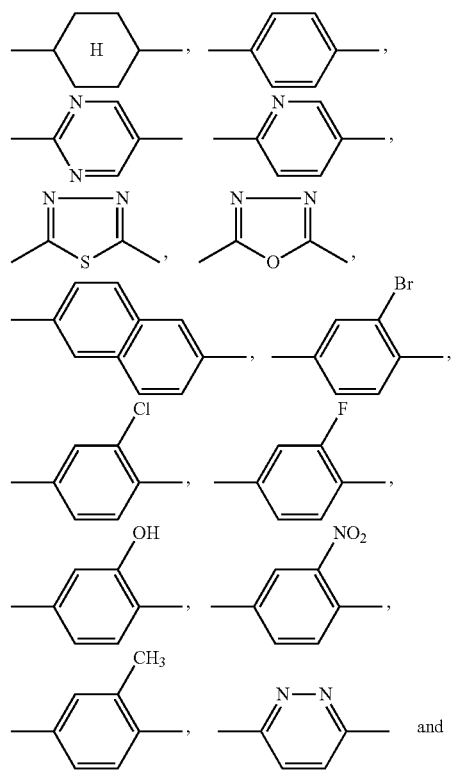 and 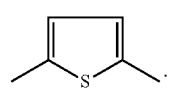.

Especially advantageously, the mesogen group of $M^1$ and $M^2$ each independently represent the following formula:

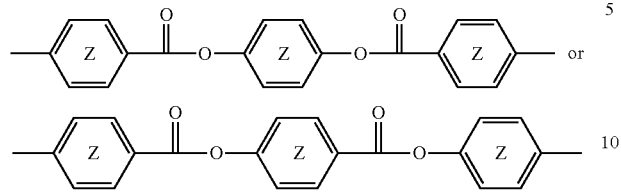

In the above, the ring Z independently may have the same or different, three or less substituents selected from $C_1$-$C_{20}$-alkyl, $C_1$-$C_{20}$-alkoxy, $C_1$-$C_{20}$-alkoxycarbonyl, $C_1$-$C_{20}$-monoalkylaminocarbonyl, $C_1$-$C_{20}$-alkylcarbonyl, $C_1$-$C_{20}$-alkylcarbonyloxy, $C_1$-$C_{20}$-alkylcarbonylamino, formyl, halogen, cyano, hydroxy or nitro.

Advantageous substituents for the aromatic ring Z include fluorine, chlorine, bromine, cyano, formyl, hydroxy, a short-chain aliphatic group (preferably having from 1 to 4 carbon atoms, for example, methyl, ethyl, n-propyl, i-propyl, n-butyl, i-butyl, t-butyl), as well as an alkoxy group, an alkoxycarbonyl group, an alkylcarbonyl group, an alkylcarbonyloxy group, an alkylcarbonylamino group and a monoalkylaminocabonyl group containing such an alkyl group.

An especially advantageous benzene ring Z for $M^1$, and an especially advantageous benzene ring Z for $M^2$ may advantageously have the following substituent pattern:

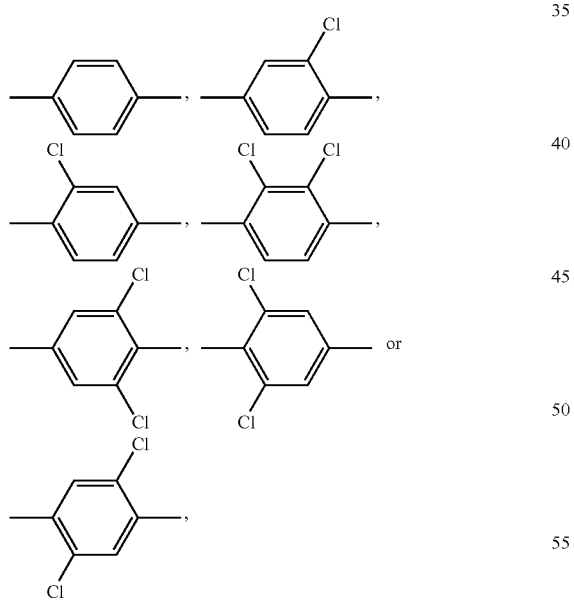

In place of Cl, the above may also be substituted with any of F, Br, an alkyl group (preferably an alkyl group having from 1 to 4 carbon atoms, more preferably $CH_3$), an alkoxy group (preferably an alkoxy group having from 1 to 4 carbon atoms, more preferably $OCH_3$), CHO, $COCH_3$, $OCOCH_3$ or CN. Optionally, the ring may be substituted with two or more such substituents. Also preferred is the following structure:

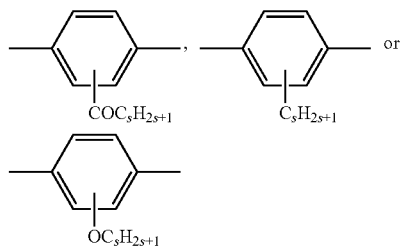

In the above, s indicates an integer of from 2 to 20, advantageously 8, 9, 10, 11, 12, 13, 14 or 15.

More advantageous substituents for the benzene ring Z for $M^1$ and the benzene ring for $M^2$ include the following:

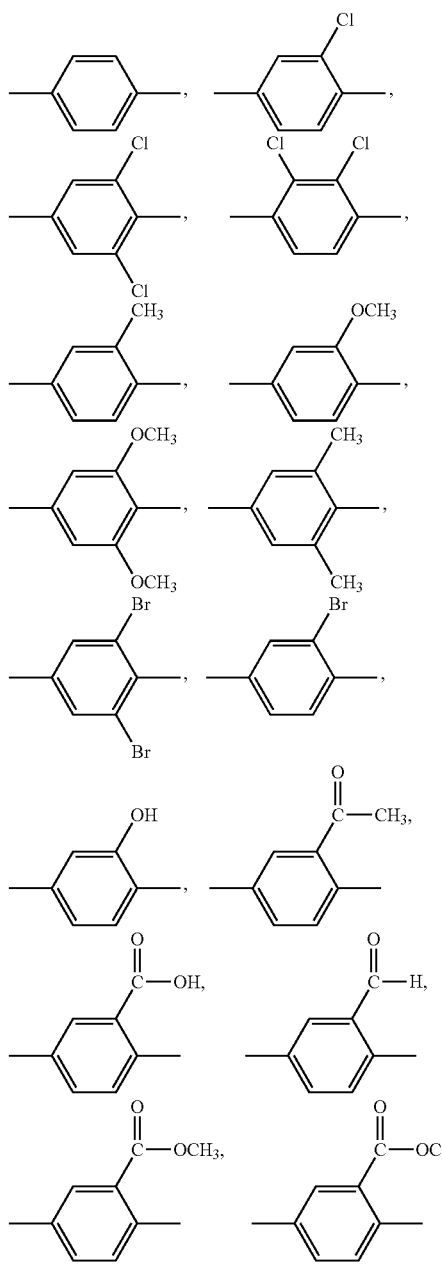

-continued

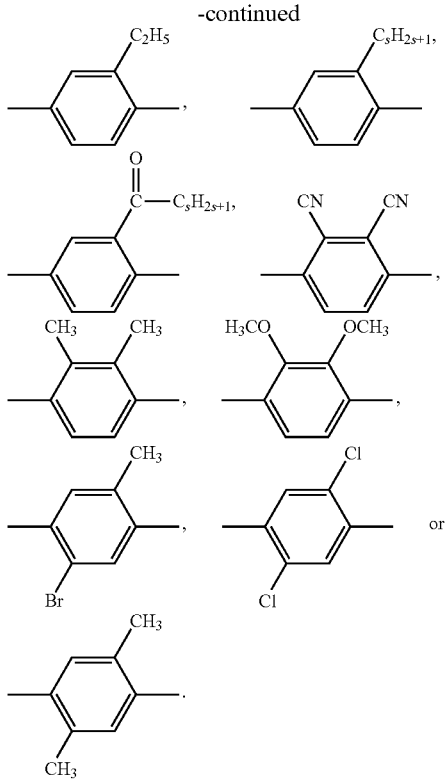

Preferably, in cholesteric liquid-crystal mixture of the invention, the compound represented by the above general formula (Ia) is a compound in which at least one hydrocarbon ring or hetero ring of the hydrocarbon ring and the hetero ring represented by $T^1$ and $T^2$ has an alkyl group or an alkoxy group.

More preferably above all, the compound represented by the above general formula (Ia) is a compound in which one hydrocarbon ring or hetero ring of the hydrocarbon ring and the hetero ring represented by $T^1$ and $T^2$ has an alkyl group or an alkoxy group. Even more preferred is a compound in which one hydrocarbon ring has an alkyl group (preferably an alkyl group having from 1 to 4 carbon atoms, more preferably $CH_3$) or an alkoxy group (preferably, an alkoxy group having from 1 to 4 carbon atoms, more preferably $OCH_3$); and still more preferred is a compound in which one hydrocarbon ring or hetero ring has an alkyl group.

In case where n in $M^1$ in the compound represented by the general formula (Ia) is 2, preferably, the central one hydrocarbon ring or hetero ring of the hydrocarbon rings and the hetero rings has an alkyl group or an alkoxy group, and more preferred ranges of the case are the same as mentioned above.

On the other hand, it is also desirable that, in the cholesteric liquid-crystal mixture of the invention, the compound represented by the above general formula (Ib) is a compound in which both the hydrocarbon ring and the hetero ring represented by $T^1$ and $T^2$ are unsubstituted hydrocarbon rings or hetero rings.

($Y^1$, $Y^2$, $Y^3$, $Y^4$, $Y^5$, $Y^7$ and $Y^8$)

In the above general formulae (Ia) and (Ib), $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—.

Advantageously, in the compound of the formulae (Ia) and (Ib), $Y^1$ to $Y^5$, $Y^7$, $Y^9$ and $Y^{10}$ and optionally $Y^8$ each independently represent oxygen, —O—CO—, —CO—O— or —O—CO—O—.

Advantageously, the liquid-crystal substance mixture and its advantageous embodiments include compounds of the formula (Ia) and/or (Ib) where the polymerizable unit of $Z^1$—$Y^1$—, $Z^2$—$Y^2$— and $Z^3$—$Y^5$— is selected from methacryloyloxy, acryloyloxy and vinyloxy.

Specific examples of the compound represented by the above general formula (Ia) and the compound represented by the above general formula (Ib) are shown below. However, the compound represented by the above general formula (Ia) and the compound represented by the above general formula (Ib) that are employable in the invention should not be limitatively interpreted by the following specific examples.

Compounds Represented by General Formula (Ia)

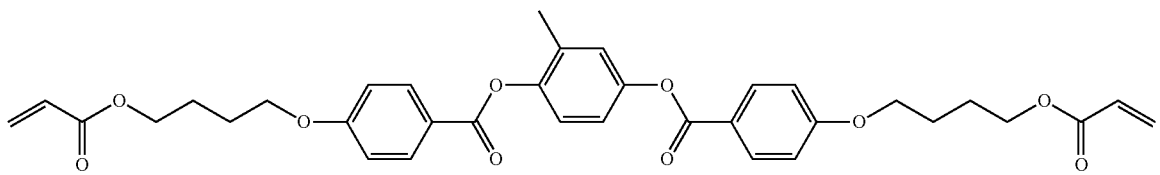

IV-1

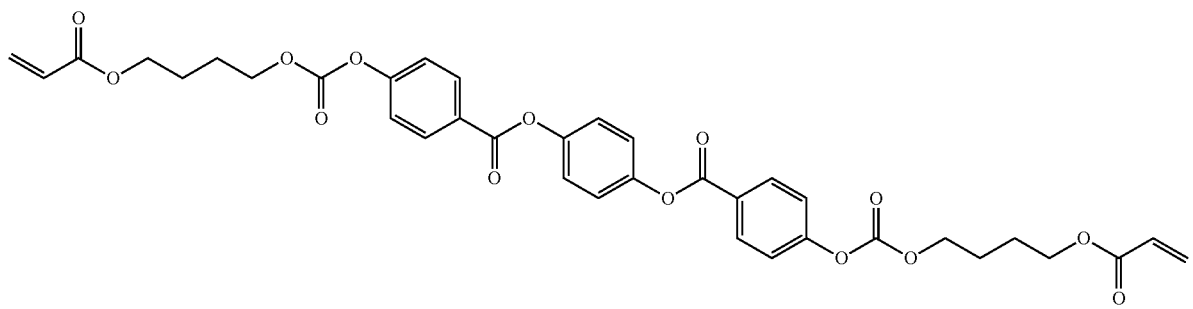

-continued
IV-2
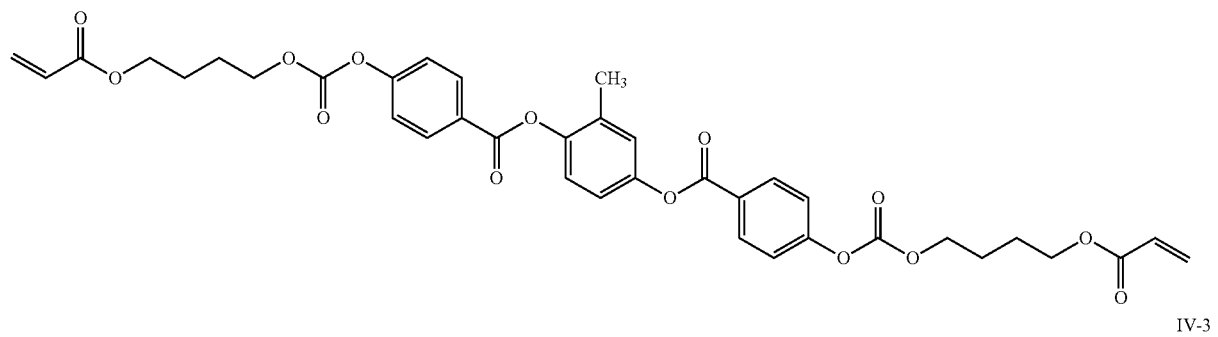
IV-3
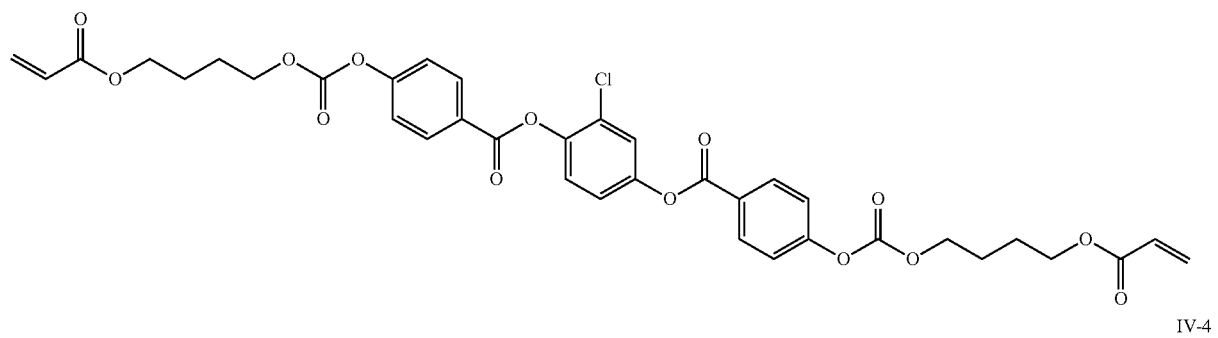
IV-4
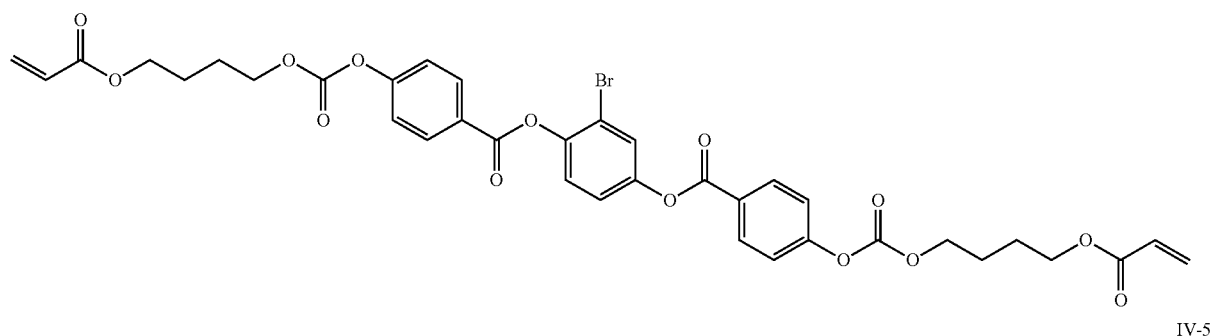
IV-5
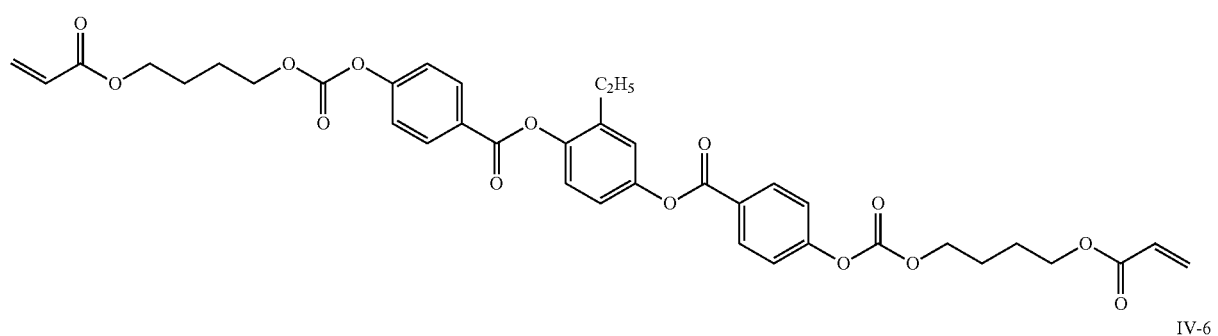
IV-6
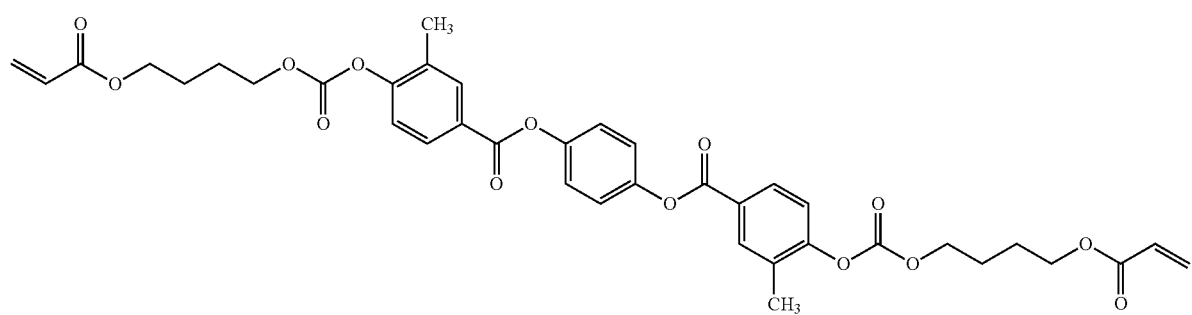

-continued
IV-7
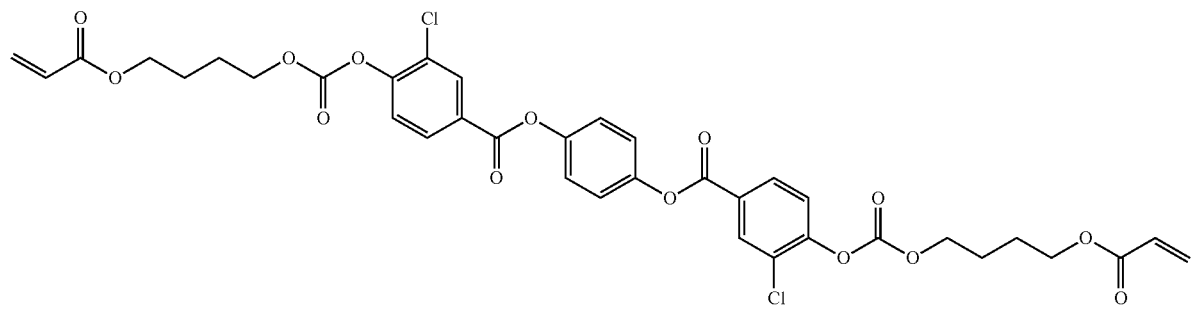
IV-8
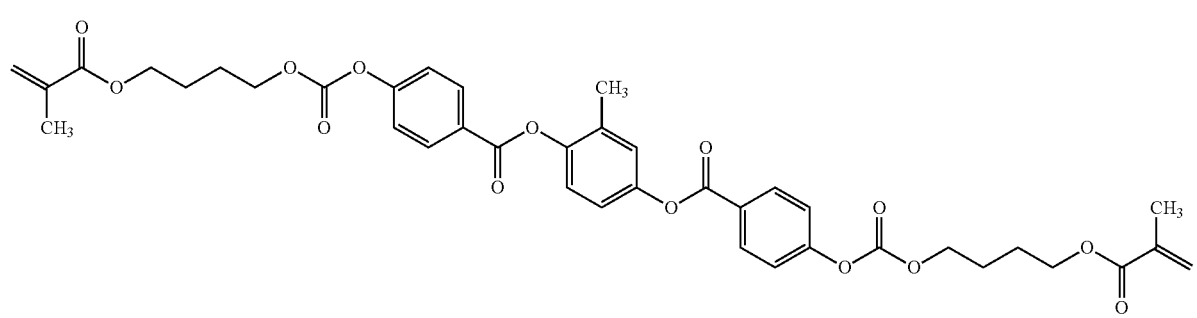
IV-9
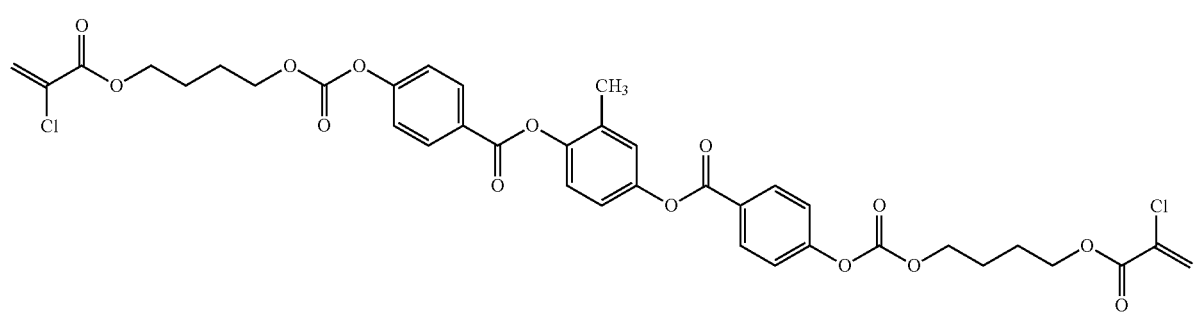
IV-10
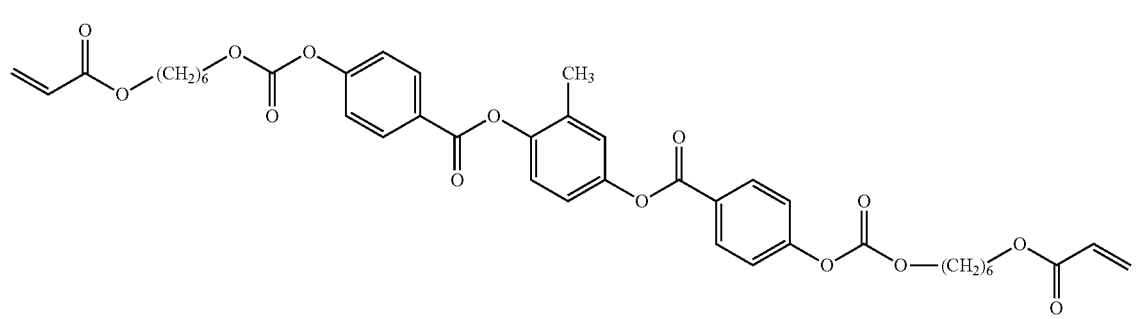
IV-11
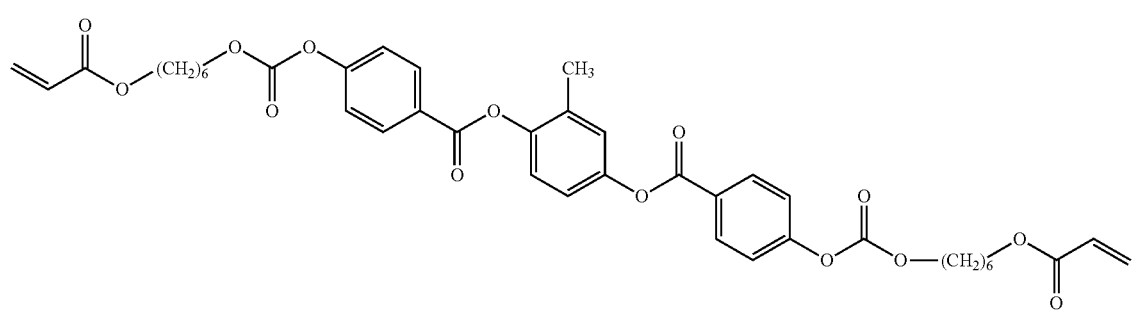

IV-12
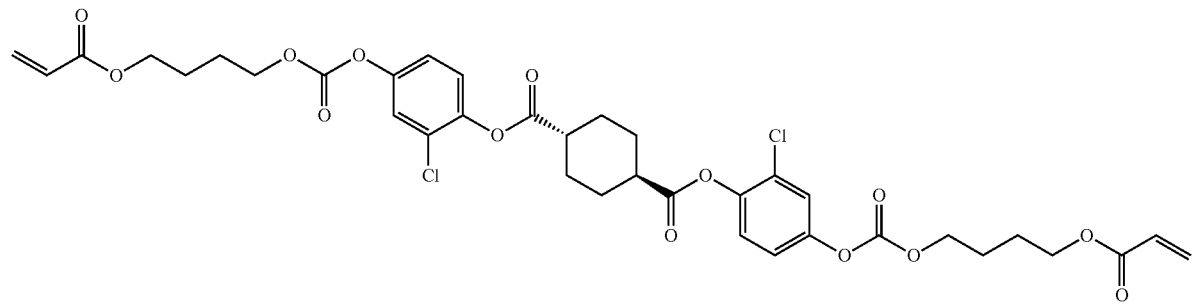
IV-13
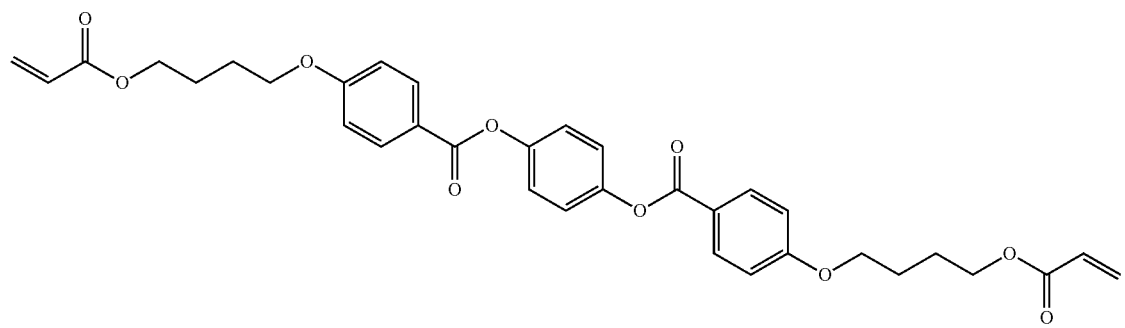
IV-14
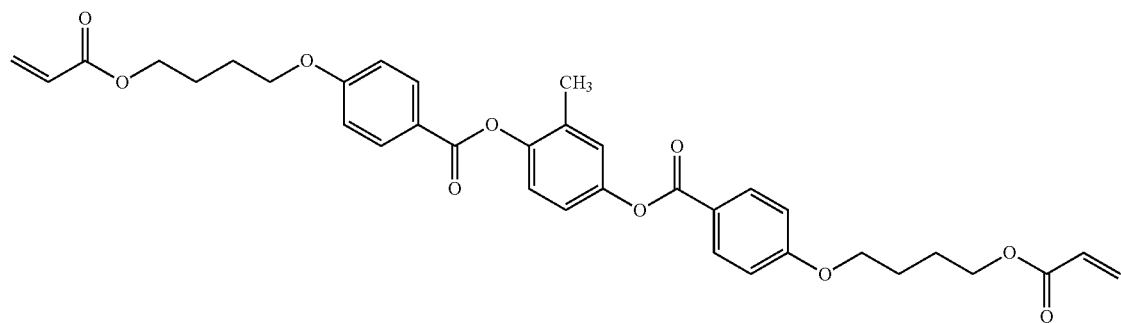
IV-15
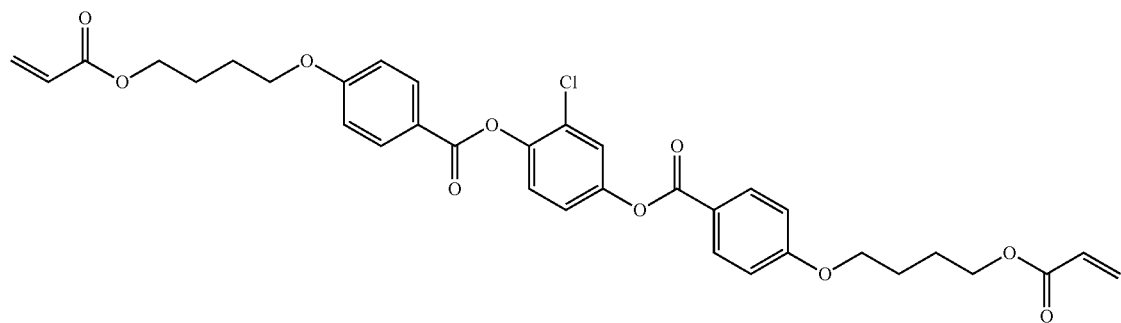

IV-16
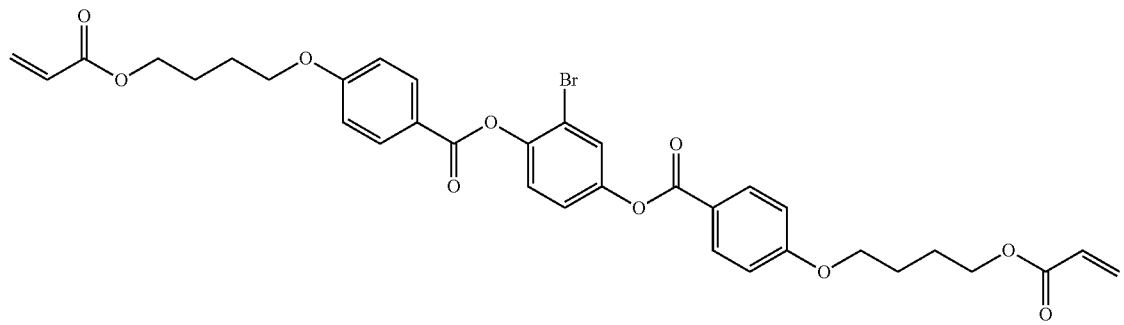
IV-17
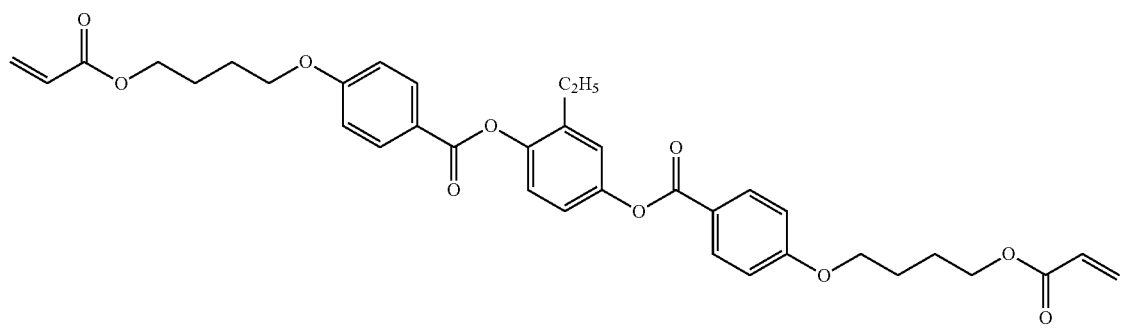
IV-18
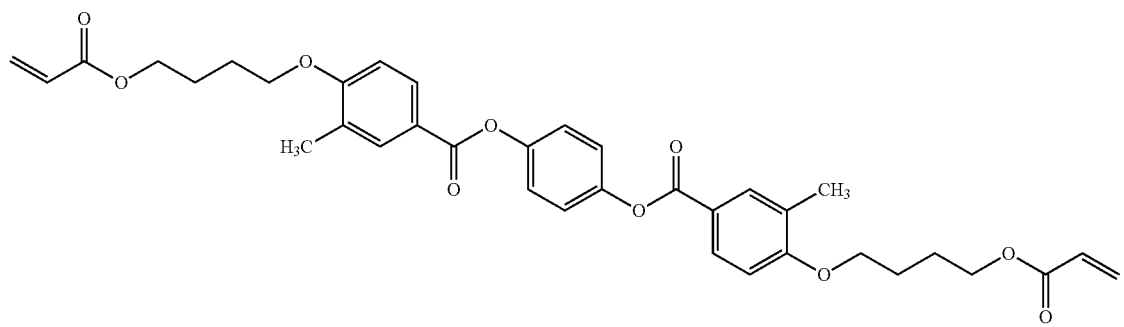
IV-19
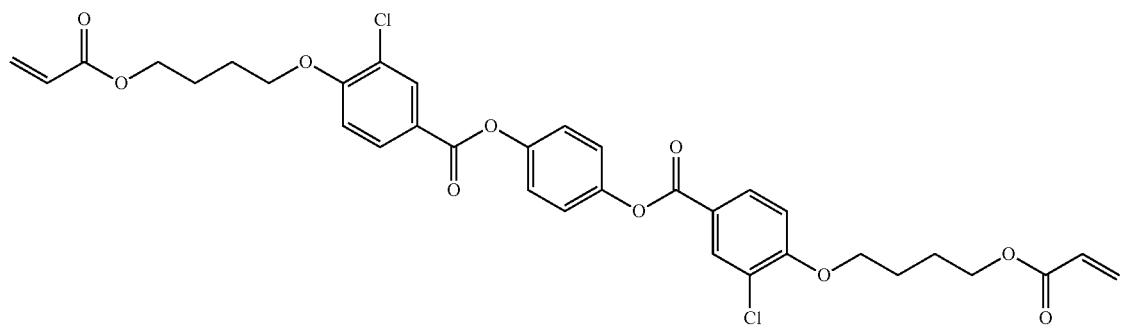

IV-20
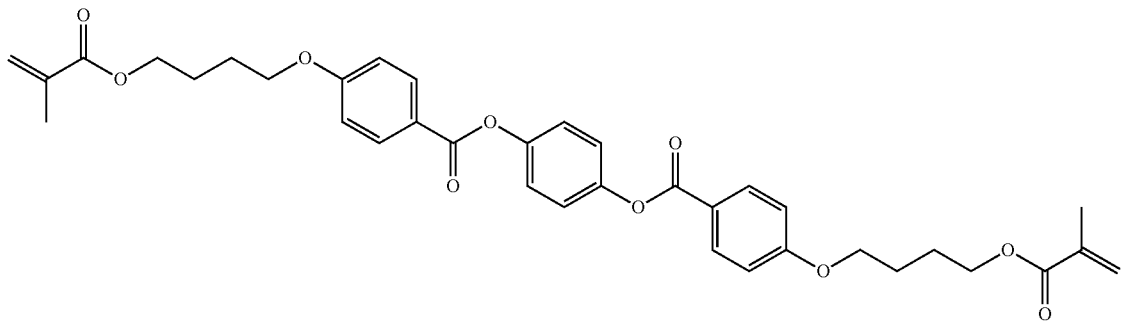
IV-21
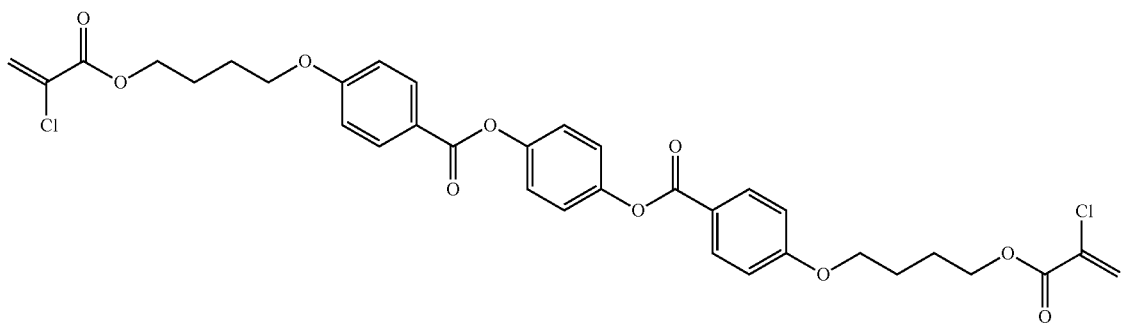
IV-22
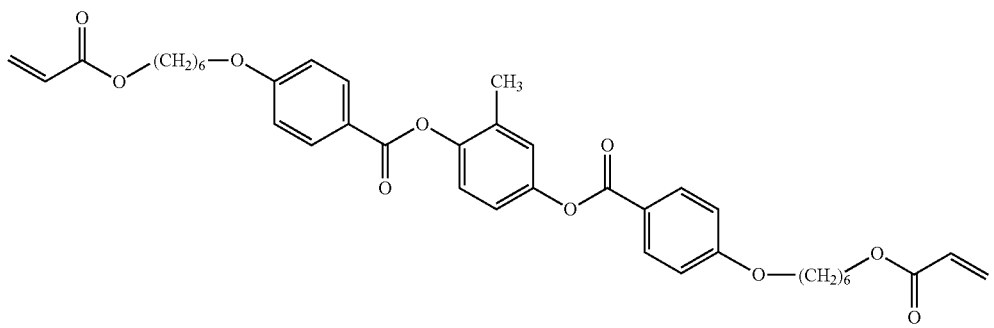
IV-23
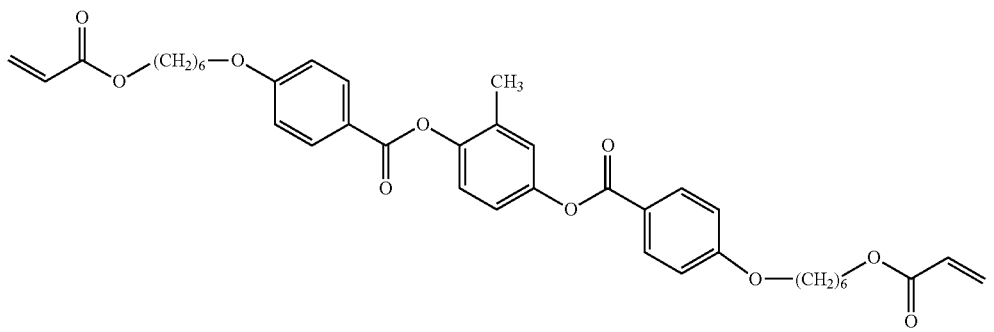

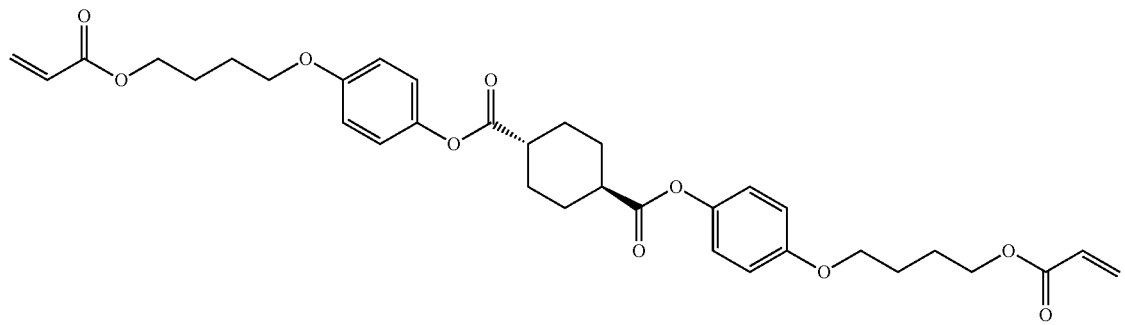
IV-24
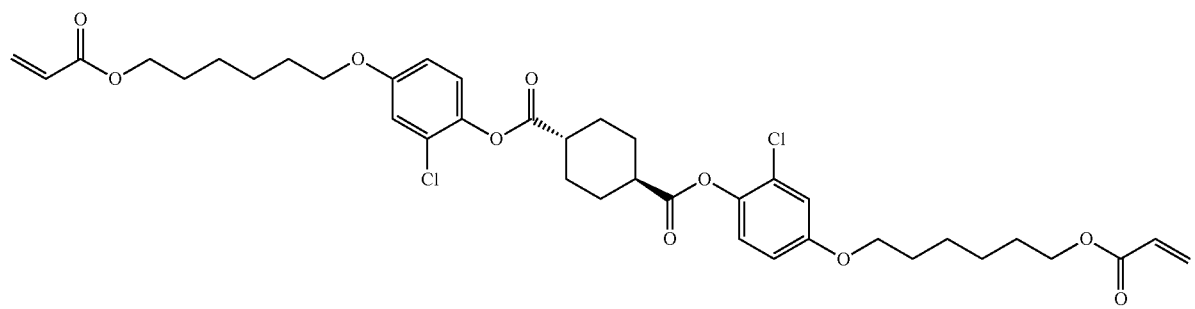
IV-25
Compounds Represented by General Formula (Ib)
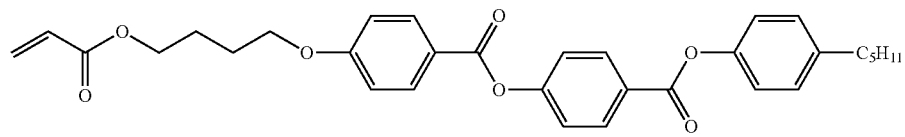
(I-1)
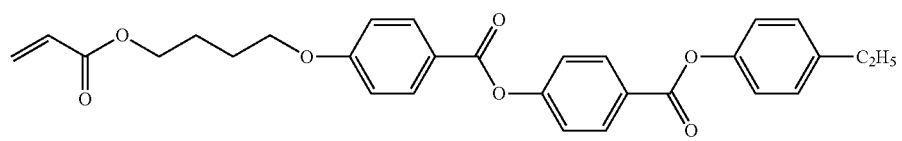 [SMILES: C=CC(=O)OCCCCOc1ccc(C(=O)Oc2ccc(C(=O)Oc3ccc(CC)cc3)cc2)cc1]
(I-2)
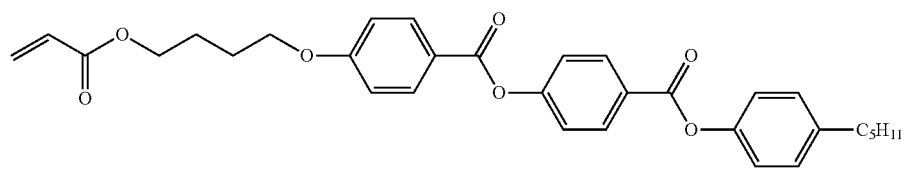
(I-3)
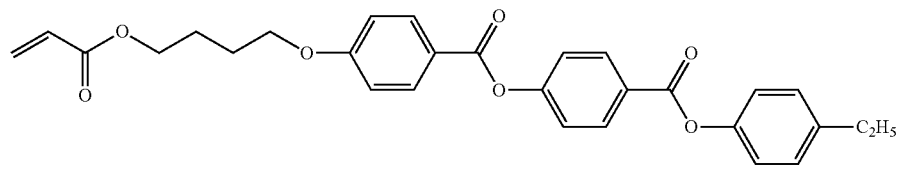
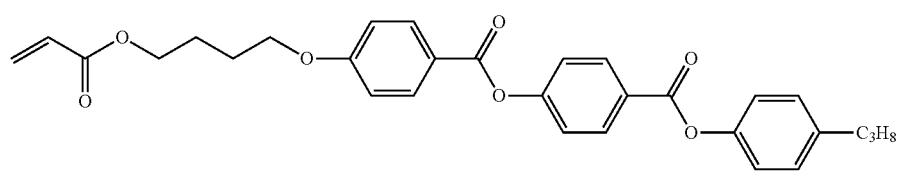

-continued
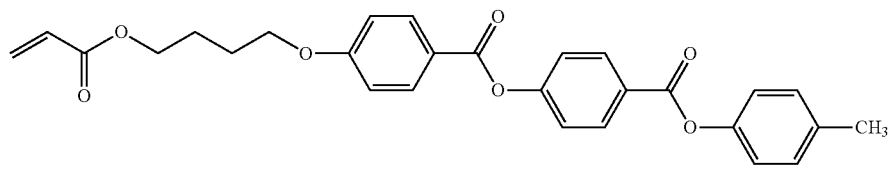
(I-4)
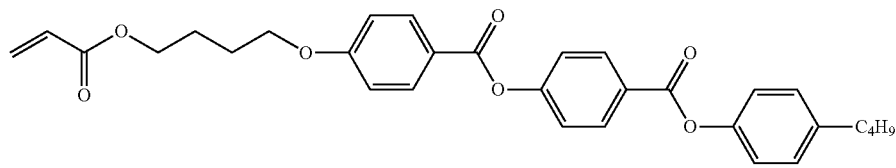
(I-5)
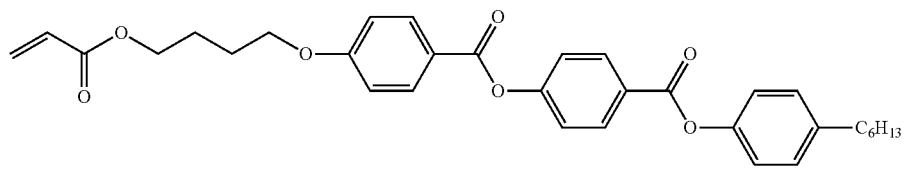
(I-6)
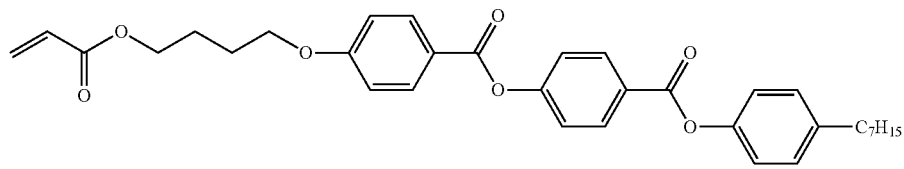
(I-7)
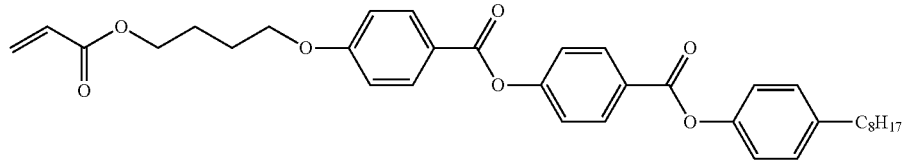
(I-8)
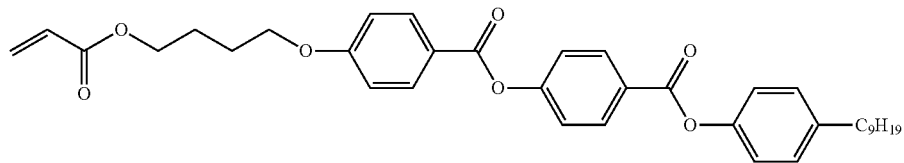
(I-9)
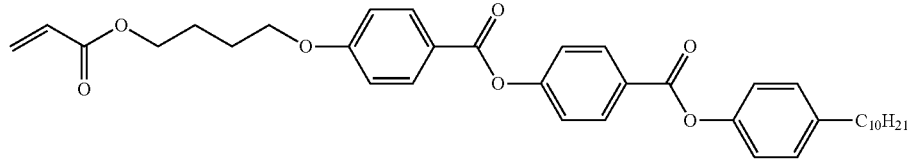
(I-10)
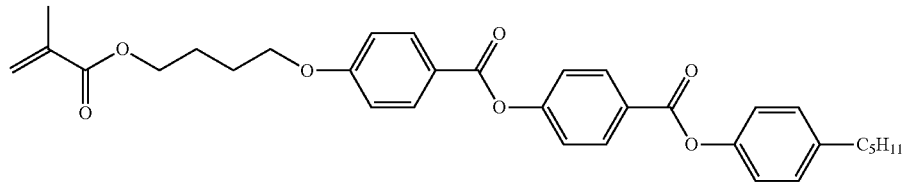
(I-11)

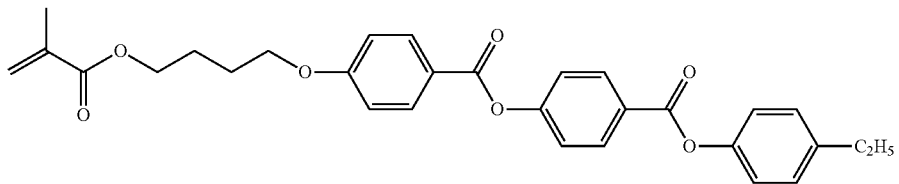
(I-12)
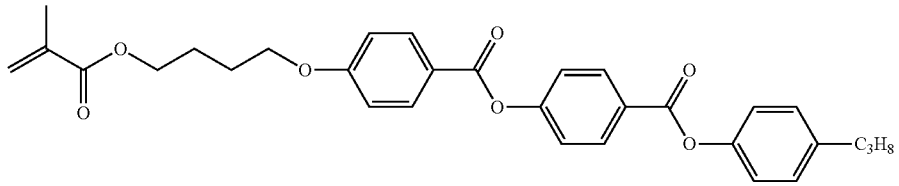
(I-13)
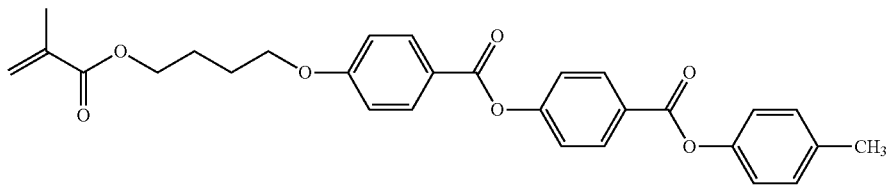
(I-14)
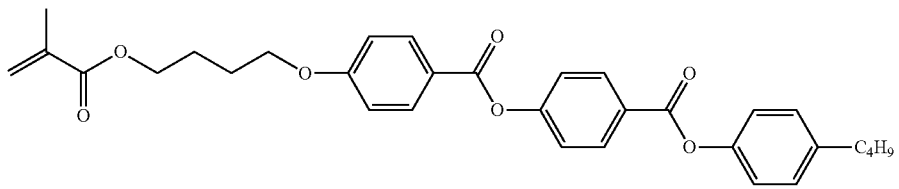
(I-15)
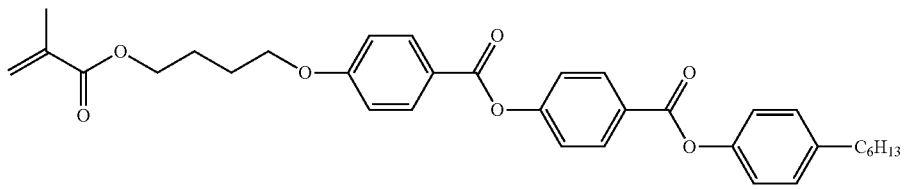
(I-16)
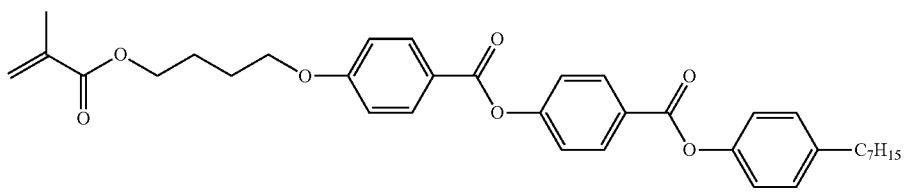
(I-17)
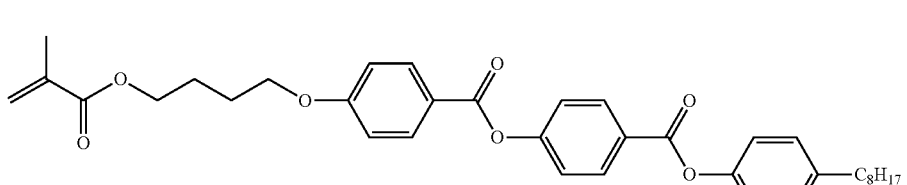
(I-18)
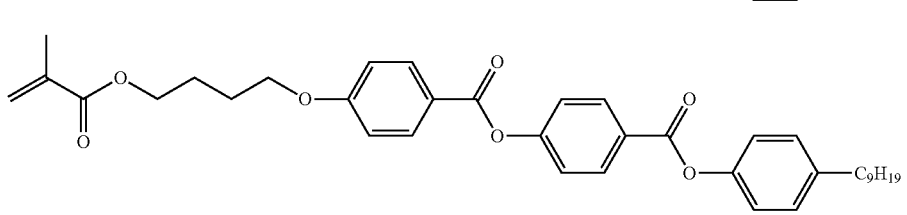
(I-19)

-continued
(I-20)
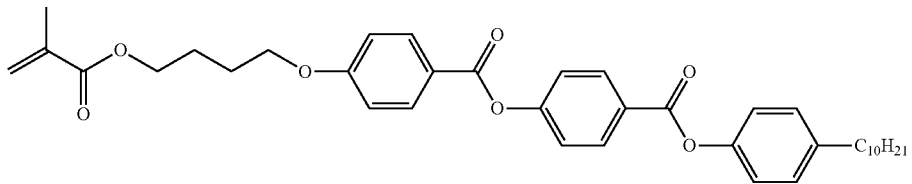
(I-21)
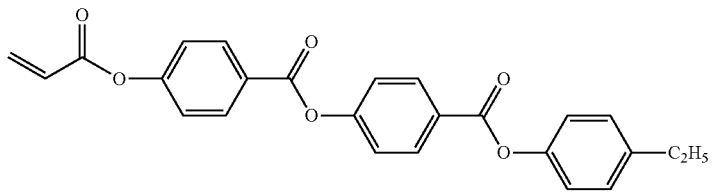
(I-22)
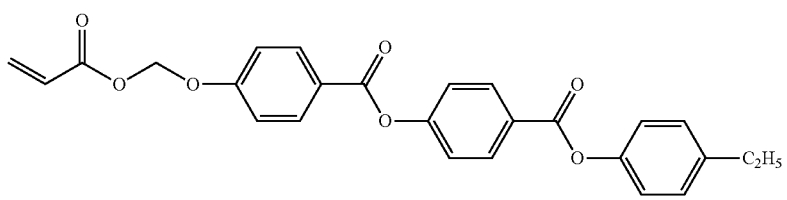
(I-23)
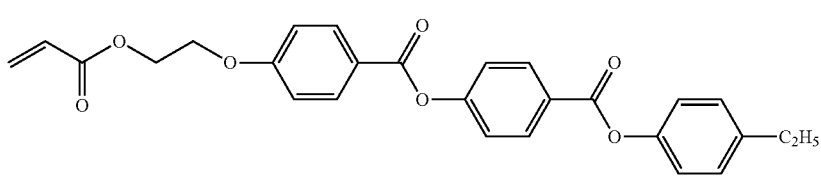
(I-24)
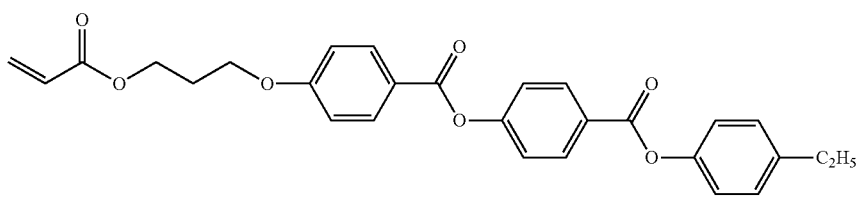
(I-25)
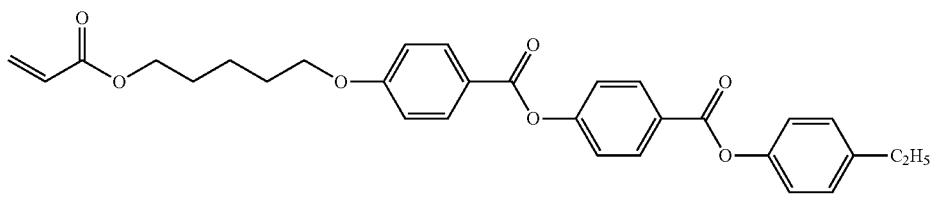
(I-26)
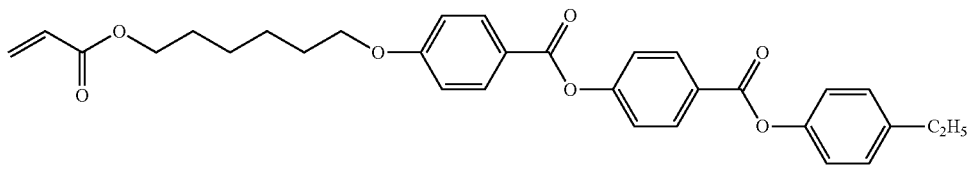
(I-27)
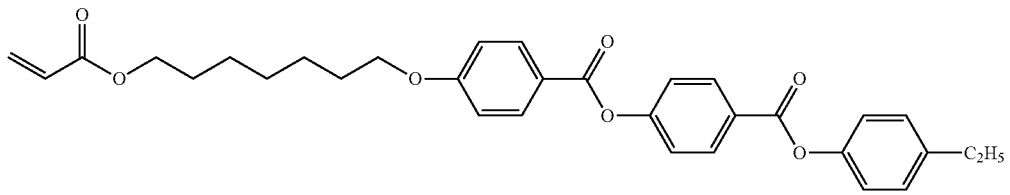

-continued
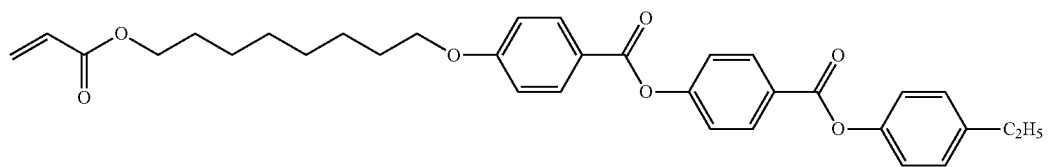
(I-28)
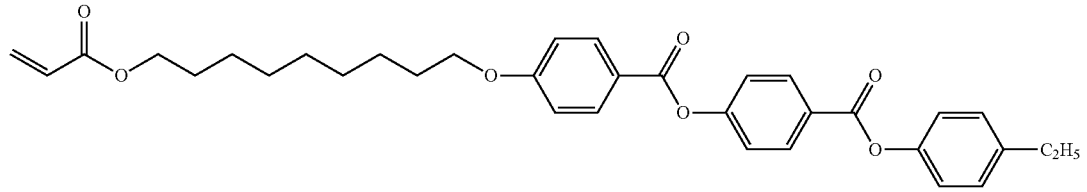
(I-29)
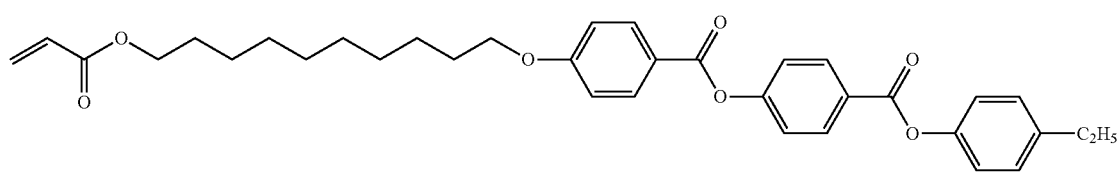
(I-30)
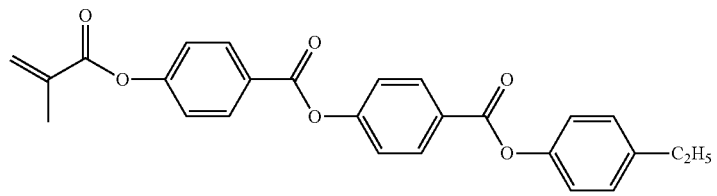
(I-31)
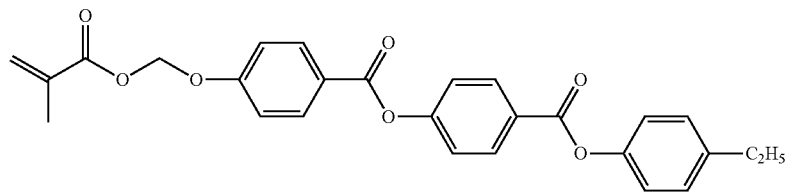
(I-32)
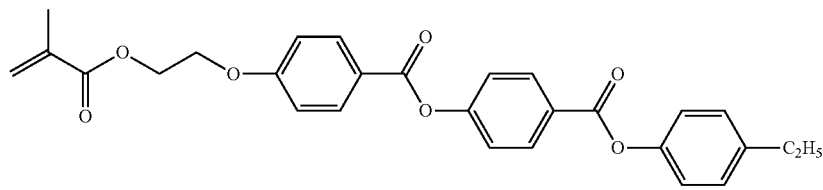
(I-33)
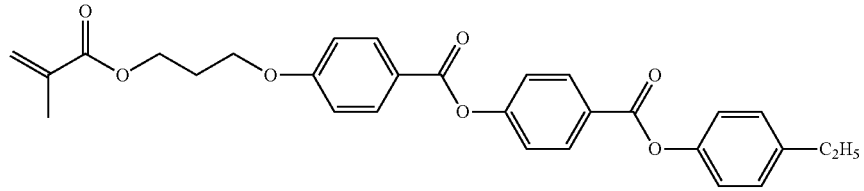
(I-34)
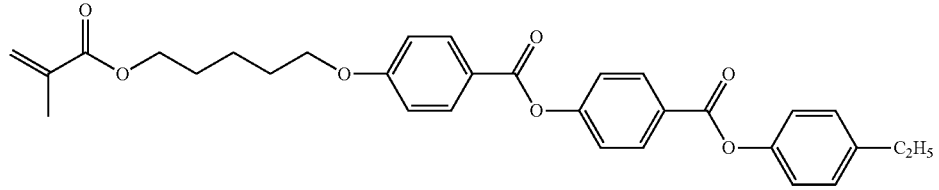
(I-35)

-continued
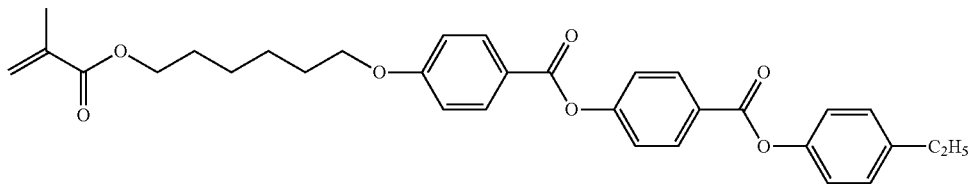
(I-36)
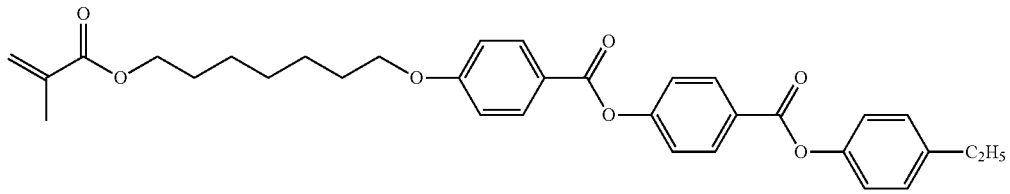
(I-37)
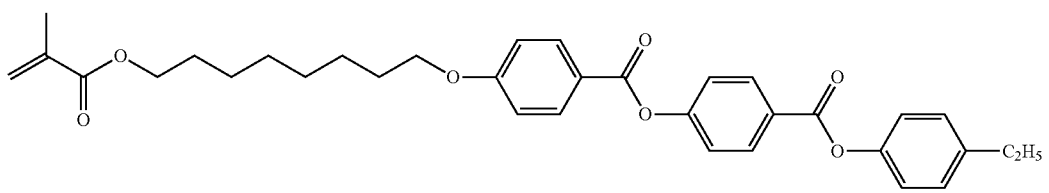
(I-38)
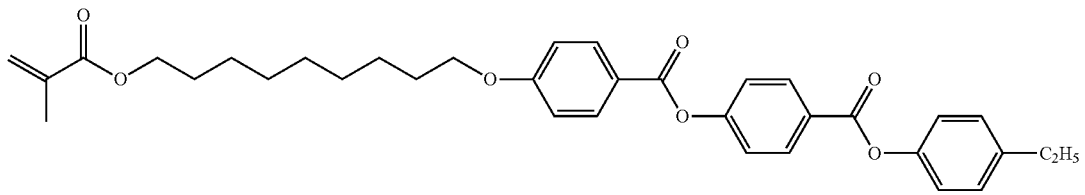
(I-39)
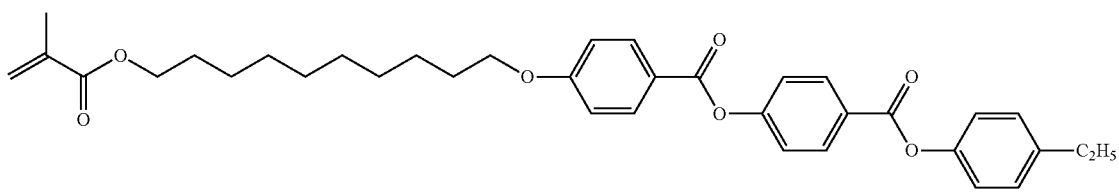
(I-40)
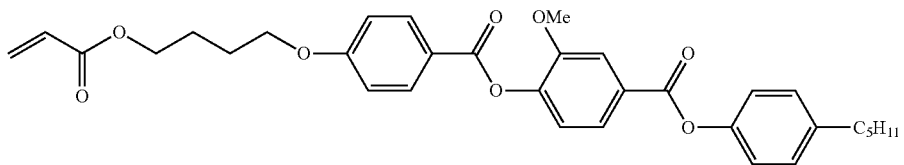
(I-41)
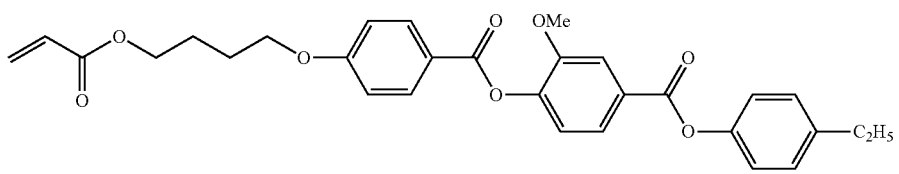
(I-42)
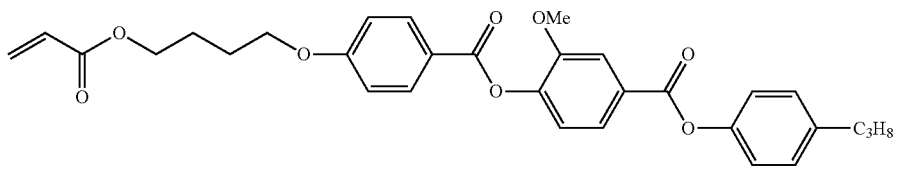
(I-43)

-continued
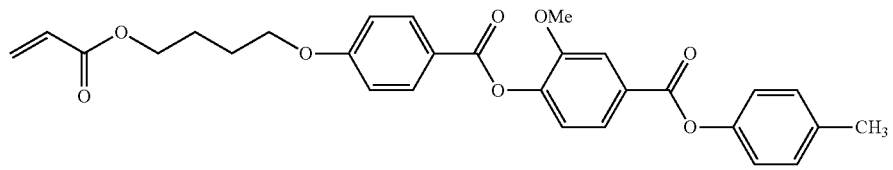
(I-44)
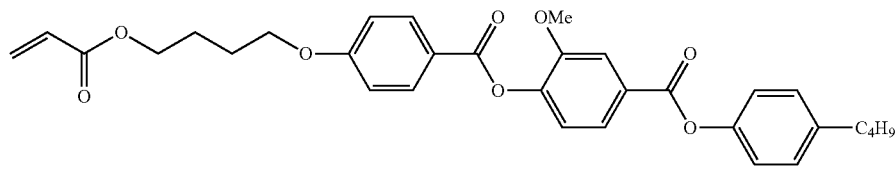
(I-45)
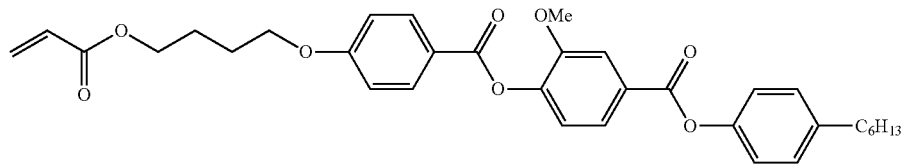
(I-46)
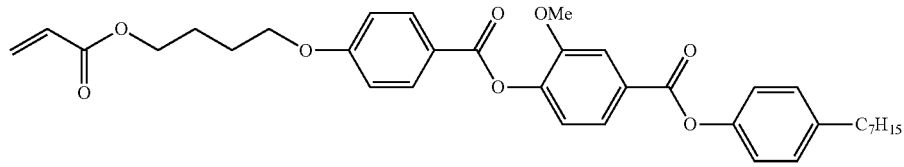
(I-47)
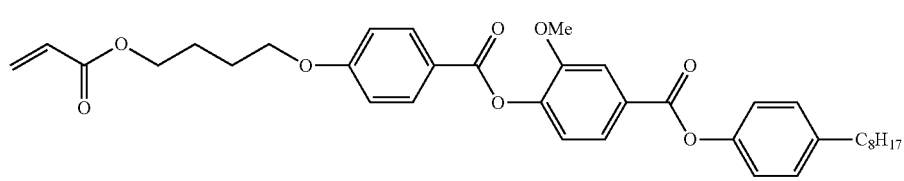
(I-48)
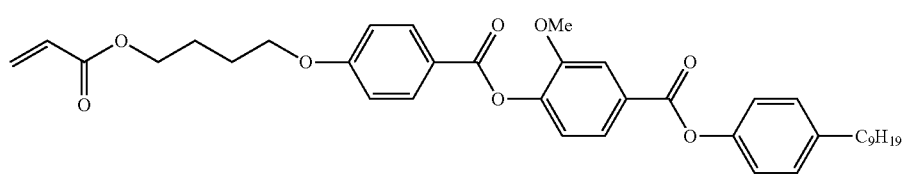
(I-49)
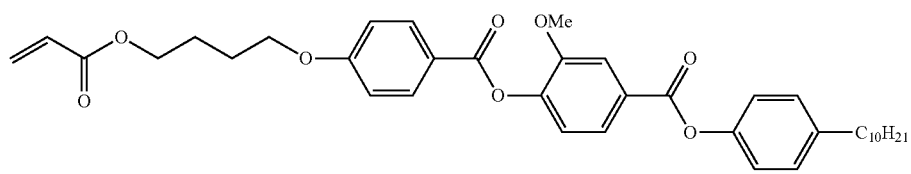
(I-50)
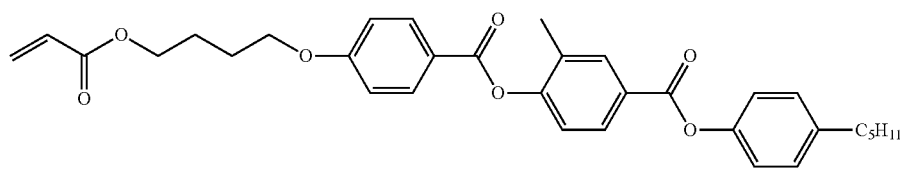
(I-51)
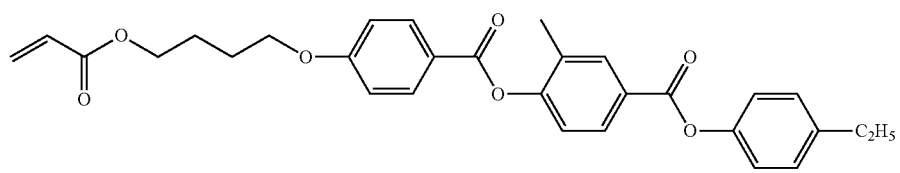
(I-52)

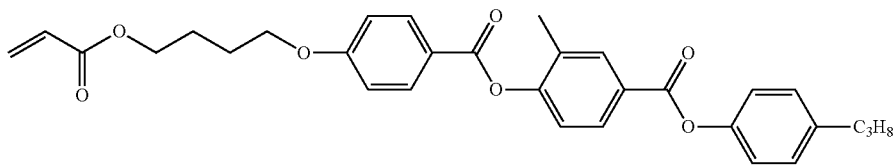
(I-53)
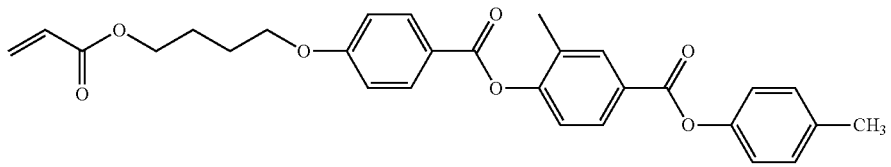
(I-54)
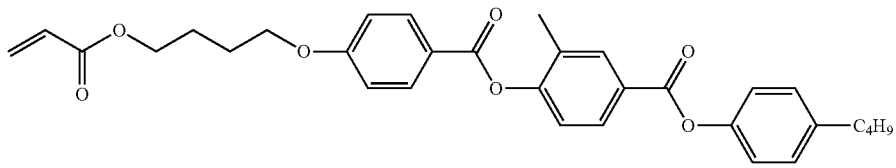
(I-55)
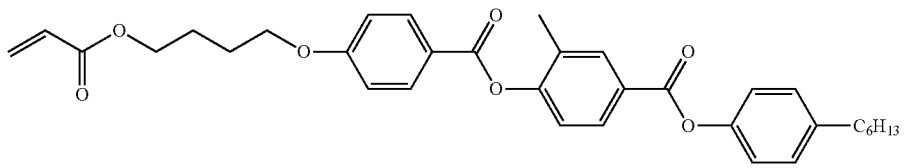
(I-56)
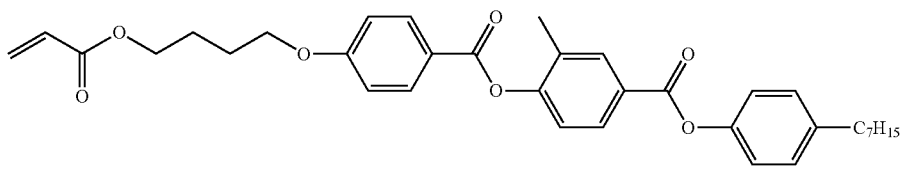
(I-57)
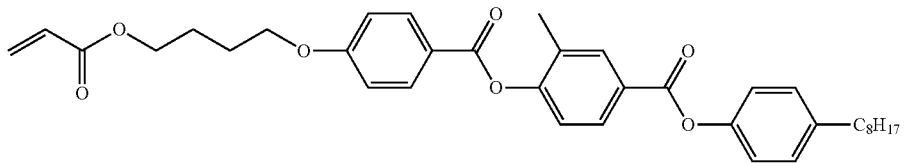
(I-58)
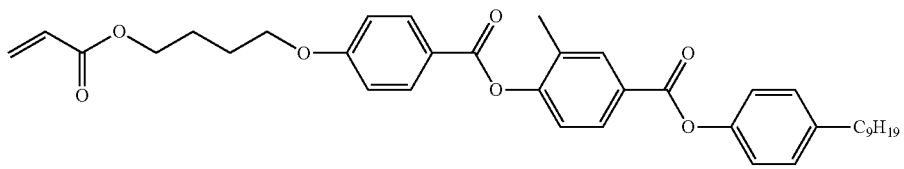
(I-59)
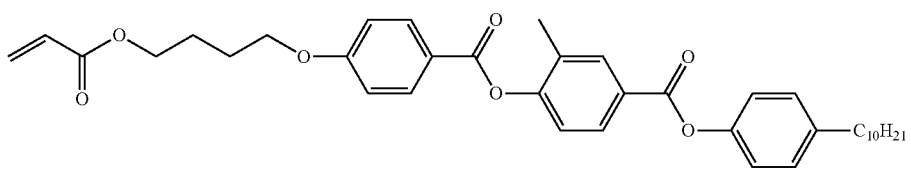
(I-60)
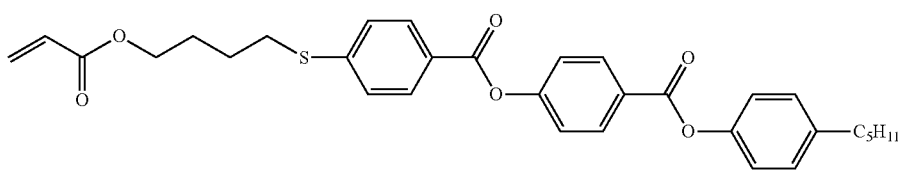
(I-81)

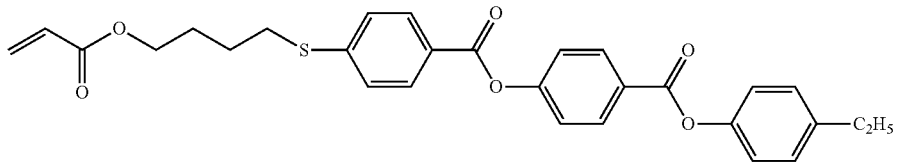
(I-82)
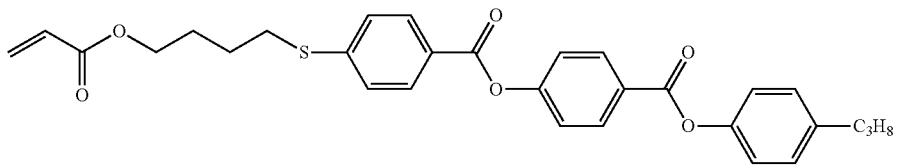
(I-83)
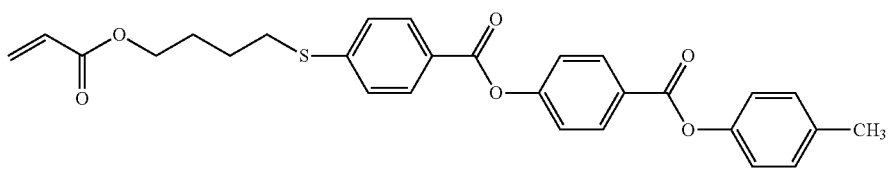
(I-84)
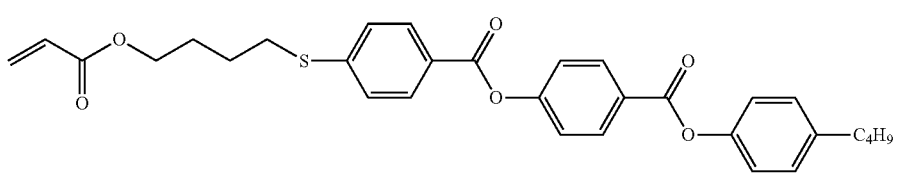
(I-85)
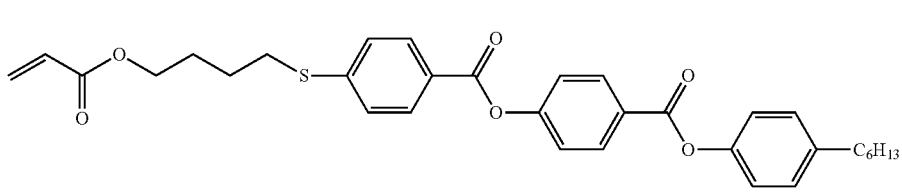
(I-86)
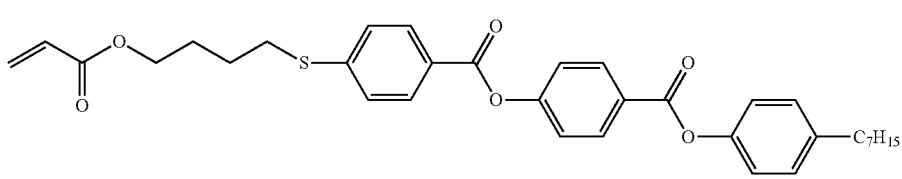
(I-87)
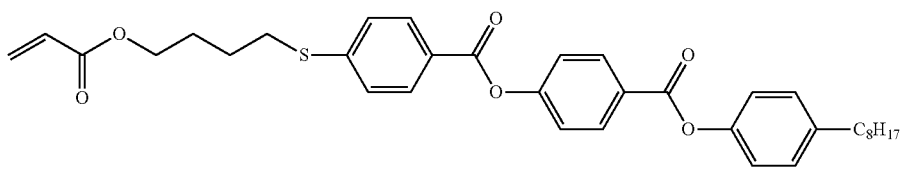
(I-88)
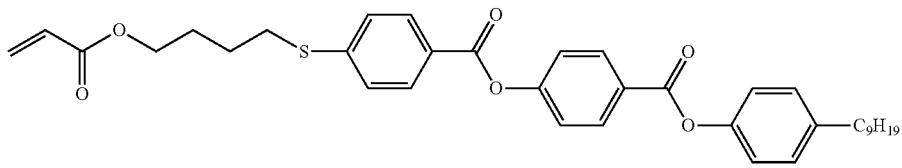
(I-89)
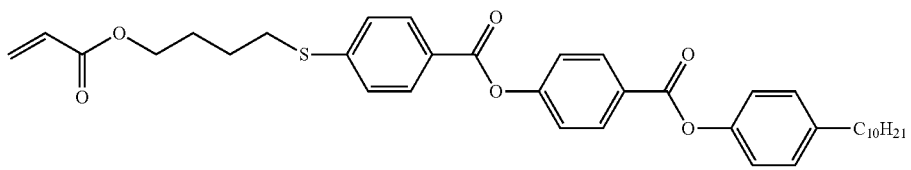
(I-90)

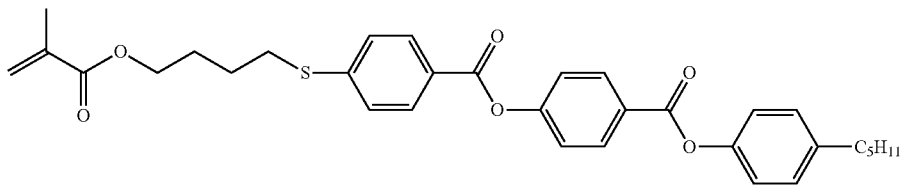 (I-91)
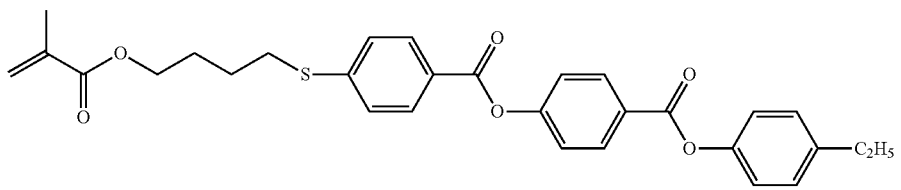 (I-92)
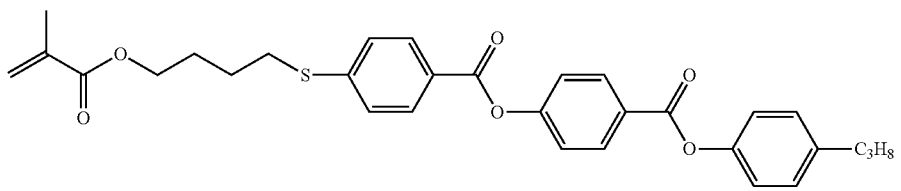 (I-93)
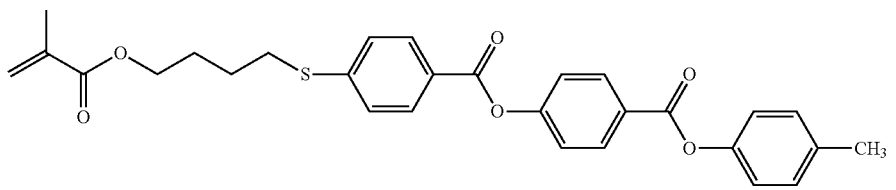 (I-94)
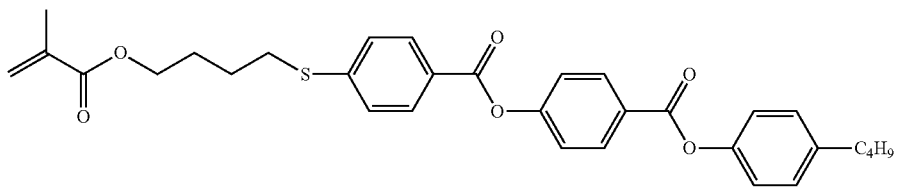 (I-95)
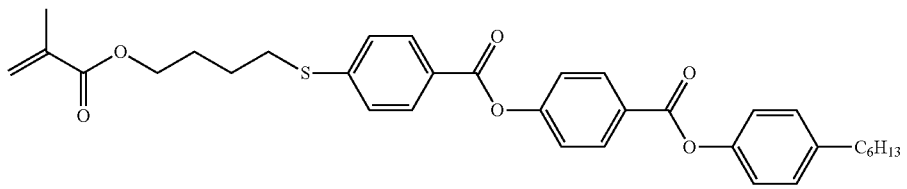 (I-96)
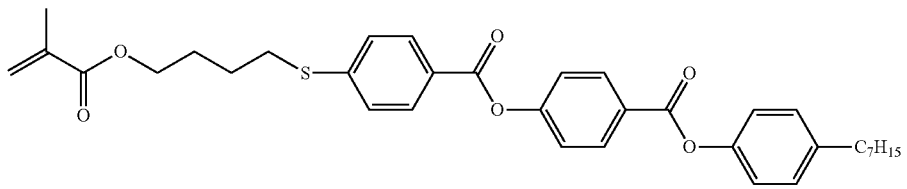 (I-97)
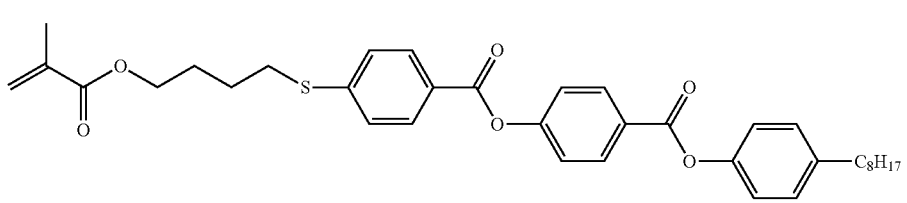 (I-98)

-continued
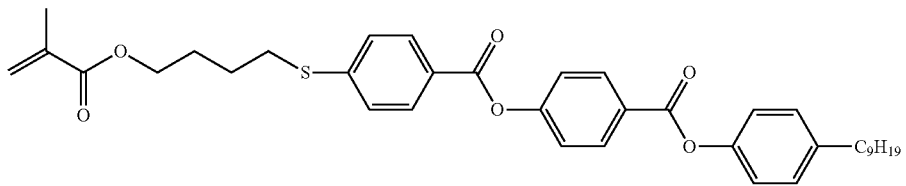
(I-99)
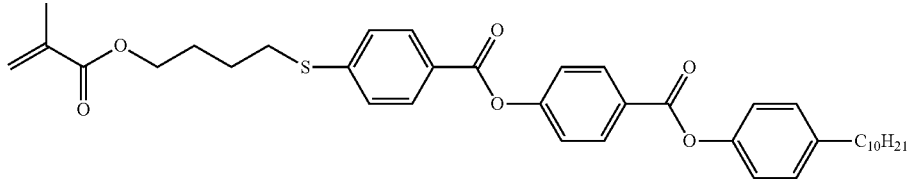
(I-100)
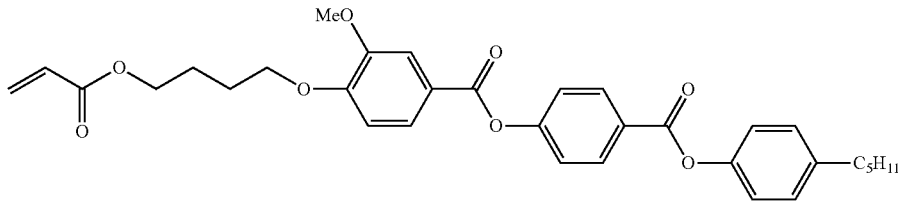
(I-101)
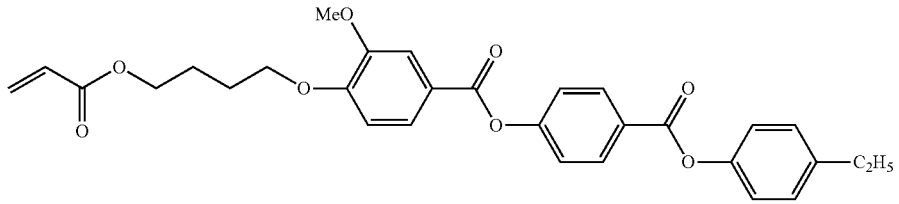
(I-102)
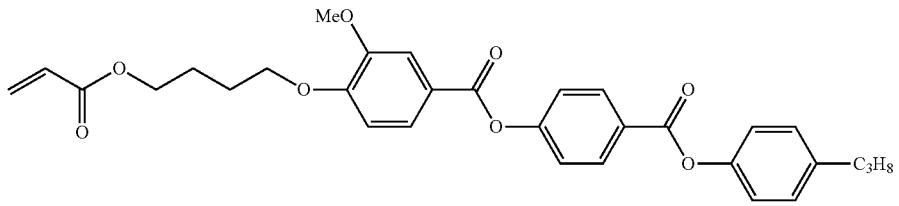
(I-103)
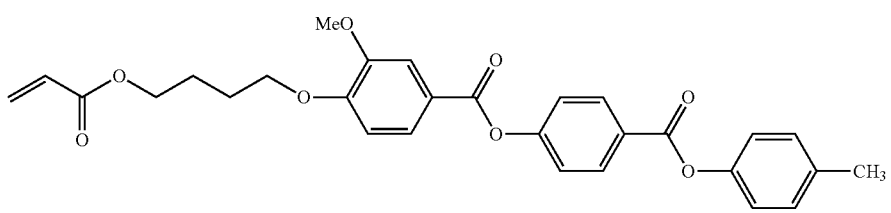
(I-104)
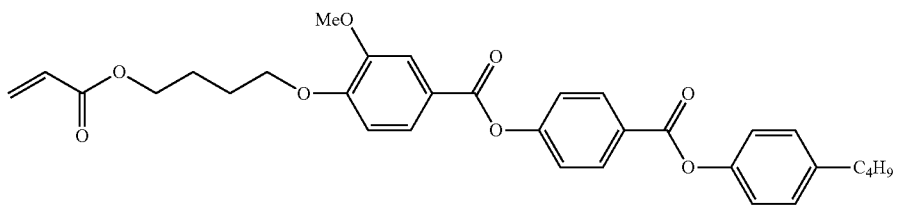
(I-105)

-continued
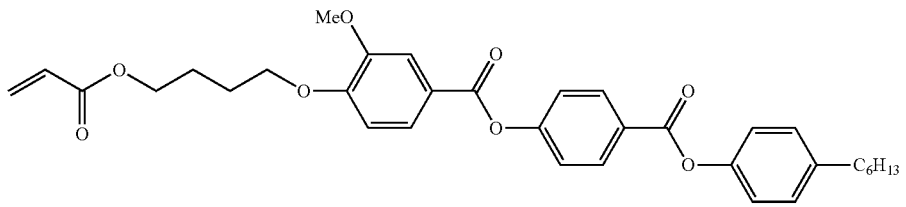
(I-106)
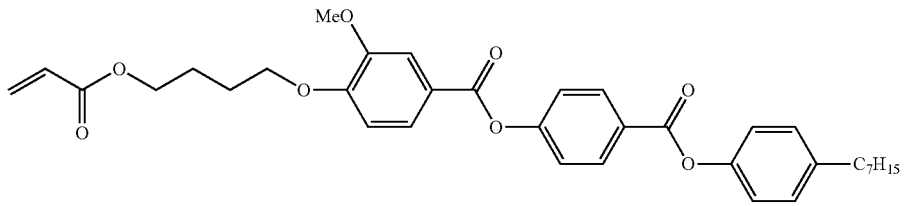
(I-107)
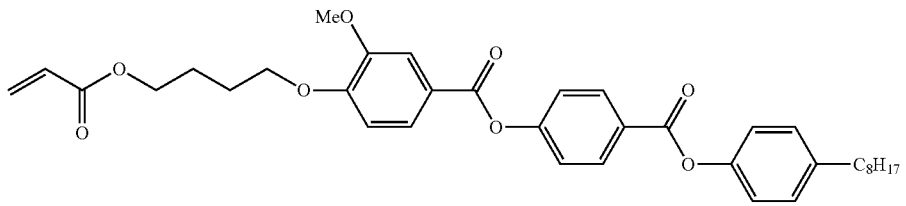
(I-108)
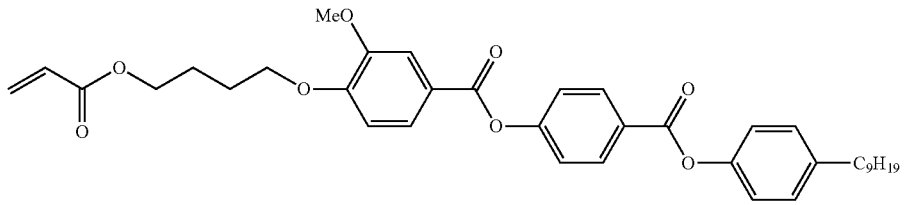
(I-109)
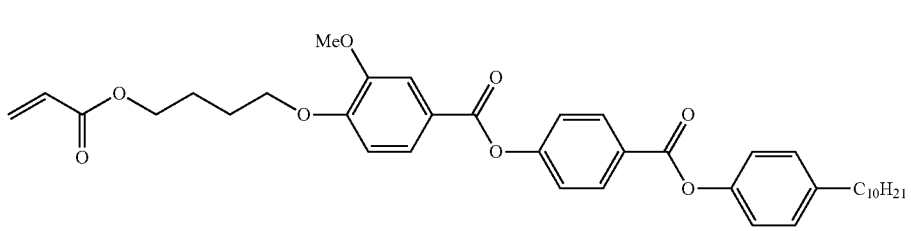
(I-110)
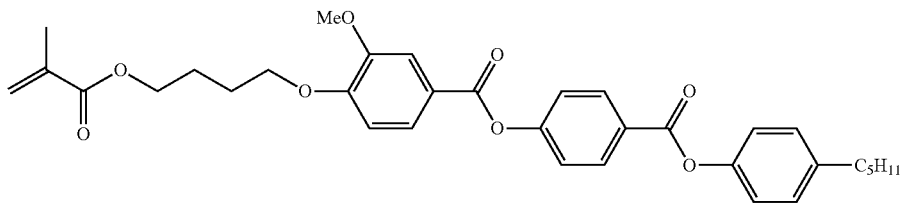
(I-111)
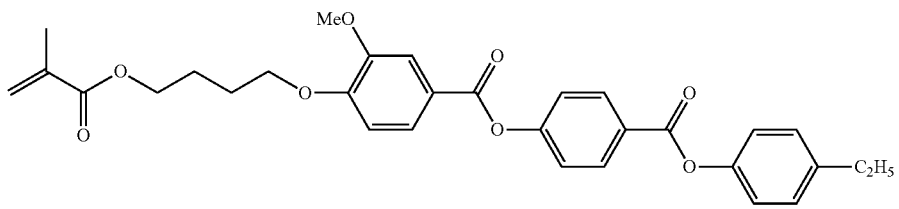
(I-112)

-continued
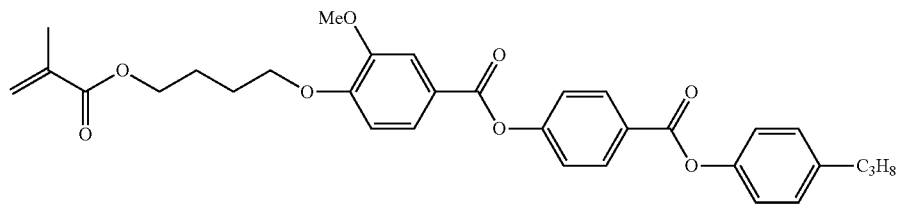
(I-113)
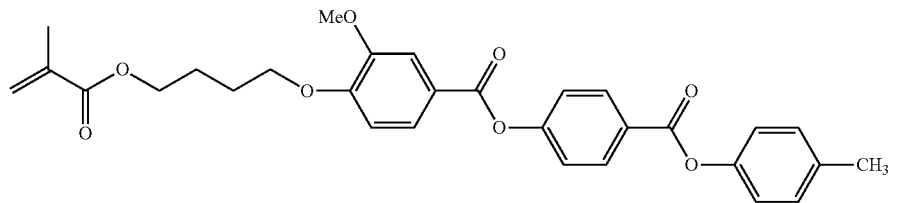
(I-114)
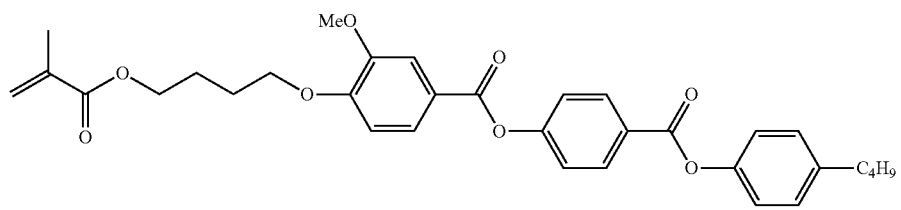
(I-115)
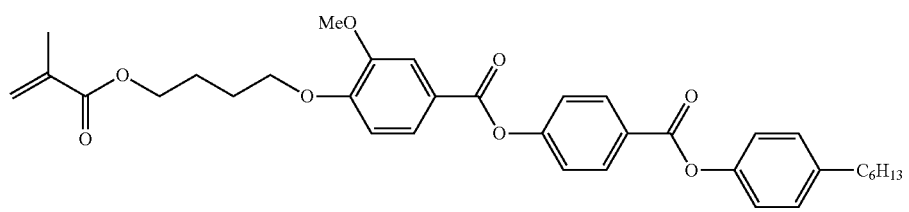
(I-116)
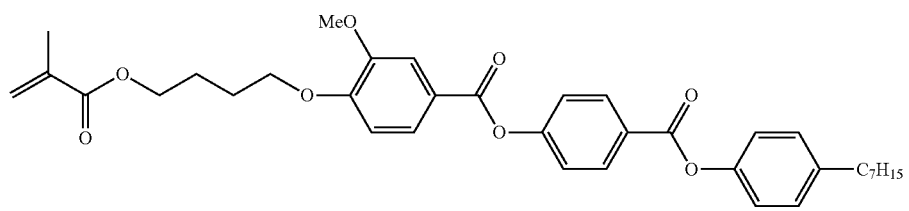
(I-117)
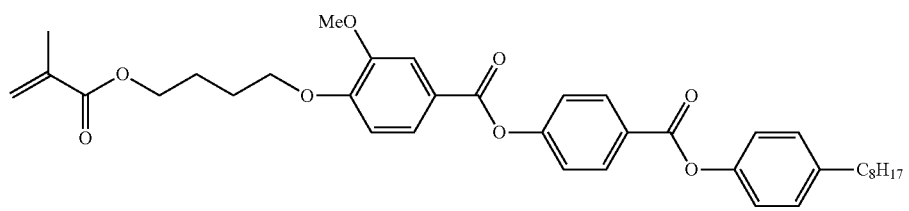
(I-118)
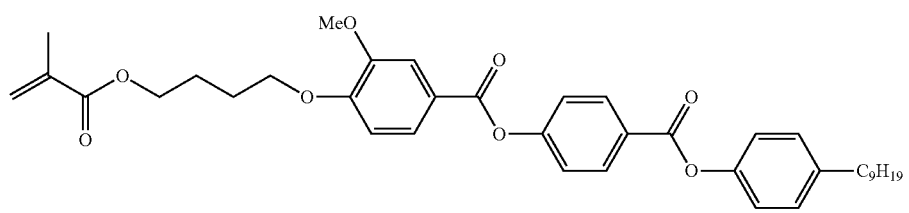
(I-119)

-continued
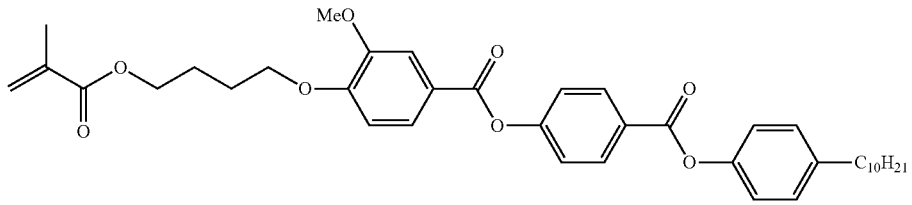
(I-120)
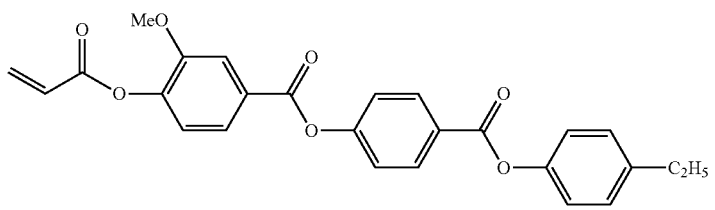
(I-121)
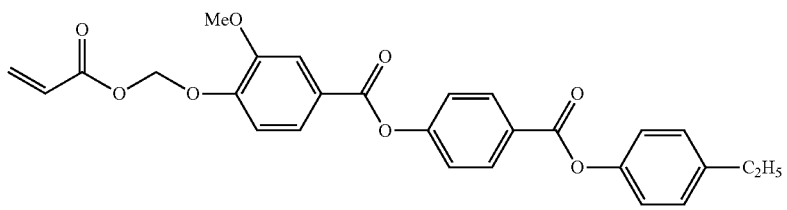
(I-122)
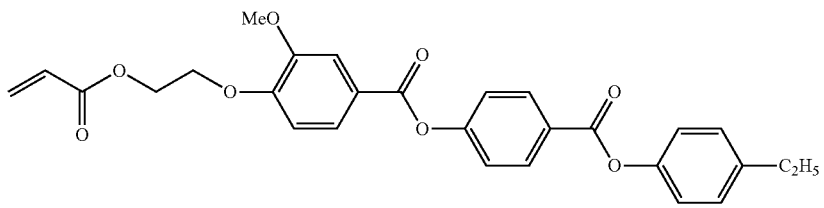
(I-123)
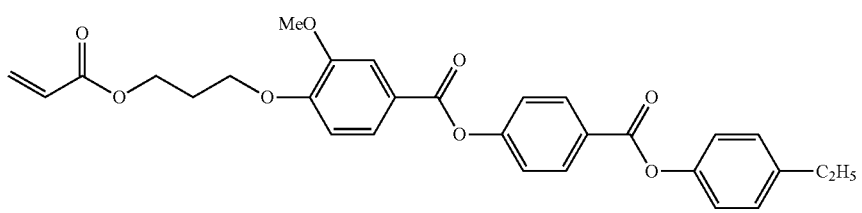
(I-124)
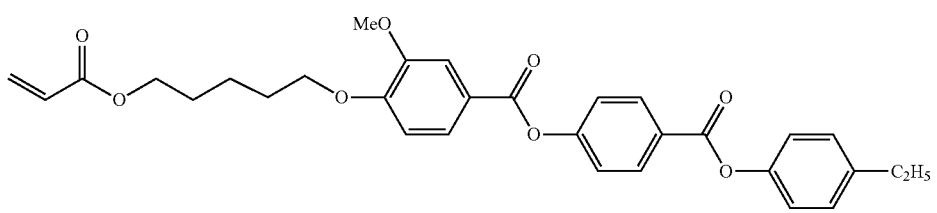
(I-125)
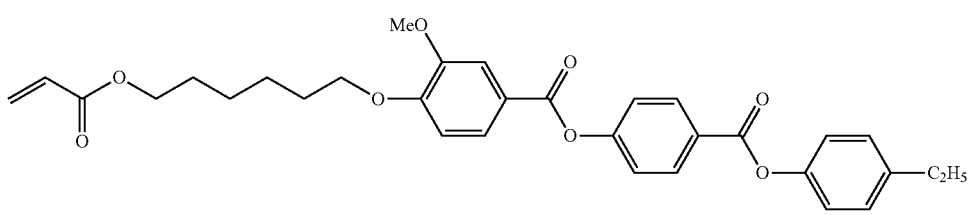
(I-126)

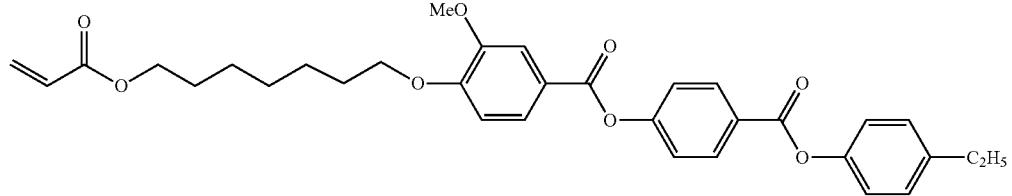
(I-127)
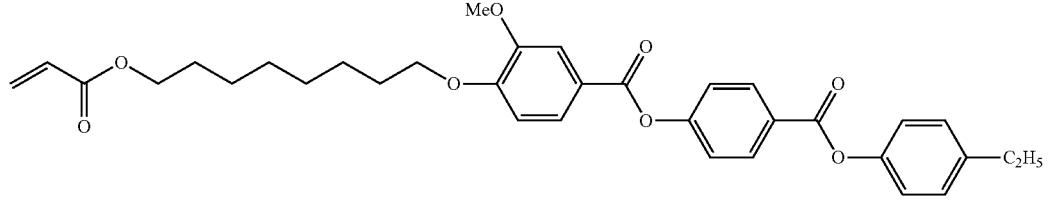
(I-128)
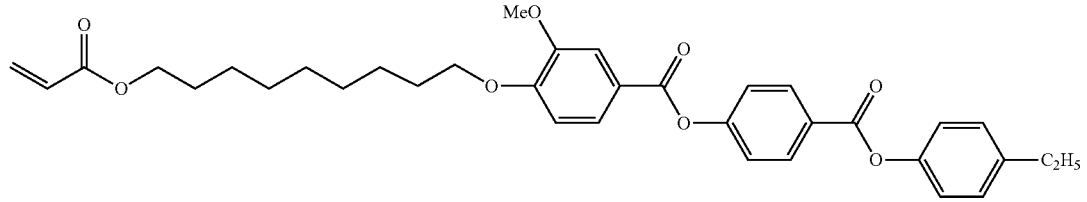
(I-129)
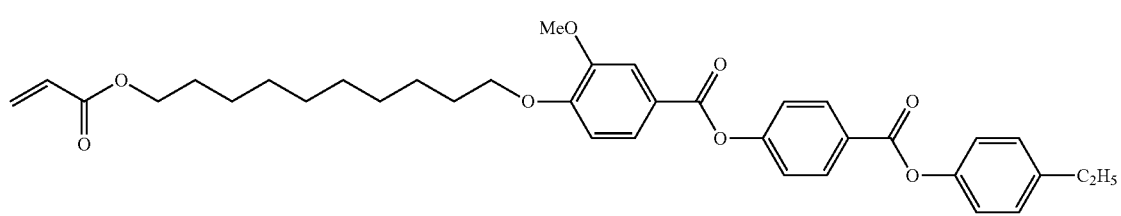
(I-130)
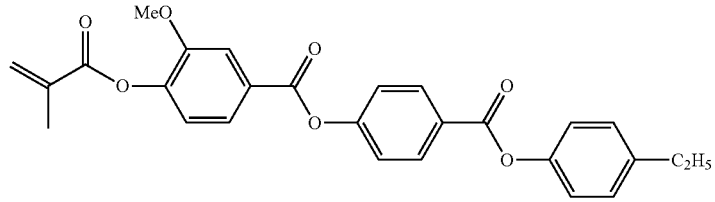
(I-131)
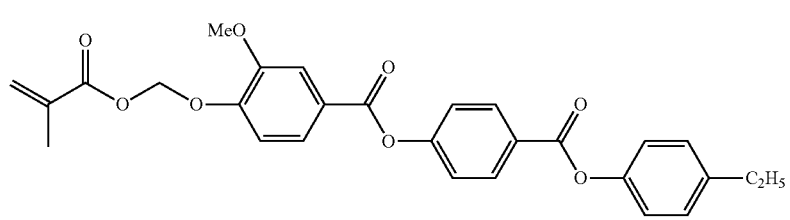
(I-132)
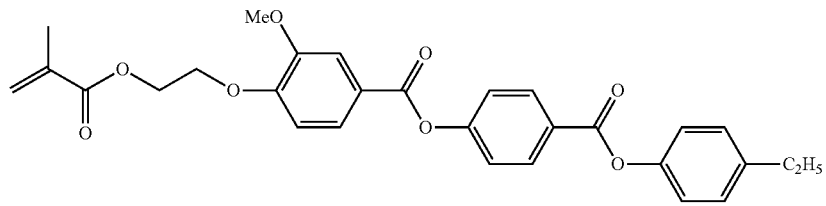
(I-133)

(I-134)
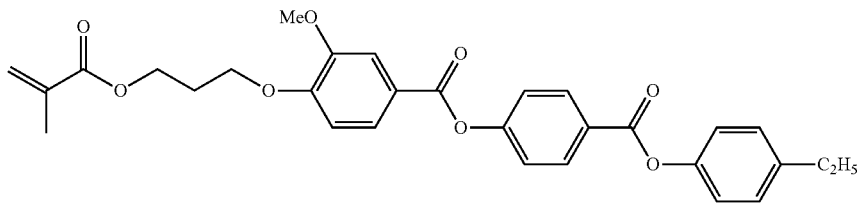
(I-135)
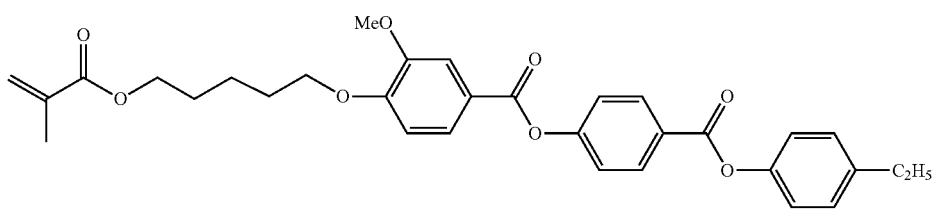
(I-136)
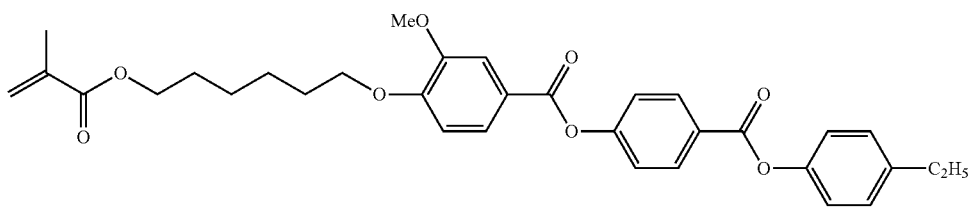
(I-137)
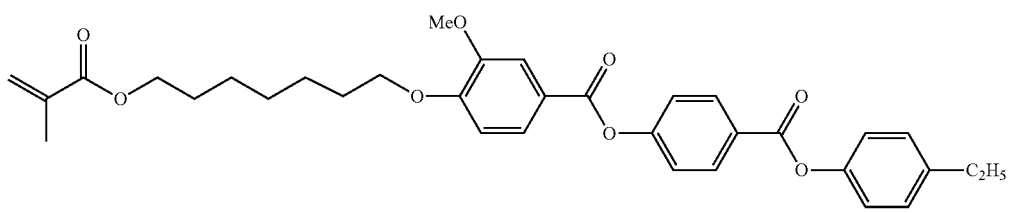
(I-138)
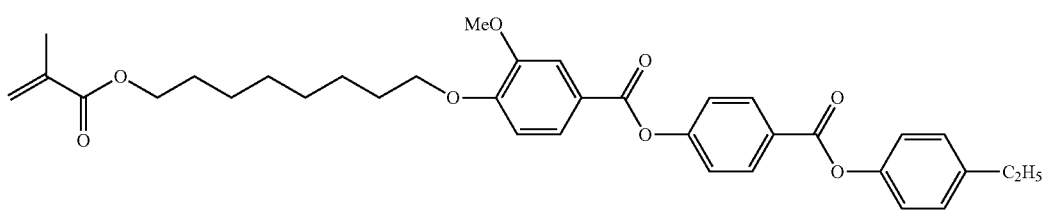
(I-139)
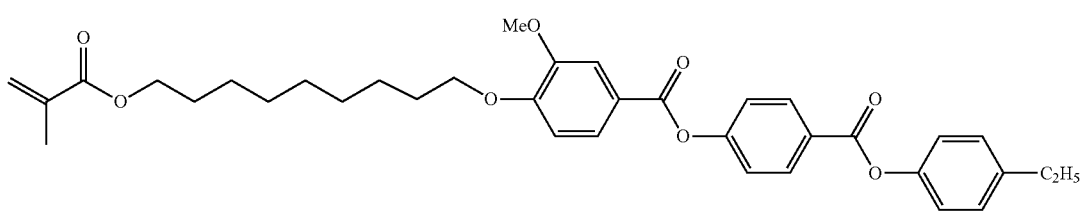
(I-140)
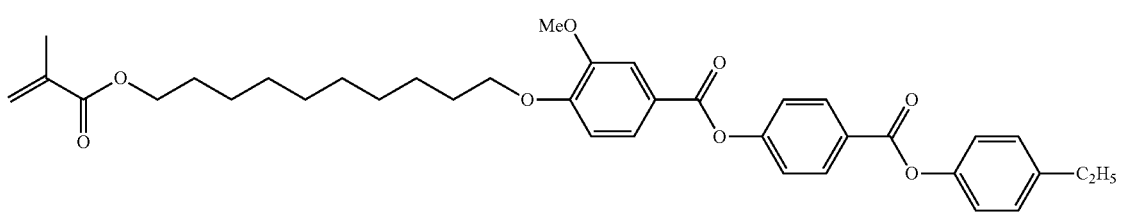

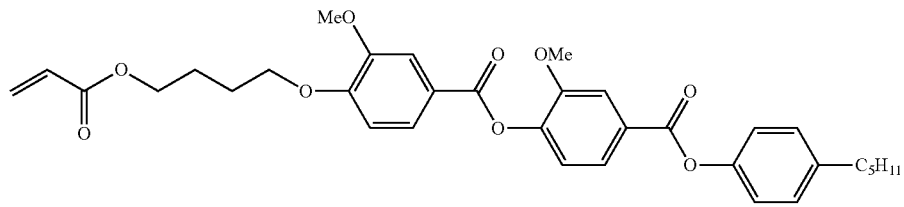
(I-141)
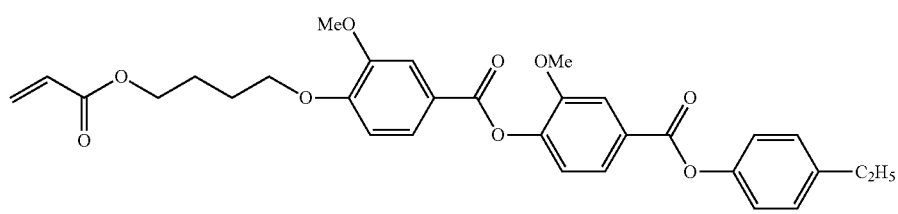
(I-142)
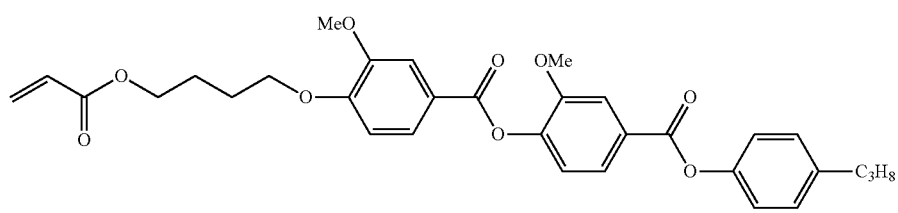
(I-143)
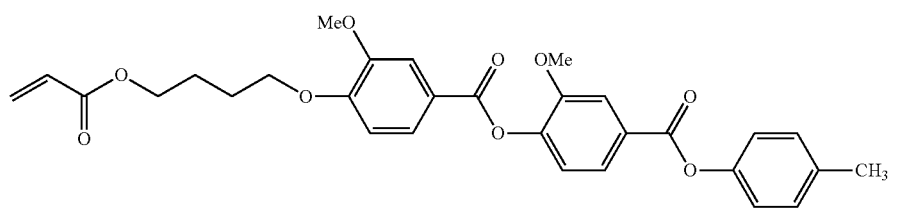
(I-144)
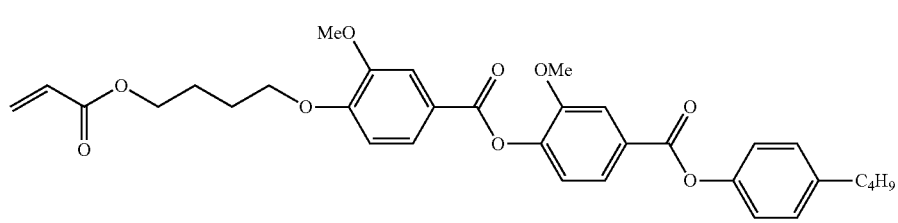
(I-145)
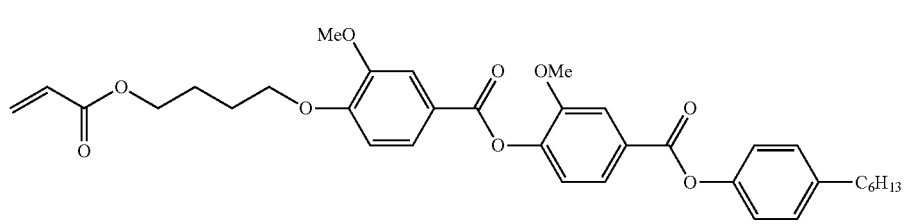
(I-146)
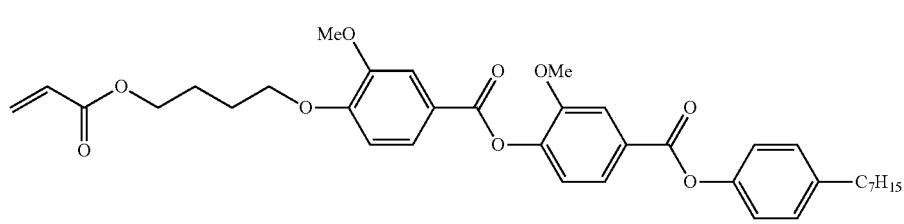
(I-147)

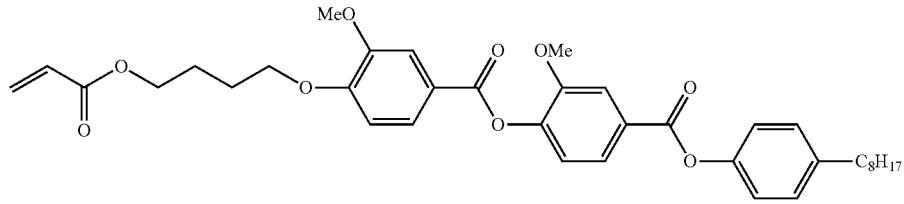
(I-148)
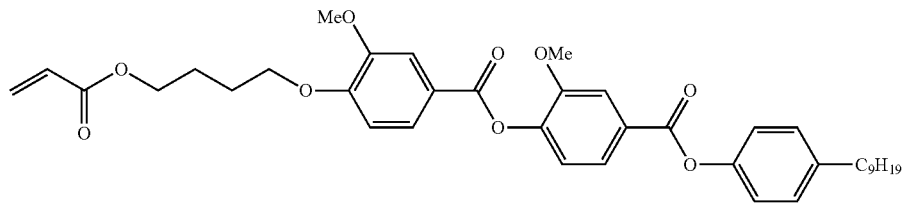
(I-149)
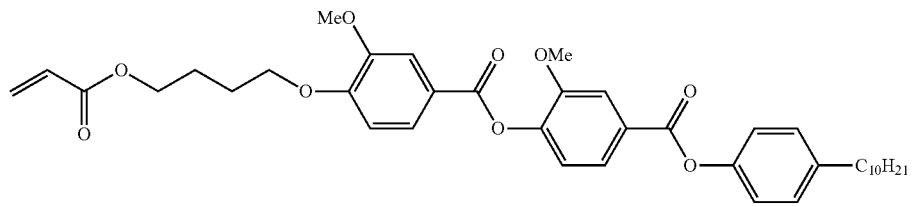
(I-150)
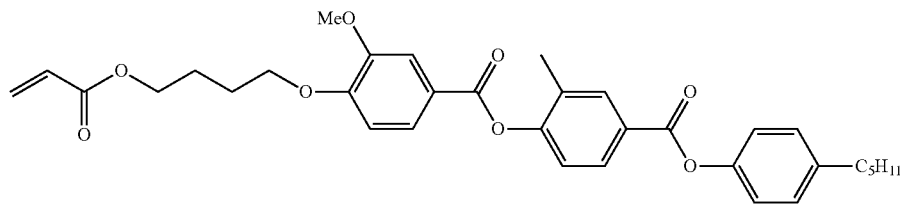
(I-151)
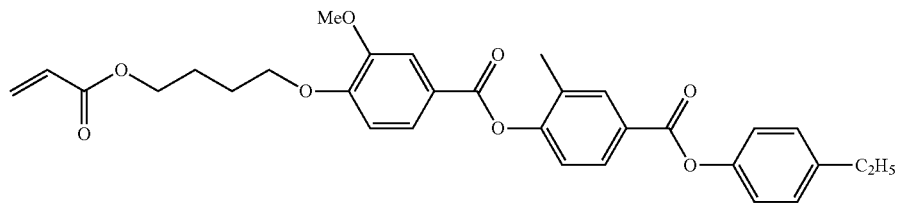
(I-152)
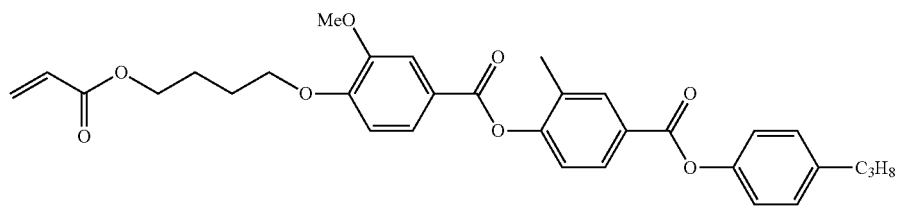
(I-153)
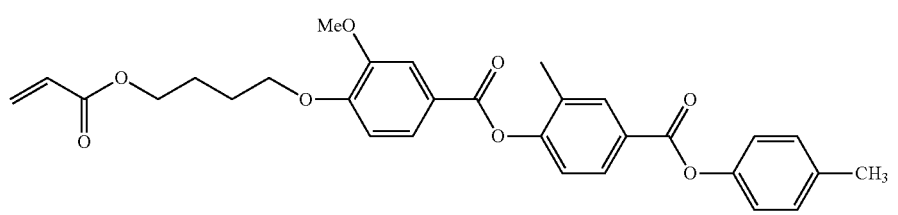
(I-154)

-continued
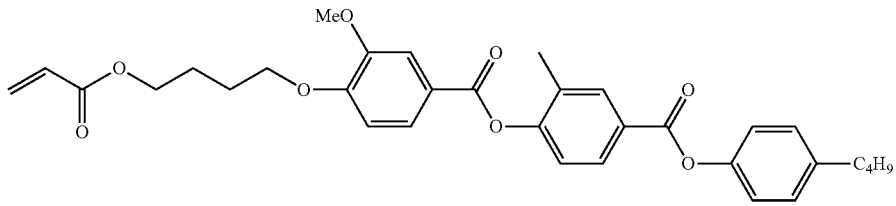
(I-155)
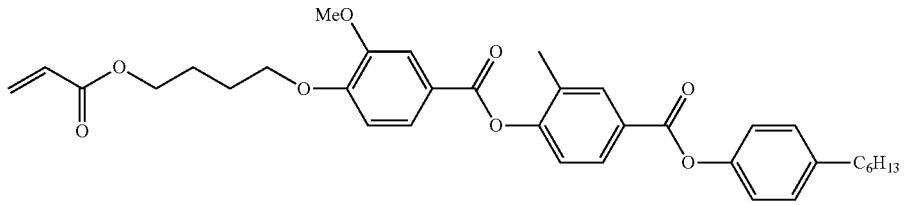
(I-156)
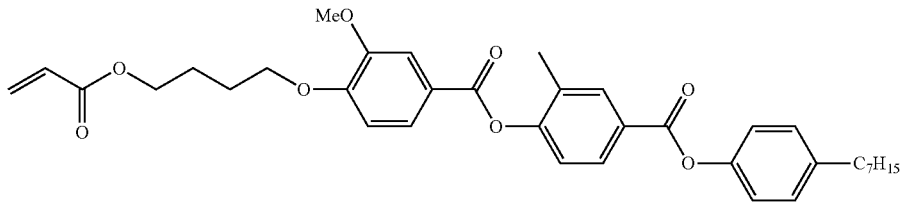
(I-157)
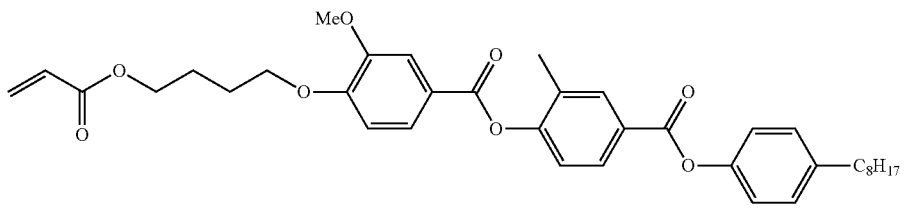
(I-158)
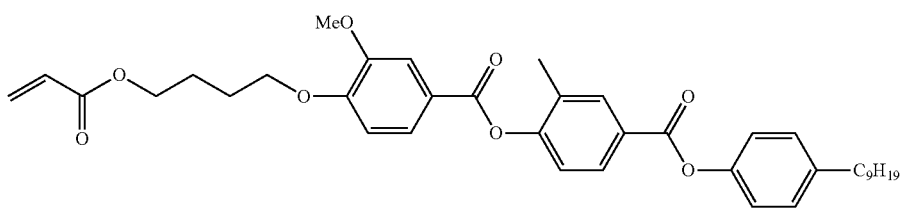
(I-159)
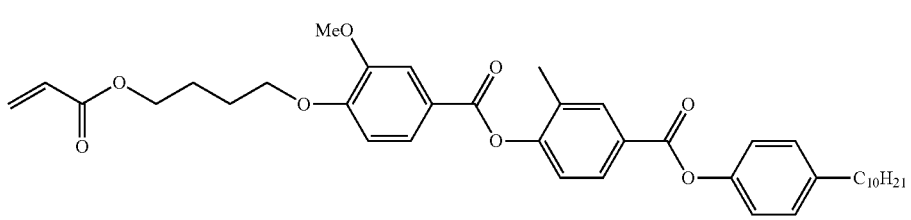
(I-160)
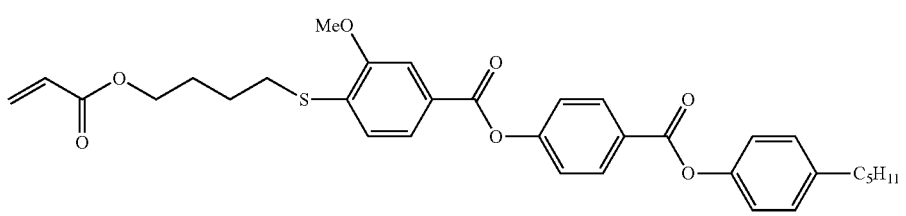
(I-181)

-continued
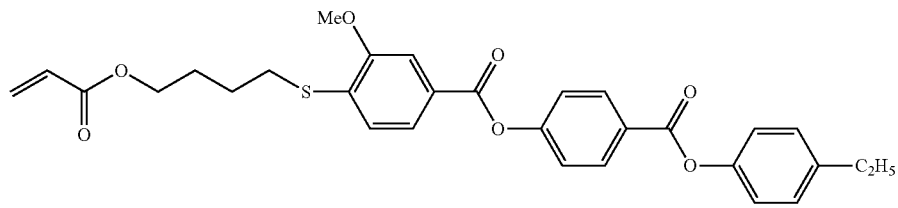
(I-182)
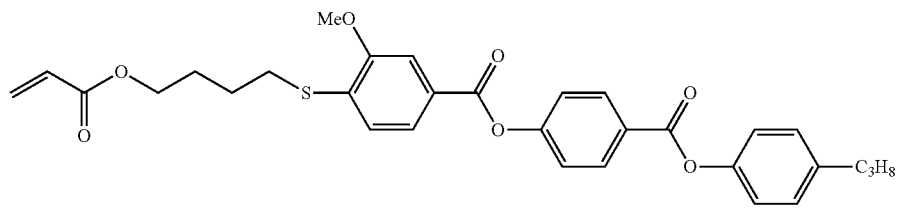
(I-183)
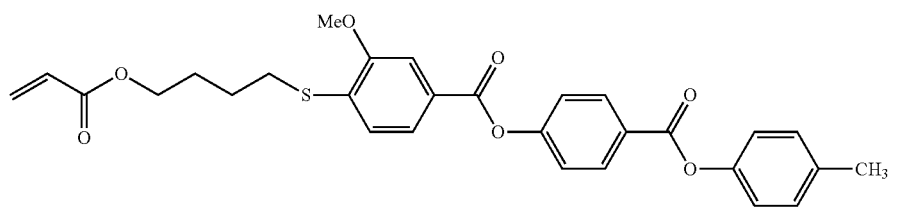
(I-184)
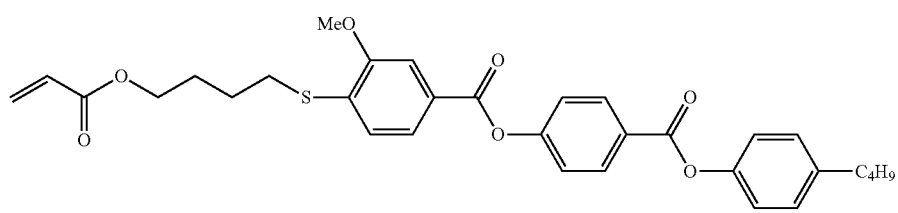
(I-185)
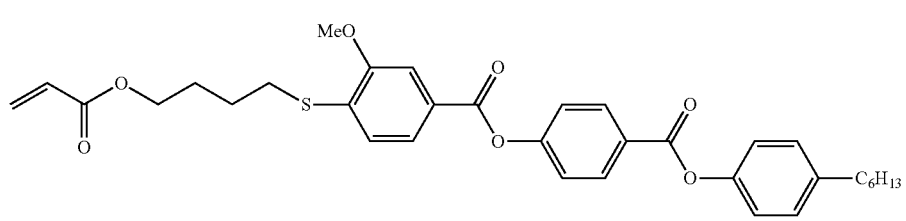
(I-186)
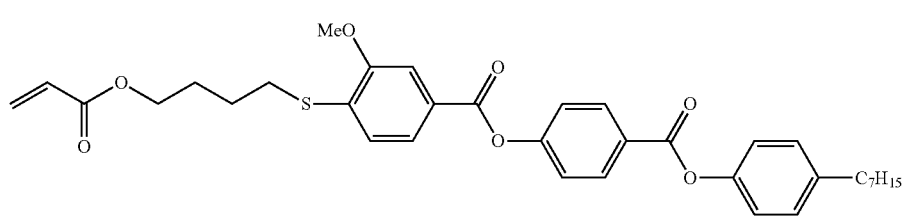
(I-187)
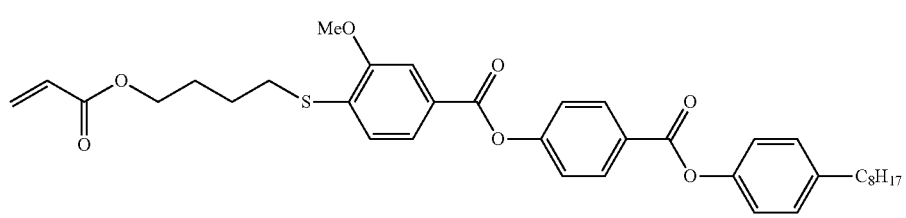
(I-188)

-continued
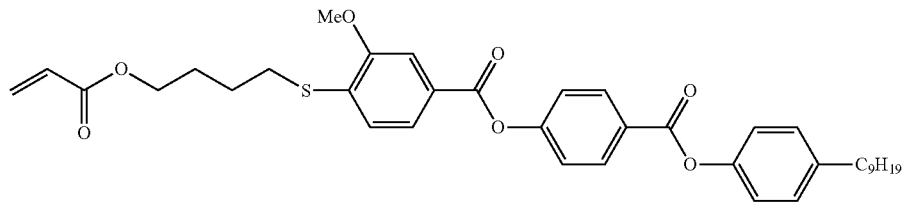
(I-189)
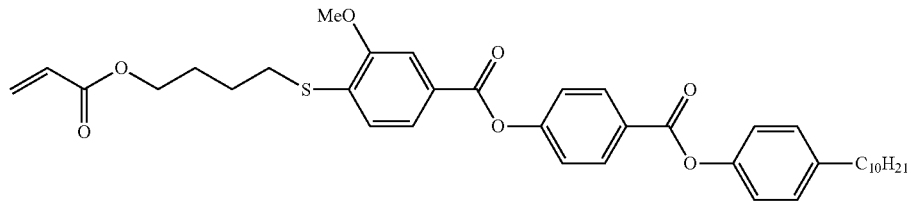
(I-190)
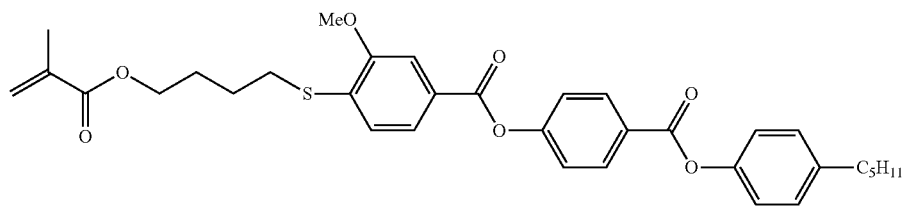
(I-191)
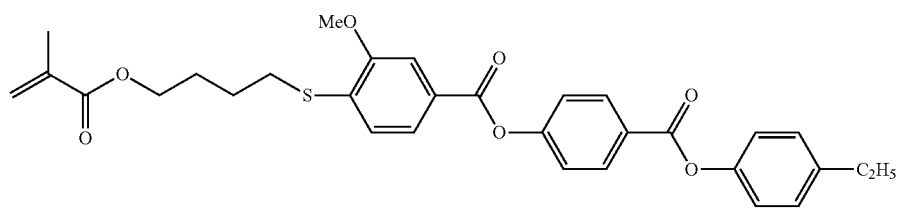
(I-192)
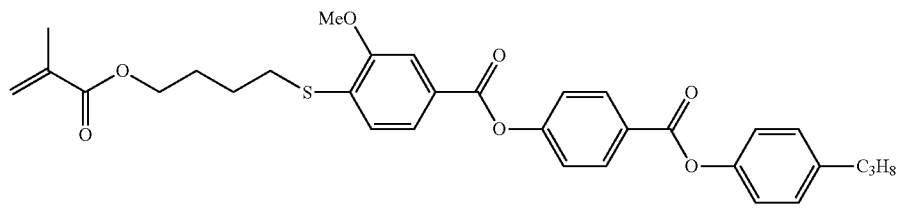
(I-193)
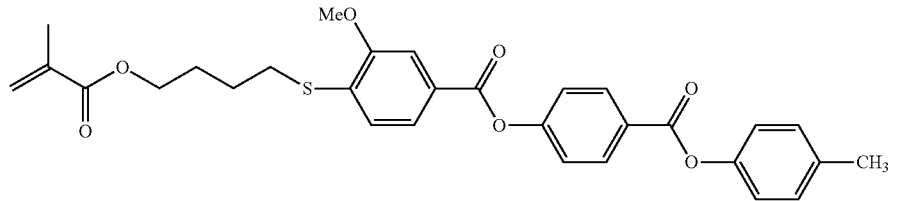
(I-194)
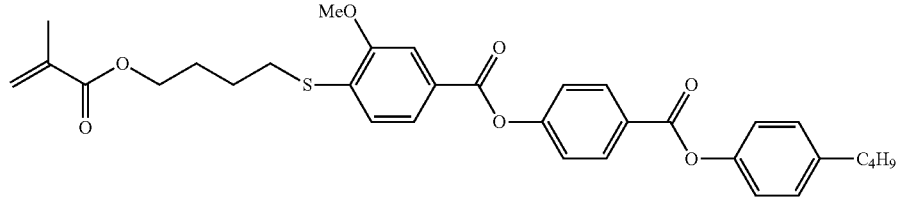
(I-195)

-continued (I-196)
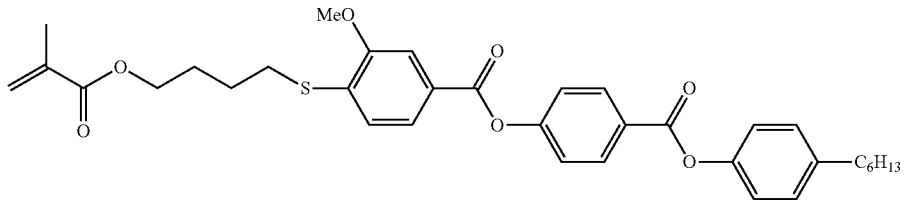

(I-197)
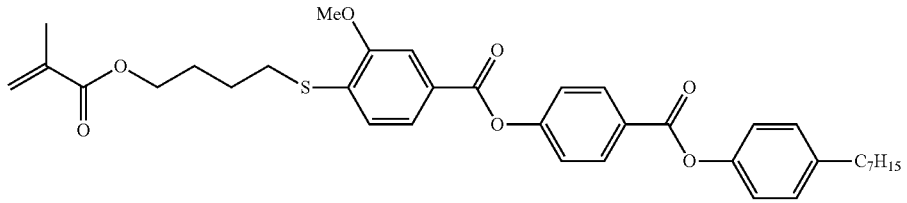

(I-198)
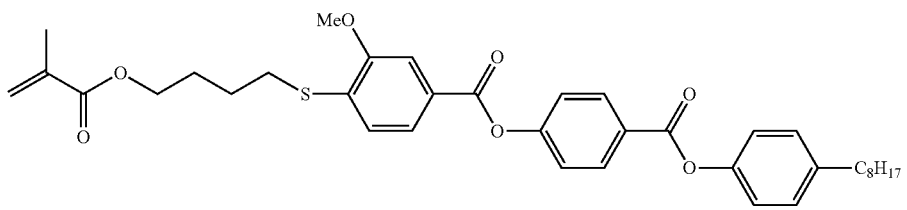

(I-199)
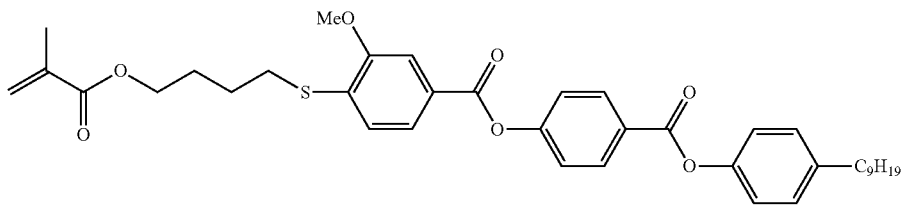

(I-200)
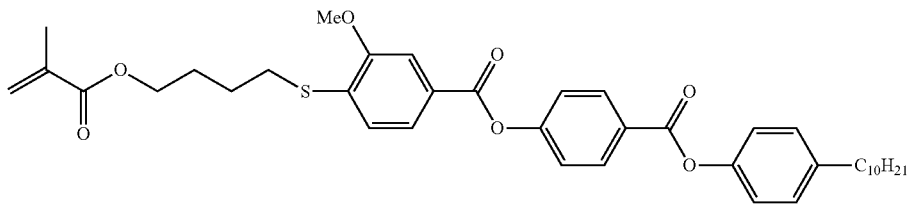

Preferably, in the cholesteric liquid-crystal mixture of the invention, the content of the compound represented by the above general formula (Ib) to the content of the compound represented by the above general formula (Ia) is from 5 to 40% by mass, more preferably from 10 to 30% by mass from the viewpoint of haze reduction, and even more preferably from 15 to 25% by mass. The mixture may contain any other liquid-crystal compound than those of the general formula (Ia) and the general formula (Ib).

<Fluorine-Containing Horizontal Alignment Agent>

An alignment control agent that contributes toward stable and rapid formation of a liquid-crystal phase (for example, cholesteric liquid-crystal phase) is added to the cholesteric liquid-crystal mixture of the invention.

Examples of the fluorine-containing alignment control agent include fluoro(meth)acrylate polymers. The mixture may contain two or more fluorine-containing alignment control agents. The fluorine-containing alignment control agents may reduce the tilt angle of the molecules of a liquid-crystal compound or may align the molecules thereof substantially horizontally in the air interface of the layer. In this description, "horizontal alignment" means that the major axis of the liquid-crystal molecule is parallel to the film surface, but does not require that the two are strictly parallel to each other. In this description, the alignment means that the tilt angle of the molecule to the horizontal plane is less than 20 degrees. In case where a liquid-crystal compound is horizontally aligned near the air interface, alignment defect would hardly occur and therefore the transparency in the visible light region could be high. On the other hand, when the molecules of a liquid-crystal compound are aligned at a large tilt angle, for example, in a cholesteric liquid-crystal phase, then the helical axis thereof may deviate from the normal line of the film plane and, as a result, the reflectance may lower and there may be formed finger print patterns to thereby unfavorably cause haze increase and diffraction.

Examples of the fluoro(meth)acrylate polymer usable as the above-mentioned fluorine-containing alignment control agent are described in JP-A 2007-272185, [0018] to [0043], etc.

Examples of a liquid crystal alignment promoter that comprises a discotic core and has, at the terminal thereof, a long-chain fluoroalkyl group and that is also usable as the above-mentioned fluorine-containing alignment control agent are described in JP-A 2002-129162.

As the fluorine-containing alignment control agent, also preferred here are compounds represented by the following general formula (1):

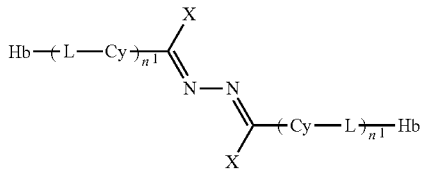

General Formula (1)

In the general formula (1), X independently represents a hydrogen atom, or an alkyl group having from 1 to 4 carbon atoms; Cy independently represents a cyclic structure-having divalent group which may optionally have a substituent; L independently represents a single bond, —O—, —CO—, —NR— (R represents a hydrogen atom or an alkyl group having from 1 to 6 carbon atoms), an alkylene group or a fluoroalkylene group, or a group of a combination of these; Hb independently represents a fluoroalkylene group having from 2 to 30 carbon atoms; n1 independently indicates 1 or 2. In the formula, multiple Hb's, L's, Cy's, X's and n1's each may be the same or different.

Preferred are compounds represented by the following general formula (2):

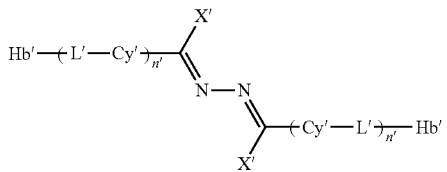

General Formula (2)

In the general formula (2), X' independently represents a hydrogen atom, or an alkyl group having from 1 to 4 carbon atoms; Cy' independently represents a cyclic structure-having divalent group which may optionally have a substituent; L' independently represents a single bond, —O—, —CO—, —S—, —NR'—(R' represents a hydrogen atom or an alkyl group having from 1 to 6 carbon atoms), —SO$_2$—, —C=N—, —C≡C—, an alkylene group or a fluoroalkylene group, or a group of a combination of these; Hb' independently represents a fluoroalkylene group having from 2 to 6 carbon atoms; n' independently indicates 1 or 2. In the formula, multiple (Hb')s, (L')s, (Cy')s, (X')s and (n')s each may be the same or different.

Preferred ranges of L', CY', X', n' and R' in the general formula (2) are the same as the preferred ranges of L, Cy, X, n1 and R in the general formula (1) to be mentioned below. The preferred range of Hb' in the general formula (2) is also the same as the preferred range of Hb in the general formula (1) to be mentioned below except that the carbon number of the former falls within a range of from 2 to 6.

Details of the preferred structure of the haze reducer in the invention, which is represented by the above general formula (1), are described below.

In the general formula (1), X independently represents a hydrogen atom or an alkyl group having from 1 to 4 carbon atoms. The alkyl group having from 1 to 4 carbon atoms, which X may represent, may be linear or branched. For example, there are exemplified a methyl group, an ethyl group, an n-propyl group, an isopropyl group, an n-butyl group. Among them, X is preferably a hydrogen atom, a methyl group, an ethyl group or an n-butyl group, more preferably a hydrogen atom, a methyl group or an ethyl group, even more preferably an ethyl group or a hydrogen atom. Preferably, the general formula (1) has multiple X's.

In the general formula (1), Cy independently represents a cyclic structure-having divalent group which may optionally have a substituent, and is preferably a divalent aromatic hydrocarbon group (hereinafter referred to as an aromatic group) or a divalent heterocyclic group, which may have a substituent, more preferably a divalent aromatic hydrocarbon optionally having a substituent. Preferably, the carbon number of the divalent aromatic hydrocarbon group is from 6 to 22, more preferably from 6 to 14, even more preferably from 6 to 10. Still more preferred is a phenylene group. In case where Cy is a phenylene group, preferably, the group has a chemical bond at the meta-position or the para-position, more preferably at the para-position. The divalent heterocyclic group preferably has a 5-membered, 6-membered or 7-membered hetero ring. More preferred is a 5-membered hetero ring or a 6-membered hetero ring; and most preferred is a 6-membered hetero ring. The hetero atom to constitute the hetero ring is preferably a nitrogen atom, an oxygen atom and a sulfur atom. The hetero ring is preferably an aromatic hetero ring. The aromatic hetero ring is generally an unsaturated hetero ring. More preferred is an unsaturated hetero ring having a largest number of double bonds. Examples of the hetero ring include a furan ring, a thiophene ring, a pyrrole ring, a pyrroline ring, a pyrrolidine ring, an oxazole ring, an isoxazole ring, a triazole ring, an isothiazole ring, an imidazole ring, an imidazoline ring, an imidazolidine ring, a pyrazole ring, a pyrazoline ring, a pyrazolidine ring, a triazole ring, a furazane ring, a tetrazole ring, a pyran ring, a thiine ring, a pyridine ring, a piperidine ring, an oxazine ring, a morpholine ring, a triazine ring, a pyridazine ring, a pyrimidine ring, a pyrazine ring, a piperazine ring and a triazine ring.

The cyclic structure (preferably a divalent aromatic hydrocarbon group or a divalent heterocyclic group) represented by Cy may have a substituent except the two chemical bonds. The substitute position of the substituent is preferably any other position than the ortho-position relative to the position bonding to the azine bond. In case of n1=1, a more preferred substituent position is the meta-position relative to the position bonding to the azine bond.

Examples of the substituent includes an alkyl group having from 1 to 8 carbon atoms, an alkoxy group, a halogen atom, a cyano group, an ester group and those having the same structure as that of Hb-L- in the general formula (1).

The alkyl group as the substituent of Cy may be linear, branched or cyclic, but is preferably linear or branched. The carbon number of the alkyl group is preferably from 1 to 5, more preferably from 1 to 3. Concretely, there are exemplified a methyl group, an ethyl group, an n-propyl group, an isopropyl group, etc. For the alkyl group moiety of the alkoxy group as the substituent of and the preferred range thereof, referred to is the description of the alkyl group as the substituent of Cy mentioned above. Concretely, there are exemplified a methoxy group, and an ethoxy group. The halogen atom as the substituent of Cy includes a fluorine atom, a chlorine atom, a bromine atom and an iodine atom.

Above all, preferred are a chlorine atom and a fluorine atom. Examples of the ester group as the substituent of Cy include groups represented by R⁰COO— or —COOR⁰. R⁰ may be an alkyl group having from 1 to 8 carbon atoms. For the description and the preferred range of the alkyl group for R⁰, referred to are the description and the preferred range of the alkyl group as the substituent of Cy mentioned above. Specific examples of the ester as the substituent of Cy include CH₃COO—, C₂H₅COO— and —COOCH₃. The preferred range of the substituent having the same structure as that of Hb-L- in the general formula (1) as the substituent of Cy is the same as the combination of the preferred ranges of L and Hb to be mentioned hereinunder. In this case, Cy is preferably di-substituted or tri-substituted with two or three (Hb-L-)s, and these (Hb-L-)s may be the same or different. In case where n1 is 2, multiple Cy's each may have a substituent having the same structure as that of Hb-L- in the general formula (1).

Specific examples of the substituent of the cyclic structure (preferably a divalent aromatic hydrocarbon group or a divalent heterocyclic group) represented by Cy include a methyl group, an ethyl group, a methoxy group, an ethoxy group, a fluorine atom, a chlorine atom, a cyano group, Hb-L- in the general formula (1), etc. Multiple Cy's in the general formula (1) are preferably the same. Above all, especially preferred are a methoxy group, an ethoxy group and Hb-L- in the general formula (1); and even more preferred are Hb-L- in the general formula (1).

In case where the group has Hb-L- in the general formula (1) as the substituent thereof, preferably, the substituent is positioned at the ortho-position relative to the first Hb-L- in the general formula (1). In case where the group in the formula (1) has two (Hb-L-)s as the substituents therein, preferably, both the two are substituted at the ortho-position relative to the first Hb-L- in the general formula (1).

In the general formula (1), L independently represents a single bond, —O—, —CO—, —S—, —NR— (R represents a hydrogen atom or an alkyl group having from 1 to 6 carbon atoms), —SO₂—, —C=N—, —C=C—, —C≡C—, an alkylene group or a fluoroalkylene group, or a group of a combination of these, and is preferably —O—, —CO—, —C=C—, an alkylene group or a fluoroalkylene group, or a group of a combination of these, more preferably —O—, —CO— or an alkylene group, or a group of a combination of these.

The carbon number of the alkylene group and the fluoroalkylene group which L may represent is preferably from 1 to 10, more preferably from 1 to 7, even more preferably from 1 to 4, still more preferably 2 or 3.

The alkyl group which R may represent may be linear or branched. Preferably, the carbon number of the alkyl group which R may represent is from 1 to 3. As the alkyl group, there are exemplified a methyl group, an ethyl group and an n-propyl group.

L may be a group of a combination of the above-mentioned specific groups. The atom-bonding chain length of the entire L is preferably from 1 to 30 atoms, more preferably from 1 to 20 atoms, even more preferably from 1 to 10 atoms.

L is preferably *-L¹-Sp-L²-# (in which * indicates the bond to Hb and # indicates the bond to Cy). Preferably, L¹ and L² each independently represent a single bond, —O—, —S—, —CO—, —COO—, —OCO—, —COS—, —SCO—, —NR"CO—, —CONR"— (R" represents a hydrogen atom or an alkyl group having from 1 to 6 carbon atoms), more preferably —O—, —S—, —CO—, —COO—, —OCO—, —COS— or —SCO—, even more preferably —O—, —CO—, —COO— or —OCO—. Above all, L¹ is preferably —O— or —OCO—, while L² is preferably —COO— or —OCO—. The alkyl group which R" may represent has the same meaning as the alkyl group which R may represent, and the preferred range of the former is the same as the preferred range of the latter.

Sp represents a single bond, an alkylene group having from 1 to 10 carbon atoms, or a fluoroalkylene group having from 1 to 10 carbon atoms, more preferably a single bond, an alkylene group having from 1 to 7 carbon atoms, or a fluoroalkylene group having from 1 to 7 carbon atoms, even more preferably a single bond, an alkylene group having from 1 to 4 carbon atoms, or a fluoroalkylene group having from 1 to 4 carbon atoms, still more preferably a single bond, or an alkylene group having from 1 to 4 carbon atoms, further more preferably a single bond or an alkylene group having 2 or 3 carbon atoms. The alkylene group or the fluoroalkylene group represented by Sp may be branched or may not be branched, but is preferably a non-branched linear alkylene group or a branched fluoroalkylene group, more preferably a non-branched linear alkylene group.

In the general formula (1), Hb represents a fluoroalkyl group having from 2 to 30 carbon atoms, and is preferably a fluoroalkyl group having from 2 to 20 carbon atoms, more preferably a fluoroalkyl group having from 2 to 10 carbon atoms, even more preferably a fluoroalkyl group having from 2 to 6 carbon atoms. Here, in the fluoroalkyl group, at most two fluorine atoms of the terminal trifluoromethyl group or one fluorine atom of the fluoroalkylene chain may be or may not be substituted with a hydrogen atom. The fluoroalkyl group may be linear, branched or cyclic, but is preferably linear or branched, more preferably linear. Preferred examples of the fluoroalkyl group include those that are entirely a perfluoroalkyl group including the terminal thereof, and those in which the terminal is CHF₂ and the other moiety than the terminal is a perfluoroalkylene group. Specifically, preferred are the groups represented by the following general formulae:

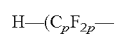

In the above formulae, p is preferably from 2 to 30, more preferably from 2 to 20, even more preferably from 2 to 10, still more preferably from 2 to 6.

In the general formula (1), n1 independently indicates 1 or 2. When n1 is 2, the multiple structures, as parenthesized, may be the same or different. For example, when n1 is 2, the four parenthesized structures existing in the molecule may be the same or different. In the general formula (1), n1 is preferably 1 from the viewpoint that the miscibility of the alignment agent is good.

The compound represented by the general formula (1) may have a symmetric molecular structure, or the molecular structure thereof may not be symmetric, but is preferably symmetric, more preferably symmetric about a point. Here the symmetry includes any one corresponding to point symmetry, line symmetry, or rotation symmetry; and the asymmetry includes any one not corresponding to any of point symmetry, line symmetry, or rotation symmetry. Here, multiple Hb's, L's, Cy's, X's and n1's, if any, in the formula (1) each may be the same or different. However, since the haze reducer represented by the general formula (1) is preferably symmetric about a point as mentioned above, it is desirable that the groups on the left side and the right side of the core represented by —CR(X)=N—N=C(X)— in the formula form a symmetric structure. Specifically, it is desirable that the combination of Hb, L, Cy, X and n1 on the left side of the core represented by —CR(X)=N—N=C(X)— is the same as the combination of Hb, L, Cy, X and n1 on the right side of the core.

The compound represented by the general formula (1) is a compound comprising a combination of the above-mentioned fluoroalkyl group (Hb), the linking group (-L-Cy- and -Cy-L-), the substituent X and the divalent azine skeleton of the core moiety. The two fluoroalkyl groups (Hb) existing in the molecule are preferably the same.

Also preferably, the linking groups -L-Cy- and -Cy-L- existing in the molecule are the same. However, when n1 is 2, it is desirable that the linking groups (-L-Cy-)'s differ from each other; and similarly, the groups (-Cy-L-)'s also differ from each other. It is desirable that the terminal group Hb-L- (preferably Hb-L$^1$-Sp-L$^2$-) is a group represented by any of the following general formulae:

$(C_pF_{2p+1})-(C_qH_{2q})-$ $(C_pF_{2p+1})-(C_qH_{2q})-O$ $(C_pF_{2p+1})-(C_qH_{2q})-COO-$ $C_pF_{2p+1}-(C_qH_{2q})-O-(C_rH_{2r})-$ $(C_pF_{2p+1})-(C_qH_{2q})-O-(C_rH_{2r})-O-$ $(C_pF_{2p+1})-(C_qH_{2q})-COO-(C_rH_{2r})-$ $(C_pF_{2p+1})-(C_qH_{2q})-OCO-(C_rH_{2r})-COO-$ $(C_pF_{2p+1})-(C_qH_{2q})-OCO-(C_rH_{2r})-$ $(C_pF_{2p+1})-(C_qH_{2q})-OCO-(C_rH_{2r})-COO-$

In the above formulae, p is preferably from 2 to 30, more preferably from 2 to 20, even more preferably from 2 to 10, still more preferably from 2 to 6. q is preferably from 0 to 20, more preferably from 0 to 10, even more preferably from 0 to 5. (p+q) is preferably from 3 to 30. r is preferably from 1 to 10, more preferably from 1 to 4.

As the fluorine-containing alignment control agent, also preferred are compounds represented by the following general formula (I):

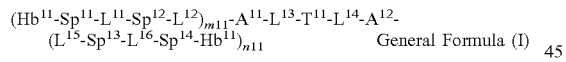

General Formula (I)

In the general formula (I), $L^{11}$, $L^{13}$, $L^{13}$, $L^{14}$, $L^{15}$ and $L^{16}$ each independently represent a single bond, —O—, —S—, —CO—, —COO—, —OCO—, —COS—, —SCO—, —NRCO—, or —CONR— (R in the general formula (I) represents a hydrogen atom or an alkyl group having from 1 to 6 carbon atoms). Since —NRCO— and —CONR— have an effect of reducing the solubility of the compound and tend to increase the haze in film formation, preferred are —O—, —S—, —CO—, —COO—, —OCO—, —COS— and —SCO—. From the viewpoint of the stability of the compound, more preferred are —O—, —CO—, —COO— and —OCO—. The alkyl group which R may represent may be linear or branched. The carbon number of the group is preferably from 1 to 3; and there are exemplified a methyl group, an ethyl group and an n-propyl group.

$Sp^{11}$, $Sp^{12}$, $Sp^{13}$ and $Sp^{14}$ each independently represent a single bond or an alkylene group having from 1 to 10 carbon atom, preferably a single bond or an alkylene group having from 1 to 7 carbon atoms, more preferably a single bond or an alkylene group having from 1 to 4 carbon atoms. However, the hydrogen atom of the alkylene group may be substituted with a fluorine atom. The alkylene group may be branched or may not be branched, but is preferably a non-branched linear alkylene group. From the viewpoint of producing the compound, it is desirable that $Sp^{11}$ and $Sp^{14}$ are the same and $Sp^{12}$ and $Sp^{13}$ are the same.

$A^{11}$ and $A^{12}$ each represent a trivalent or tetravalent aromatic hydrocarbon. Preferably, the carbon number of the trivalent or tetravalent aromatic hydrocarbon group is from 6 to 22, more preferably from 6 to 14, even more preferably from 6 to 10, still more preferably 6. The trivalent or tetravalent aromatic hydrocarbon group represented by $A^{11}$ and $A^{12}$ may have a substituent. Examples of the substituent include an alkyl group having from 1 to 8 carbon atoms, an alkoxy group, a halogen atom, a cyano group and an ester group. For the description and the preferred ranges of these groups, referred to is the corresponding description of T groups mentioned below. The substituent for the trivalent or tetravalent aromatic hydrocarbon group represented by $A^{11}$ and $A^{12}$ includes, for example, a methyl group, an ethyl group, a methoxy group, an ethoxy group, a bromine atom, a chlorine atom, a cyano group, etc. A molecule having many perfluoroalkyl moieties therein can well align liquid crystal molecules even though its amount added is small, and therefore addition of such a molecule could bring about haze reduction. Preferably, therefore, $A^{11}$ and $A^{12}$ each are a tetravalent group so that the molecule could have a majority of perfluoroalkyl groups therein. From the viewpoint of easy production of the compound, preferably, $A^{11}$ and $A^{12}$ are the same.

$T^{11}$ represents a divalent group represented by any of the following, or represents a divalent aromatic heterocyclic group.

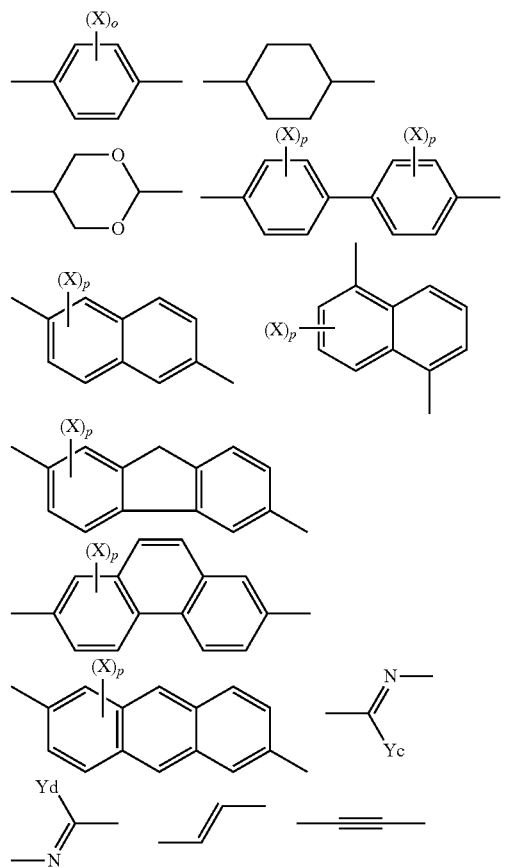

-continued

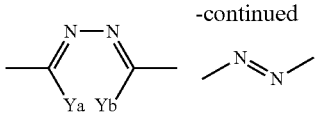

(X in the above T[11] represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms.) More preferably, T[11] represents:

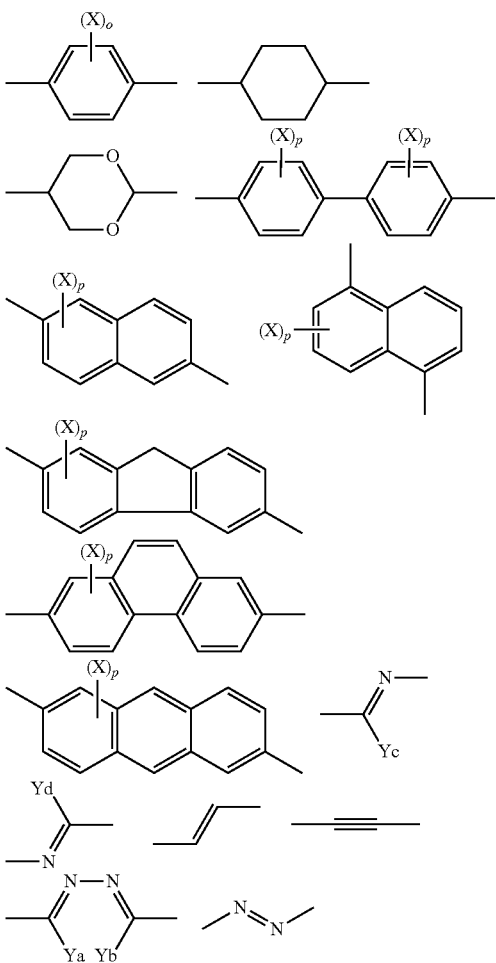

Even more preferably, T[11] represents:

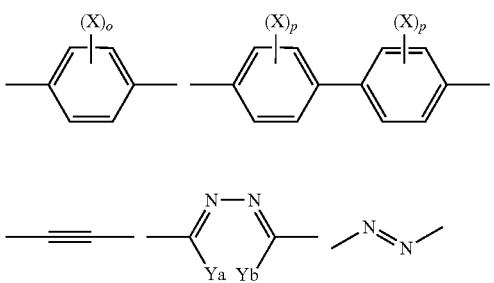

Still more preferably, T[11] represents:

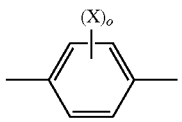

The carbon number of the alkyl group which X in the above T[11] may represent is from 1 to 8, preferably from 1 to 5, more preferably from 1 to 3. The alkyl group may be linear, branched or cyclic, but is preferably linear or branched. Preferred examples of the alkyl group include a methyl group, an ethyl group, an n-propyl group, an isopropyl group, etc. Of those, preferred is a methyl group. For the description and the preferred range of the alkyl moiety of the alkoxy group which X in the above T[11], referred to are the description and the preferred range of the alkyl group which X in the above T[11] may represent. The halogen atom which X in the above T[11] may represent includes a fluorine atom, a chlorine atom, a bromine atom and an iodine atom. Preferred are a chlorine atom and a bromine atom. As the ester group which X in the above T[11] may represent, there is exemplified a group represented by R'COO—. R' may be an alkyl group having from 1 to 8 carbon atoms. For the description and the preferred range of the alkyl group which R' may represent, referred to are the description and the preferred range of the alkyl group which X in the above T[11] may represent. Specific examples of the ester group include $CH_3COO$— and $C_2H_5COO$—. The alkyl group with from 1 to 4 carbon atom, which Ya, Yb, Yc and Yd each may represent, may be linear or branched. For example, there are exemplified a methyl group, an ethyl group, an n-propyl group, an isopropyl group, etc.

Preferably, the divalent aromatic heterocyclic group has a 5-membered, 6-membered or 7-membered hetero ring. More preferred is a 5-membered or 6-membered ring; and most preferred is a 6-membered ring. The hetero atom to constitute the hetero ring is preferably a nitrogen atom, an oxygen atom and a sulfur atom. The hetero ring is preferably an aromatic hetero ring. The aromatic hetero ring is generally an unsaturated hetero ring. More preferred is an unsaturated hetero ring having a largest number of double bonds. Examples of the hetero ring include a furan ring, a thiophene ring, a pyrrole ring, a pyrroline ring, a pyrrolidine ring, an oxazole ring, an isoxazole ring, a triazole ring, an isothiazole ring, an imidazole ring, an imidazoline ring, an imidazolidine ring, a pyrazole ring, a pyrazoline ring, a pyrazolidine ring, a triazole ring, a furazane ring, a tetrazole ring, a pyran ring, a thiine ring, a pyridine ring, a piperidine ring, an oxazine ring, a morpholine ring, a thiazine ring, a pyridazine ring, a pyrimidine ring, a pyrazine ring, a piperazine ring and a triazine ring. The divalent heterocyclic group may have a substituent. For the description and the preferred range of the substituent, referred to is the description relating to the substituent which the trivalent or tetravalent aromatic hydrocarbon for the above $A^1$ and $A^2$ may have.

Hb[11] represents a perfluoroalkyl group having from 2 to 30 carbon atoms, preferably a perfluoroalkyl group having from 3 to 20 carbon atoms, more preferably a perfluoroalkyl group having from 3 to 10 carbon atoms. The perfluoroalkyl group may be linear, branched or cyclic, but is preferably linear or branched, more preferably linear.

m11 and n11 each independently indicate from 0 to 3, and m11+n11 (1. Multiple parenthesized structures, if any, may be the same or different, but are preferably the same. m11 and n11 in the general formula (I) are defined by the valence of the above A11 and A212, and the preferred ranges thereof are also defined by the valence of A11 and A212.

o and p contained in $T^{11}$ each independently indicate an integer of 0 or more. When the formula has 2 or more o's and p's, then multiple X's maybe the same or different. Preferably, o in T11 is 1 or 2. Preferably, p in $T^{11}$ is an integer of from 1 to 4, more preferably 1 or 2.

The compound represented by the general formula (I) may have a symmetric molecular structure, or may be asymmetric. Here the symmetry includes any one corresponding to point symmetry, line symmetry, or rotation symmetry; and the asymmetry includes any one not corresponding to any of point symmetry, line symmetry, or rotation symmetry.

The compound represented by the general formula (I) is a compound comprising a combination of the above-mentioned perfluoroalkyl group ($Hb^{11}$), the linking groups $-(-Sp^{11}-Ln^{11}-Sp^{12}-L^{12})_{m11}-A^{11}-L^{13}-$ and $-L^{14}-A^{12}-(L^{15}-Sp^{13}-L^{16}-Sp^{14}-)_{n11}-$, and the divalent group $T^{11}$ preferably having an excluded volume effect. The two perfluoroalkyl groups ($Hb^{11}$)'s existing in the molecule are preferably the same; and the linking groups $-(-Sp^{11}-L^{11}-Sp^{12}-L^{12})_{m11}-A^{11}-L^{13}-$ and $-L^{14}-A^{12}-(L^{15}-Sp^{13}-L^{16}-Sp^{14}-)_{n11}-$ existing in the molecule are also preferably the same. Preferably, the terminal $Hb^{11}-Sp^{11}-L^{11}-Sp^{12}-$ and $-Sp^{13}-L^{16}-Sp^{14}-Hb^{11}$ each are a group represented by any of the following general formulae:

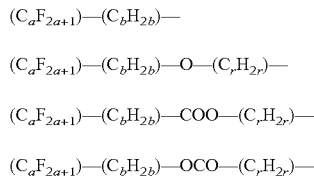

In the above formulae, a is preferably from 2 to 30, more preferably from 3 to 20, even more preferably from 3 to 10. b is preferably from 0 to 20, more preferably from 0 to 10, even more preferably from 0 to 5. a+b is from 3 to 30. r is preferably from 1 to 10, more preferably from 1 to 4.

The terminal $Hb^{11}-Sp^{11}-L^{11}-Sp^{12}-L^{12}-$ and $-L^{14}-Sp^{13}-L^{16}-Sp^{14}-Hb^{11}$ in the general formula (I) each are preferably a group represented by any of the following general formulae:

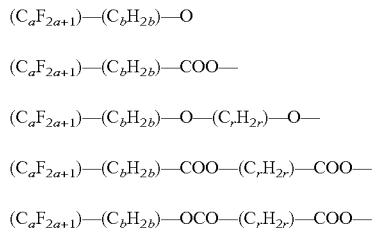

In the above formulae, the definitions of a, b and r are the same as the definitions thereof given above.

The amount of the fluorine-containing horizontal alignment agent to be added to the light reflection layer that constitutes the liquid-crystal film for use in the laminate of the invention is preferably from 0.01 to 10% by mass relative to the polymerizable liquid-crystal compound therein, more preferably from 0.01 to 1% by mass, even more preferably from 0.01 to 0.09% by mass, still more preferably from 0.01 to 0.06% by mass.

In the light reflection layer that constitutes the liquid-crystal film for use in the laminate of the invention, more preferably, the fluorine-containing horizontal alignment agent contains a perfluoroalkyl group from the viewpoint of controlling the amount to be added of the fluorine-containing horizontal alignment agent to fall within the above range, and more preferably, the agent contains a perfluoroalkyl group having from 3 to 10 carbon atoms.

(3) Polymerization Initiator

Preferably, the composition of the invention contains a polymerization initiator. For example, in an embodiment of promoting the curing reaction through irradiation with UV rays to give a cured film, the polymerization initiator to be used is preferably a photopolymerization initiator capable of initiating polymerization through irradiation with UV rays. Examples of the photopolymerization initiator include α-carbonyl compounds (described in U.S. Pat. Nos. 2,367,661, 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127, 2,951,758), combination of triarylimidazole dimer and p-aminophenylketone (described in U.S. Pat. No. 3,549,367), acridine and phenazine compounds (described in JP-A 60-105667, U.S. Pat. No. 4,239,850), oxadiazole compounds (described in U.S. Pat. No. 4,212,970), acylphosphine oxide compounds (described in JP-B 63-40799, JP-B 5-29234, JP-A 10-95788, JP-A 10-29997), etc.

The amount of the photopolymerization initiator to be used is preferably from 0.1 to 20% by mass of the composition (in case where the composition is a coating liquid, the solid content thereof), more preferably from 1 to 8% by mass.

(4) Other Components

The liquid-crystal mixture of the invention may contain, if desired, a solvent, an optically-active compound containing an asymmetric carbon atoms (chiral agent) and any other additive (for example, cellulose ester), in addition to the compound represented by the above-mentioned general formulae (Ia) and (Ib), the fluorine-containing horizontal alignment control agent and the polymerization initiator.

Solvent:

As the solvent of the liquid-crystal mixture of the invention, preferred is use of an organic solvent. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone, cyclohexanone), ethers (e.g., tetrahydrofuran, 1,2-dimethoxyethane). Preferred are alkyl halides and ketones. Two or more different types of organic solvents may be used here as combined.

Optically-Active Compound (Chiral Agent):

It is desirable that the liquid-crystal mixture of the invention exhibits a cholesteric liquid-crystal phase, and for this, the mixture preferably contains an optically-active compound. However, when the above-mentioned rod-shaped liquid-crystal compound is a molecule having an asymmetric carbon atoms, then the mixture could stably form a cholesteric liquid-crystal phase even though an optically-active compound is not added thereto. The optically-active compound maybe selected from various types of known chiral agents (for example, described in Liquid-Crystal Device Handbook, Chap. 3, Sec. 4-3, TN, STN Chiral Agents, p. 199, edited by the Japan Society for the Promotion of Science, No. 142 Committee, 1989). An optically-active compound generally contains an asymmetric carbon, but an axial asymmetric compound or a planar asymmetric compound may also be employable here as a chiral agent.

Examples of the axial asymmetric compound or the planar asymmetric compound include binaphthyl, helicene, paracyclophane and their derivatives. The optically-active compound (chiral agent) may have a polymerizable group. In case where the optically-active compound has a polymerizable group and where the rod-shaped liquid-crystal compound to be used here along with the optically-active compound also has a polymerizable group, the polymerization reaction of the polymerizable optically-active compound and the polymerizable rod-shaped compound gives a polymer having a recurring unit derived from the rod-shaped liquid-crystal compound and the recurring unit derived from the optically-active compound. In this embodiment, it is desirable that the polymerizable group which the polymerizable optically-active compound has is the same type of the polymerizable group which the polymerizable rod-shaped liquid-crystal compound has. Accordingly, it is desirable that the polymerizable group of the optically-active compound is also an unsaturated polymerizable group, an epoxy group or an aziridinyl group, more preferably an unsaturated polymerizable group, even more preferably an ethylenic unsaturated polymerizable group.

The optically-active compound may be a liquid-crystal compound.

Preferably, the amount of the optically-active compound in the liquid-crystal mixture of the invention is from 1 to 30 mol % relative to the liquid-crystal compound to be in the mixture. It is desirable that the amount of the optically-active compound to be used is smaller as capable of reducing the influence of the compound on the liquid crystallinity. Consequently, the optically-active compound that is used here as a chiral agent is preferably one having a high torsion strength in order to attain the intended helical pitch torsion alignment even though its amount is small. As the chiral agent having such a high torsion strength, for example, there are mentioned the chiral agents described in JP-A 2003-287623, and these are favorably used in the invention.

[Film]

The film of the invention comprises a support and, as formed on the support, a liquid-crystal layer where a cholesteric liquid-crystal phase formed by polymerizing the cholesteric liquid-crystal mixture of the invention is fixed.

The film may be formed according to a method of coating with the liquid-crystal mixture of the invention. The liquid-crystal mixture of the invention may be applied onto an alignment film to form a liquid-crystal layer thereon, thereby producing an optically-anisotropic device. The film of the invention preferably exhibits optical anisotropy.

Coating with the liquid-crystal mixture of the invention may be attained in known methods (e.g., extrusion coating method, direct gravure coating method, reverse gravure coating method, die coating method, bar coating method). Preferably, the liquid-crystal molecules are fixed while the alignment state thereof is maintained as such. Preferably, the fixation is attained by polymerization of the polymerizable group introduced into the liquid-crystal molecule.

The polymerization includes thermal polymerization using a thermal polymerization initiator and photopolymerization using a photopolymerization initiator. Preferred is photopolymerization.

Preferably, UV rays are sued for photoirradiation for polymerization of the liquid-crystal molecule. Preferably, the irradiation energy is from 20 mJ/cm$^2$ to 50 J/cm$^2$, more preferably from 100 to 800 mJ/cm$^2$. For promoting the photopolymerization, the photoirradiation may be attained under heat. Preferably, the thickness of the liquid-crystal layer is from 0.1 to 50 μm, more preferably from 1 to 30 μm, most preferably from 2 to 20 μm. The amount of the haze reducer represented by the above-mentioned general formula (1) to be in the liquid-crystal layer is preferably from 0.1 to 500 mg/m$^2$, more preferably from 0.5 to 450 mg/m$^2$, even more preferably from 0.75 to 400 mg/m$^2$, most preferably from 1.0 to 350 mg/m$^2$.

One example of the production method includes at least the following:

(A) applying the composition containing an alignment control agent and a polymerizable (curable) liquid-crystal compound onto the surface of a support such as a transparent thermoplastic resin film or the like, and making a state of a cholesteric liquid-crystal phase, (B) promoting the curing reaction of the liquid-crystal mixture of the invention through irradiation with UV rays to thereby fix the cholesteric liquid-crystal phase to form a light reflection layer.

Figure 4:
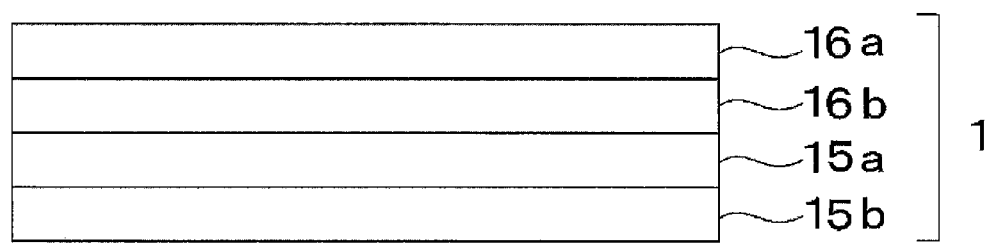
FIG. 4 is a schematic view showing a cross section of one example of the liquid-crystal layer contained in the film of the invention in which the cholesteric liquid-crystal phase is fixed.

The steps (A) and (B) are repeated four times on one surface of the support, thereby forming on the support a liquid-crystal layer having a cholesteric liquid-crystal phase fixed therein as shown in FIG. 4 (in FIG. 4, the support is not shown). Further repeating the steps gives a liquid-crystal film (light reflection film) in which the number of the laminated layers is increased and in which a cholesteric liquid-crystal phase is fixed.

Preferably, the undercoat layer is formed on the surface of the support such as a transparent thermoplastic resin film or the like, by coating. The coating method is not specifically defined, for which employable is any known method.

The alignment layer may be provided according to a means of rubbing treatment of an organic compound (preferably, polymer), oblique vapor deposition of an inorganic compound, formation of a layer having microgrooves, etc. Further, there is known an alignment layer capable of being given an alignment function through impartation thereto of an electric field or impartation thereto of a magnetic field or through photoirradiation. Preferably, the alignment layer is formed by rubbing the surface of a polymer film. Also preferably, the alignment film is peeled away along with the support to be mentioned below.

Step (A)

In the above step (A), first, the liquid-crystal mixture of the invention is applied onto the surface of a substrate or onto the surface of the underlying light reflection layer. The liquid-crystal mixture of the invention is preferably prepared as a coating liquid by dissolving and/or dispersing the materials in a solvent. Coating with the coating liquid may be attained in various methods such as a wire bar coating method, an extrusion coating method, a direct gravure coating method, a reverse gravure coating method, a die coating method, etc. Also employable here is an inkjet apparatus where the liquid-crystal mixture of the invention is jetted out through the nozzle to form a coating film.

Next, the liquid-crystal mixture of the invention applied to the surface to be a coating film is processed to be a cholesteric liquid-crystal phase. In the embodiment where the liquid-crystal mixture of the invention is prepared as a coating liquid that contains a solvent, the coating film is dried and the solvent is removed, whereby the coating film may be converted into a state having a cholesteric liquid-crystal phase. For making the coating film to have a transition temperature at which the coating film is converted into a cholesteric liquid-crystal phase, the coating film may be optionally heated. For example, once the coating film is heated up to a temperature of the isotropic phase thereof, and then it is cooled down to a cholesteric liquid-crystal phase transition temperature, whereby the coating film could be stably converted into a state of cholesteric liquid-crystal phase. The liquid-crystal phase transition temperature of the liquid-crystal mixture of the invention is preferably within a range of from 10 to 250° C. from the viewpoint of the production aptitude, more preferably from 10 to 150° C. When the temperature is lower than 10° C., then the production process would require a cooling step for lowering the coating film to a temperature range in which the film could exhibit a liquid-crystal phase. On the other hand, when the temperature is higher than 200° C., the process would require a high temperature in order that the coating film could be in an isotropic liquid state at a further higher temperature than the temperature range in which the film could be once a liquid-crystal phase, and such is unfavorable from the viewpoint of heat energy wasting, substrate deformation, degradation, etc.

Step (B)

Next, in the step (B), the coating film that has become a state of a cholesteric liquid-crystal phase is cured through irradiation with UV rays. For UV irradiation, usable is a light source of a UV lamp or the like. In this step, the coating film is irradiated with UV rays whereby the liquid-crystal mixture of the invention is cured and the cholesteric liquid-crystal phase is thereby fixed to form a light reflection layer.

The energy dose in irradiation with UV rays is not specifically defined. In general, preferred is a dose of from 100 mJ/cm$^2$ to 800 mJ/cm$^2$. The time for which the coating film is irradiated with UV rays is not also specifically defined. The time may be determined from the viewpoint of both the sufficient strength of the cured film and the productivity thereof.

For accelerating the curing reaction, the UV irradiation maybe carried out under heat. Preferably, the temperature in irradiation with UV rays is kept in a range of a liquid-crystal phase temperature so as not to disturb the liquid-crystal phase of the film. The oxygen concentration in the atmosphere participates in the degree of polymerization, and therefore, in case where the reaction could not secure the desired degree of polymerization in air and where the film strength is therefore insufficient, it is desirable that the oxygen concentration in the atmosphere is reduced according to a nitrogen-purging method or the like. The oxygen concentration is preferably 10% or less, more preferably 7% or less, and most preferably 3% or less. The reaction yield of the curing reaction (for example, polymerization reaction), which is promoted through irradiation with UV rays, is preferably 70% or more, more preferably 80% or more, and still more preferably 90% or more from the viewpoint of holding the mechanical strength of the layers, suppressing the outflow of unreacted substances from the layers and the like. In order to improve the reaction yield, a method for increasing the radiation dose of UV rays or polymerization in a nitrogen atmosphere or under heating conditions is effective. In addition, it is also possible to use a method in which the composition is temporarily polymerized, and then held in a higher temperature state than the polymerization temperature, thereby further progressing the reaction through thermal polymerization or a method in which UV rays are radiated again (in this case, UV rays should be radiated under the conditions satisfying the invention). The reaction yield can be measured by comparing the absorption intensities in the IR vibration spectra of the reactive group (for example, polymerizable group) before and after the reaction.

In the above step, the cholesteric liquid-crystal phase is fixed to form the light reflection layer. Here, regarding the "fixed" state of the liquid-crystal phase, a condition where the alignment of the liquid-crystal compound that exhibits the cholesteric liquid-crystal phase is maintained as such is a most typical and preferred embodiment. However, not limited thereto but concretely, the fixed state means that the layer has no more fluidity in a temperature range of generally from 0° C. to 50° C., but from −30° C. to 70° C. in a more severe condition, and can continue to stably keep the fixed alignment state thereof without providing any change in the alignment state by any external field or external force. In the invention, the alignment state of the cholesteric liquid-crystal phase is fixed by the curing reaction that is promoted through irradiation with UV rays.

In the invention, it is enough that the optical properties of the cholesteric liquid-crystal phase are maintained in the layer, and finally the liquid-crystal mixture in the light reflection layer would not need to exhibit anymore the liquid crystallinity. For example, the liquid-crystal mixture is polymerized to have an increased molecular weight through the curing reaction to thereby have no more liquid crystallinity.

Other important properties of the laminate of the invention and the laminated glass of the invention to be mentioned below in use thereof for selective reflectors are the visible light transmittance and the haze thereof. It is possible to provide selective reflectors exhibiting a preferred visible light transmittance and a preferred haze by suitably selecting the materials and controlling the production conditions in accordance with the intended use of the selective reflectors. For example in an embodiment of use that requires a high visible light transmittance, there may be provided a selective reflector which has a visible light transmittance of 90% or more and of which the light reflectance satisfies the above-mentioned reaction.

(Other Constituent Layers of Film)

In addition to the above-mentioned configuration, the film of the invention may have a non-light-reflective layer containing an organic material and/or an inorganic material. Examples of the non-light-reflective layer usable in the invention include an adhesion-improving layer and an adhesive layer that facilitate adhesion of the film to other members (for example, glass sheet), as well as a protective layer to be formed on the liquid-crystal layer in which the cholesteric liquid-crystal phase is fixed.

Other examples of the non-light-reflective layer usable in the invention include may include an underlayer that may be provided in forming the liquid-crystal layer in which the cholesteric liquid-crystal phase is fixed, and an alignment layer that is used in forming the liquid-crystal layer in which the cholesteric liquid-crystal phase for more accurately defining the alignment condition of the liquid-crystal compound in the liquid-crystal layer.

Adhesive Layer:

As described above, the film of the invention may have an adhesive layer.

Not going against the scope of the invention, the adhesive for use in the invention may be any general adhesive including acrylic materials, polyesters, polyurethanes, polyolefins, polyvinyl alcohols, etc. Of those, especially preferred for use in the invention are polyesters and acrylic materials; and even more preferred are acrylic materials.

The adhesive may be a commercially-available one; and examples of the adhesive preferred for use in the invention include Sanritz's PET-W and Panac's PD-S1.

The thickness of the adhesive layer may be, for example, from 0.1 to 5.0 μm.

Adhesion-Improving Layer:

The adhesion-improving layer has a function of improving the adhesion between the liquid-crystal layer where the cholesteric liquid-crystal phase is fixed and the adhesive layer. The material usable for forming the adhesion-improving layer includes a polyvinyl butyral (PVB) resin. The polyvinyl butyral resin is a type of polyvinyl acetal that is formed through reaction of polyvinyl alcohol (PVA) and butylaldehyde in the presence of an acid catalyst, and has a recurring unit having the following structure.

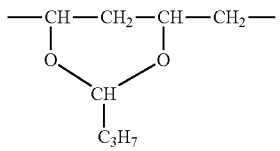

The adhesion-improving layer may also be a so-called undercoat layer that comprises an acrylic resin, a styrene/acrylic resin, an urethane resin, a polyester resin or the like. The adhesion-improving resin of the material maybe formed by coating. Some commercially-available films may have an undercoat layer formed therein, and such commercial products may be used as the substrate in the invention. Further, a UV absorbent, an antistatic agent, a lubricant, a blocking inhibitor or the like may be added to the adhesion-improving layer.

The thickness of the adhesion-improving layer is preferably from 0.1 to 5.0 µm.

Undercoat Layer:

The film of the invention may have an undercoat layer on the side of the liquid-crystal layer thereof where the cholesteric liquid-crystal phase is fixed. In general, the liquid-crystal layer where the cholesteric liquid-crystal phase is fixed is provided preferably on the support; and this is because, depending on the type of the support use in the case, it is often desirable that the liquid-crystal layer where the cholesteric liquid-crystal phase is fixed is provided on the undercoat layer formed on the support.

Examples of the material usable in forming the undercoat layer include acrylate copolymer, polyvinylidene chloride, styrene-butadiene rubber (SBR), aqueous polyester, etc. In an embodiment where the surface of the undercoat layer is stuck to an interlayer, it is desirable that the adhesion between the undercoat layer and the interlayer is good; and from the viewpoint, it is desirable that the undercoat layer contains a polyvinyl butyral resin in addition to the above-mentioned material. In addition, since the adhesion power of the undercoat layer must be suitably controlled as described above, it is desirable that the layer is cured with a suitable curing agent, for example, with a dialdehyde such as glutaraldehyde, 2,3-dihydroxy-1,4-dioxane or the like, or with boric acid or the like. The amount of the curing agent to be added is preferably from 0.2 to 3.0% by mass of the dry mass of the undercoat layer.

Preferably, the thickness of the undercoat layer is from 0.05 to 0.5 µm.

Alignment Layer:

The film of the invention may have an alignment layer between the liquid-crystal layer and the interlayer; however, in the production method for the laminate of the invention where the support is peeled, the layer may be peeled away together with the support.

When the liquid-crystal layer where the cholesteric liquid-crystal phase is fixed is formed, the alignment layer must be adjacent to the liquid-crystal layer, and therefore, it is desirable that the alignment layer is provided between the liquid-crystal layer where the cholesteric liquid-crystal phase is fixed and the substrate or the undercoat layer. However, the undercoat layer may additionally have the function of the alignment layer. As the case may be, the alignment layer may be provided between the liquid-crystal layers where the cholesteric liquid-crystal phase is fixed.

Protective Layer:

For imparting scratch resistance (hard coat performance) to the surface of the liquid-crystal layer in which the cholesteric liquid-crystal phase is fixed and for imparting thereto resistance to degradation by UV rays, a protective layer may be formed on the liquid-crystal layer in which the cholesteric liquid-crystal phase is fixed. The constitution of the protective layer is not specifically defined, for which, however, preferred is a uniform dispersion of a UV absorbent or the like in at least one binder.

<<Binder [Impartation of Hard Coat Performance]>>

For making the protective layer have hard coat performance, preferred is use a layer produced through polymerization by photoirradiation or heating of a layer containing, as a binder therein, a polymer having a high Tg or at least one bifunctional or higher polyfunctional polymerizable monomer and/or polymerizable polymer. Also preferred is use of a layer produced through polymerization by photoirradiation or heating of a layer containing, in addition to a polymer having a high Tg as a binder therein, at least one bifunctional or higher polyfunctional polymerizable monomer (and optionally polymerizable polymer).

Tg of the polymer having a high Tg is preferably not lower than 50° C., more preferably not lower than 80° C., even more preferably not lower than 100° C. For obtaining such a high-Tg polymer in a commercial manner, for example, there are mentioned MH-101-5 (by Fujikura Chemical), etc. For elevating Tg of a polymer, it is recommended to introduce a polar group such as a hydroxyl group, a carboxylic acid group or an amino group to the polymer. Examples of high-Tg polymers include reaction products of alkyl (meth)acrylate such as polymethyl (meth)acrylate, polyethyl (meth)acrylate, etc.; copolymers of alkyl (meth)acrylate and (meth)acrylic acid; reaction products of hydroxyl group-containing (meth)acrylate such as 2-hydroxyethyl (meth)acrylate, 2-hydroxypropyl (meth)acrylate, etc.; reaction products of alkyl (meth)acrylate, hydroxyl group-containing (meth)acrylate and acid anhydride such as succinic anhydride, phthalic anhydride or the like, or that is, copolymers of half esters, etc.

The bifunctional or higher polyfunctional polymerizable monomer is a compound having two or more reactive groups in one molecule. The reactive group includes a vinyl group, an allyl group, a (meth)acryl group, an epoxy group, an oxetanyl group, a vinyl ether group, etc. As the bifunctional or higher polyfunctional polymerizable monomer, preferably used here are dipentaerythritol pentacrylate, dipentaerythritol hexacrylate, etc. In case where the bifunctional or higher polyfunctional polymerizable monomer is obtained in a commercial manner, for example, there are mentioned KAYARAD DPHA (by Nippon Kayaku), etc.

Examples of the polymerizable polymer include reaction products of polymerizable group-containing acrylate such as methyl (meth)acrylate, glycidyl (meth)acrylate, allyl (meth)acrylate, ethylene glycol di(meth)acrylate, glycerol 1,3-di (meth)acrylate, etc.; copolymers thereof with (meth)acrylic acid; and polynary copolymers thereof with any other monomers.

<<Polymerization Initiator>>

In case where the binder contains at least one bifunctional or higher polyfunctional polymerizable monomer and/or polymerizable polymer, it is desirable that the layer containing the at least one bifunctional or higher polyfunctional polymerizable monomer and/or polymerizable polymer further contains a photo- or thermo-polymerization initiator, more preferably a photopolymerization initiator. For obtaining the polymerization initiator in a commercial manner, for example, there are mentioned IRGACURE 819 (by BASF). Also preferred is use of the polymerization initiator mentioned in the above paragraph [0099] in this description.

<<UV Absorbent [Impartation of UV Degradation Resistance]>>

For preventing UV degradation, preferred is use of a UV absorbent. For example, there are mentioned UV absorbents described in "Development and Environmental Measures for Polymer Additives" supervised by Yasukazu Ohkatsu (CMC Publishing, 2003), Chap. 2; "New Development of Functional Additives for Polymer" edited by Investigation Research Section of Toray Research Center (Toray Research Center, 1999), 2.3.1, etc. More concretely, there are mentioned triazine compounds, benzotriazole compounds, benzophenone compounds, merocyanine compounds, cyanine compounds, dibenzoylmethane compounds, cinnamic acid compounds, acrylate compounds, benzoate compounds, oxalic diamide compounds and the like known as structures of UV absorbents. For example, the compounds are described in Fine Chemical, May 2004, pp. 28-38; "New Development of Functional Additives for Polymer" issued by Investigation Research Section of Toray Research Center (Toray Research Center, 1999), pp. 96-140; "Development and Environmental Measures for Polymer Additives" supervised by Yasukazu Ohkatsu (CMC Publishing, 2003), pp. 54-64, etc.

As the UV absorbent for use in the protective layer in the invention, preferred are benzotriazole compounds, benzophenone compounds, salicylic acid compounds, acrylate compounds, and triazine compounds. More preferred are benzotriazole compounds, benzophenone compounds and triazine compounds. Even more preferred are benzotriazole compounds and triazine compounds.

For enhancing the absorption performance of the UV absorbent, it is desirable that the amount thereof to be added is higher; however, when the amount it too much, there would occur a problem of bleeding out. Therefore, the amount of the UV absorbent to be added is preferably at most 25% by mass relative to the mass of the protective layer.

The benzotriazole compound is preferably any of the following general formula (IIa), (IIb) or (IIc), having an effective absorption wavelength of from about 270 to 380 nm.

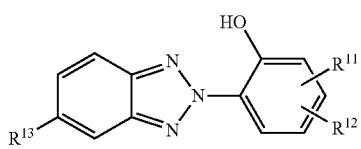
(IIa)

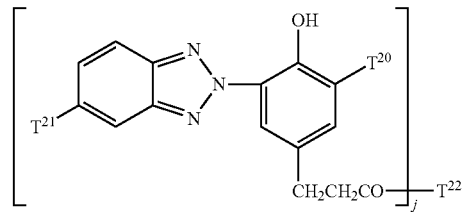
(IIb)

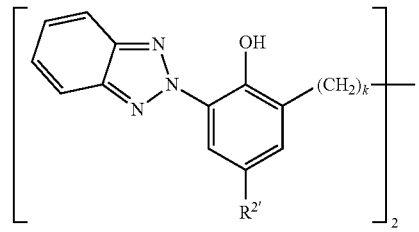
(IIc)

[In the above general formula (IIa), $R^{11}$ represents a hydrogen atom, an alkyl group having from 1 to 24 carbon atoms, a phenylalkyl group in which the alkyl moiety has from 1 to 4 carbon atoms, a cycloalkyl group having from 5 to 8 carbon atoms, or a group represented by the following general formula:

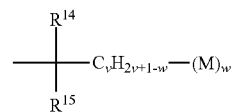

(wherein $R^{14}$ and $R^{15}$ each independently represent an alkyl group having from 1 to 5 carbon atoms. $R^{14}$ may form, together with the group $-C_vH_{2v+1-w}$, a cycloalkyl group having from 5 to 12 carbon atoms. w indicates 1 or 2. v indicates an integer of from 2 to 20. M represents $-COOR^{16}$ (where $R^{16}$ represents a hydrogen atom, an alkyl group having from 1 to 12 carbon atoms, an alkoxyalkyl group in which the alkyl moiety and the alkoxy moiety have from 1 to 20 carbon atoms, or a phenylalkyl group in which the alkyl moiety has from 1 to 4 carbon atoms)).

$R^{13}$ represents a hydrogen atom, a halogen atom, an alkyl group having from 1 to 18 carbon atoms, or a phenylalkyl group in which the alkyl moiety has from 1 to 4 carbon atoms.

$R^{12}$ represents a hydrogen atom, a chlorine atom, an alkyl or alkoxy group having from 1 to 4 carbon atoms, or $-COOR^{16}$ (where $R^{16}$ is as defined previously). However, at least one of $R^{11}$ and $R^{12}$ is not a hydrogen atom.]

[In the above general formula (IIb), $T^{20}$ represents a hydrogen atom, or an alkyl group having from 1 to 6 carbon atoms; $T^{21}$ represents a hydrogen atom, a chlorine atom, or an alkyl or alkoxy group having from 1 to 4 carbon atoms; j indicates 1 or 2, and when j is 1, $T^{22}$ represents a chlorine atom, $-OT^{23}$, or a formula:

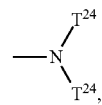

and when j is 2, $T^{22}$ represents a formula:

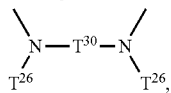

or a group $-O-T^{29}-O-$.

(In the above, $T^{23}$ represents a hydrogen atom, or an alkyl group having from 1 to 18 carbon atoms, which is unsubstituted or substituted with from 1 to 3 hydroxyl groups or ($-OCOT^{26}$)'s, or an alkyl group having from 3 to 18 carbon atoms, in which the continuing carbon-carbon bond is interrupted once or more by $-O-$ or $-NT^{26}-$ and which is unsubstituted or substituted with a hydroxyl group or $-OCOT^{26}$, or a cycloalkyl group having from 5 to 12 carbon atoms, which is unsubstituted or substituted with a hydroxyl group and/or an alkyl group having from 1 to 4 carbon atoms, or an alkenyl group having from 2 to 18 carbon atoms, which is unsubstituted or substituted with a hydroxyl group, or a phenylalkyl group in which the alkyl moiety has from 1 to 4 carbon atoms, or $-CH_2CH(OH)-T^{27}$, or

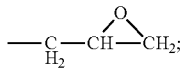

$T^{24}$ and $T^{25}$ each independently represent a hydrogen atom, or an alkyl group having from 1 to 18 carbon atoms, or an alkyl group having from 3 to 18 carbon atoms, in which the continuing carbon-carbon bond is interrupted once or more by $-O-$ or $-NT^{26}-$, or a cycloalkyl group having from 5 to 12 carbon atoms, or a phenyl group, or a phenyl group substituted with an alkyl group having from 1 to 4 carbon atoms, or an alkenyl group having from 3 to 8 carbon atoms, or a phenylalkyl group in which the alkyl moiety has from 1 to 4 carbon atoms, or a hydroxyalkyl group having from 2 to 4 carbon atoms;

$T^{26}$ represents a hydrogen atom, an alkyl group having from 1 to 18 carbon atoms, a cycloalkyl group having from 5 to 12 carbon atoms, an alkenyl group having from 3 to 8 carbon atoms, a phenyl group, a phenyl group substituted with an alkyl group having from 1 to 4 carbon atoms, or a phenylalkyl group in which the alkyl moiety has from 1 to 4 carbon atoms;

$T^{27}$ represents a hydrogen atom, an alkyl group having from 1 to 18 carbon atoms, a phenyl group which is unsubstituted or substituted with a hydroxyl group, a phenylalkyl group in which the alkyl moiety has from 1 to 4 carbon atoms, or $-CH_2OT28$; $T^{28}$ represents an alkyl group having from 1 to 18 carbon atoms, an alkenyl group having from 3 to 8 carbon atoms, a cycloalkyl group having from 5 to 10 carbon atoms, a phenyl group, a phenyl group substituted with an alkyl group having from 1 to 4 carbon atoms, or a phenylalkyl group in which the alkyl moiety has from 1 to 4 carbon atoms;

$T^{29}$ represents an alkylene group having from 2 to 8 carbon atoms, an alkenylene group having from 4 to 8 carbon atoms, an alkynylene group having 4 carbon atoms, a cyclohexylene group, an alkylene group having from 2 to 8 carbon atoms, in which the continuing carbon-carbon bond is interrupted once or more by $-O-$, or $-CH2CH(OH)CH2O-T^{31}-OCH_2CH(OH)CH_2-$, or $-CH_2-C(CH_2OH)_2-CH_2-$;

$T^{30}$ represents an alkylene group having from 2 to 20 carbon atoms, in which the continuing carbon-carbon bond may be interrupted once or more by $-O-$, or a cyclohexylene group;

$T^{31}$ represents an alkylene group having from 2 to 8 carbon atoms, an alkylene group having from 2 to 18 carbon atoms, in which the continuing carbon-carbon bond is interrupted once or more by $-O-$, or a 1,3-cyclohexylene, 1,4-cyclohexylene, 1,3-phenylene or 1,4-phenylene group; or $T^{30}$ and $T^{26}$ together form, along with the two nitrogen atoms, a piperazine ring)].

[In the above formula (IIc), $R^{2'}$ represents C1 to C12 alkyl group, and k indicates a number of from 1 to 4.]

Typical examples of the compound represented by any of the above general formulae (IIa) to (IIc) include: 2-(2'-hydroxy-5'-methylphenyl)benzotriazole, 2-(2'-hydroxy-5'-t-butylphenyl)benzotriazole, 2-(2'-hydroxy-3'-t-butyl-5'-methylphenyl)-5-chlorobenzotriazole, 2-(2'-hydroxy-3',5'-du-t-butylphenyl)-5-chlorobenzotriazole, 2-(2'-hydroxy-3'-dodecyl-5'-methylphenyl)-5-chlorobenzotriazole, 2-(2'-hydroxy-3',5'-di-t-amylphenyl)benzotriazole, 2-(2'-hydroxy-5'-(1,1,3,3-tetramethylbutyl)phenyl)benzotriazole, 2-(2'-hydroxy-4'-octyloxyphenyl)benzotriazole, 2-(2'-hydroxy-3'-(3,4,5,6-tetrahydrophthalimidylmethyl)-5'-methylbenzyl)phenyl)benzotriazole, 2-(3'-sec-butyl-5'-t-butyl-2'-hydroxyphenyl)benzotriazole, 2-(3',5'-bis-(α,α-dimethylbenzyl)-2'-hydroxyphenyl)benzotriazole, 2-(3'-t-butyl-2'-hydroxy-5'-(2-octyloxycarbonylethyl)phenyl)-5-chloro-benzotriazole, 2-(3'-t-butyl-5'-[2-(2-ethylhexyloxy)-carbonylethyl]-2'-hydroxyphenyl)-5-chloro-benzotriazole, 2-(3'-t-butyl-2'-hydroxy-5'-(2-methoxycarbonylethyl)phenyl)-5-chloro-benzotriazole, 2-(3'-t-butyl-2'-hydroxy-5'-(2-methoxycarbonylethyl)phenyl)benzotriazole, 2-(3'-t-butyl-2'-hydroxy-5'-(2-octyloxycarbonylethyl)phenyl) benzotriazole, 2-(3'-t-butyl-5'-[2-(2-ethylhexyloxy) carbonylethyl]-2'-hydr oxyphenyl) benzotriazole, 2-(3'-dodecyl-2'-hydroxy-5'-methylphenyl)benzotriazole, 2-(3'-t-butyl-2'-hydroxy-5'-(2-isooctyloxycarbonylethyl) phenylbenzotriazole, 2,2'-methylene-bis[4-(1,1,3,3-tetramethylbutyl)-6-benzotriazol-2-ylphenol], interesterification product of 2-[3'-t-butyl-5'-(2-methoxycarbonylethyl)-2'-hydroxyhenyl]-2H-benzotriazole and polyethylene glycol 300;

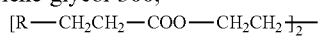

(wherein 3'-tert-butyl-4'-hydroxy-5'-2H-benzotriazol-2-yl-phenyl), 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl] benzotriazole, etc.

As the triazine compound, preferred are the compounds represented by the following general formula (III) and having an effective absorption wavelength of from about 270 to 380 nm

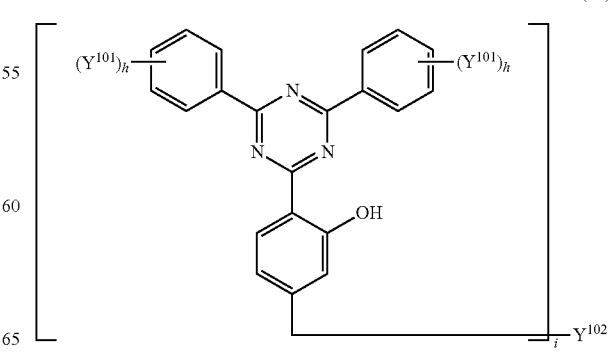

(III)

[In the above general formula (III), i indicates 1 or 2, and h indicates an integer of from 1 to 3; the substituent $Y^{101}$ each independently represents a hydrogen atom, a hydroxyl group, a phenyl group, a halogen atom, a halogenomethyl group, an alkyl group having from 1 to 12 carbon atoms, an alkoxy group having from 1 to 18 carbon atoms, or an alkoxy group having from 1 to 18 carbon atoms and substituted with —COO—(C1 to C18-alkyl) group.

When i is 1, $Y^{102}$ represents an alkyl group having from 1 to 18 carbon atoms, a phenyl group which is unsubstituted or substituted with a hydroxyl group, a halogen atom, or an alkyl or alkoxy group having from 1 to 18 carbon atoms;

an alkyl group having from 1 to 12 carbon atoms and substituted with —COOH, —COOY$^{108}$, —CONH$_2$, —CONHY$^{109}$, —CONY$^{109}$Y$^{110}$, —NH$_2$, —NHY$^{109}$, —NY$^{109}$Y$^{110}$, —NHCOY$^{111}$, —CN and/or —OCOY$^{111}$;

an alkyl group having from 4 to 20 carbon atoms, in which the continuing carbon-carbon bond is interpreted by one or more oxygen atoms and which is unsubstituted or substituted with a hydroxyl group or an alkoxy group having from 1 to 12 carbon atoms, or an alkenyl group having from 3 to 6 carbon atoms, or a glycidyl group, or a cyclohexyl group which is unsubstituted or substituted with an alkyl group having from 1 to 4 carbon atoms and/or —OCOY$^{111}$, or a phenylalkyl group in which the alkyl moiety has from 1 to 5 carbon atoms and which is unsubstituted or substituted with a hydroxyl group, a chlorine atom and/or a methyl group, or —COY$^{112}$ or —SO$_2$Y$^{113}$.

When u is 2, Y2 represents an alkylene group having from 2 to 16 carbon atoms, an alkenylene group having from 4 to 12 carbon atoms, a xylylene group, an alkylene group having from 3 to 20 carbon atoms, in which the continuing carbon-carbon bond is interrupted by one or more —O— atoms and/or substituted with a hydroxyl group, or —CH$_2$CH(OH)CH$_2$—O—Y$^{115}$—OCH$_2$CH(OH)CH$_2$, —CO—Y$^{116}$—CO—, —CO—NH—Y$^{117}$—NH—CO—, or —(CH$_2$)$_{m21}$—CO$_2$—Y$^{118}$—OCO—(CH$_2$)$_{m21}$.

(In the above, m21 indicates 1, 2 or 3; $Y^{108}$ represents an alkyl group having from 1 to 18 carbon atoms, or an alkenyl group having from 3 to 18 carbon atoms, or an alkyl group having from 3 to 20 carbon atoms, in which the continuing carbon-carbon bond is interrupted by one or more oxygen or sulfur atoms or —NT$^{26}$-, and/or substituted with a hydroxyl group, or an alkyl group having from 1 to 4 carbon atoms, which is substituted with —P(O)(OY$^{114}$)2, —NY$^{109}$Y$^{110}$, or —OCOY$^{111}$ and/or a hydroxyl group, or an alkenyl group having from 3 to 18 carbon atoms, or a glycidyl group, or a phenylalkyl group in which the alkyl moiety has from 1 to 5 carbon atoms; $Y^{109}$ and $Y^{110}$ each independently represent an alkyl group having from 1 to 12 carbon atoms, an alkoxyalkyl group having from 3 to 12 carbon atoms, a dialkylaminoalkyl group having from 4 to 16 carbon atoms, or a cyclohexyl group having from 5 to 12 carbon atoms; or $Y^{109}$ and $Y^{110}$ may together form an alkylene, oxaalkylene or azaalkylene group having from 3 to 9 carbon atoms; $Y^{111}$ represents an alkyl group having from 1 to 18 carbon atoms, an alkenyl group having from 2 to 18 carbon atoms, or a phenyl group; $Y^{112}$ represents an alkyl group having from 1 to 18 carbon atoms, an alkenyl group having from 2 to 18 carbon atoms, a phenyl group, an alkoxy group having from 1 to 12 carbon atoms, a phenoxy group, an alkylamino group having from 1 to 12 carbon atoms, or a phenylamino group; $Y^{113}$ represents an alkyl group having from 1 to 18 carbon atoms, a phenyl group, or an alkylphenyl group in which the alkyl group has from 1 to 8 carbon atoms; $Y^{114}$ represents an alkyl group having from 1 to 12 carbon atoms, or a phenyl group; $Y^{115}$ represents an alkylene group having from 2 to 10 carbon atoms, a phenylene group, or -phenylene-M-phenylene-(where M represents —O—, —S—, —SO2-, —CH$_2$— or —C(CH$_2$)$_2$—); $Y^{116}$ represents an alkylene, oxaalkylene or thiaalkylene group having from 2 to 10 carbon atoms, a phenylene group, or an alkenylene group having from 2 to 6 carbon atoms; $Y^{117}$ represents an alkylene group having from 2 to 10 carbon atoms, a phenylene group, or an alkylphenylene group in which the alkyl moiety has from 1 to 11 carbon atoms; and $Y^{118}$ represents an alkylene group having from 2 to 10 carbon atoms, or an alkylene group having from 4 to 20 carbon atoms, in which the continuing carbon-carbon bond is interrupted once or more by oxygen)].

Typical examples of the compound represented by the above general formula (III) include: 2-(4-butoxy-2-hydroxyphenyl)-4,6-di(4-butoxyphenyl)-1,3,5-triazine, 2-(4-butoxy-2-hydroxyphenyl)-4,6-di(2,4-dibutoxyphenyl)-1,3,5-triazine, 2,4-di(4-butoxy-2-hydroxyphenyl)-6-(4-butoxyphenyl)-1,3,5-triazine, 2,4-di(4-butoxy-2-hydroxyphenyl)-6-(2,4-dibutoxyphenyl)-1,3,5-triazine, 2,4,6-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris(2-hydroxy-4-(3-butoxy-2-hydroxypropoxy)phenyl)-1,3,5triazine, 2-(2-hydroxyphenyl)-4-(4-methoxyphenyl)-6-phenyl-1,3,5-triazine, 2-{2-hydroxy-4-[3-(2-ethylhexyl010ixy)-2-hydroxy-propyloxy]phenyl}-4,6-bis(2,4-dimethylphenyl)-1,3,5-triazine, 2-(2-hydroxy-4-(2-ethylhexyl)oxy)phenyl-4,6-di(4-phenyl)phenyl-1,3,5-triazine, etc.

As the benzophenone compound, preferred are those having an effective absorption wavelength of from about 270 to 380 nm; and typical examples thereof include: 2,4-dihydroxybenzophenone, 2-hydroxy-4-methoxybenzophenone, 2-hydroxy-4-octyloxybenzophenone, 2-hydroxy-4-decyloxybenzophenone, 2-hydroxy-4-dodecyloxybenzophenone, 2-hydroxy-4-benzyloxybenzophenone, 2-hydroxy-4-(2-hydroxy-3-methacryloxypropoxy)benzophenone, 2-hydroxy-4-methoxy-5-sulfobenzophenone, 2-hydroxy-4-methoxy-5-sulfobenzophenone trihydrate, 2-hydroxy-4-methoxy-2'-carboxybenzophenone, 2-hydroxy-4-octadecyloxybenzophenone, 2-hydroxy-4-diethylamino-2'-hexyloxycarbonylbenzophenone, 2,2'-dihydroxy-4-methoxybenzophenone, 2,2',4,4'-tetrahydroxybenzophenone, 2,2'-dihydroxy-4,4'-dimethoxybenzophenone, 1,4-bis(4-benzyloxy-3-hydroxyphenoxy)butane, etc.

As the salicylic acid compound, preferred are those having an effective absorption wavelength of from about 290 to 330 nm; and typical examples thereof include: phenyl salicylate, 4-t-butylphenyl salicylate, 4-octylphenyl salicylate, dibenzoylresorcinol, bis(4-t-butylbenzoyl)resorcinol, benzoylresorcinol, 2,4-di-t-butylphenyl-3,5-di-t-butyl-4-hydroxysalicylate, hexadecyl-3,5-di-t-butyl-4-hydroxysalicylate, etc.

As the acrylate compound, preferred are those having an effective absorption wavelength of from about 270 to 350 nm; and typical examples thereof include: 2-ethylhexyl-2-cyano-3,3-diphenylacrylate, ethyl-2-cyano-3,3-diphenylacrylate, isooctyl-2-cyano-3,3-diphenylacrylate, hexadecyl 2-cyano-3-(4-methylphenyl)acrylate, methyl-2-cyano-3-methyl-3-(4-methoxyphenyl)cinnamate, butyl-2-cyano-3-methyl-3-(4-methoxyphenyl)cinnamate, methyl-2-carbomethoxy-3-(4-methoxyphenyl)cinnamate, 2-cyano-3-(4-methylphenyl)acrylic acid salt, 1,3-bis(2'-cyano-3,3'-diphenylacryloyl)oxy)-2,2-bis(((2'-cyano-3,3'-diphenylacryloyl)oxy)methyl)propane, N-(2-carbomethoxy-2-cyanovinyl)-2-methylindoline, etc.

As the oxalic diamide compound, preferred are those having an effective absorption wavelength of from about 250 to 350 nm; and typical examples thereof include: 4,4'-dioctyloxyoxanilide, 2,2'-dioctyloxy-5,5'-di-t-butyloxanilide, 2,2'-didodecyloxy-5,5'-t-butyloxanilide, 2-ethoxy-2'-ethyloxanilide, N,N'-bis(3-dimethylaminopropyl)oxamide, 2-ethoxy-5-t-butyl-2'-ehtyloxanilide, 2-ethoxy-2'-ethyl-5,4'-di-t-butyloxanilide, etc.

For obtaining the UV absorbent in a commercial manner, for example, there are mentioned TINUVIN 326 (by BASF), etc.

Examples of the other material usable in formation of the protective layer include surfactant, etc. As the surfactant, preferred is a fluorosurfactant. For obtaining the surfactant in a commercial manner, for example, there are mentioned MEGAFAC F-780F (by DIC), etc. In addition, the fluorine-containing horizontal alignment agents shown in [0073] to [0097] in this description are also usable.

In case where the protective layer is formed by coating, the materials usable in forming the protective layer, such as the binder and others mentioned above, may be dispersed or dissolved in any desired solvent to prepare a coating liquid. Preferably used is the solvents shown in [0101] in this description.

Subsequently, it is desirable that the coating liquid is applied onto the liquid-crystal layer in which the cholesteric liquid-crystal phase is fixed and dried thereon, according to a known method, thereby forming a layer that contains, as the binder, a polymer having a high Tg or at least one bifunctional or higher polyfunctional polymerizable monomer and/or polymerizable polymer. Preferably, the thus-formed layer is polymerized by photoirradiation or heating.

Preferably, the thickness of the protective layer is from 0.1 to 20 µm, more preferably from 0.5 to 5 µm.

(Liquid-Crystal Layer Formed by Fixing Cholesteric Liquid-Crystal Phase)

As described above, the film of the invention has a liquid-crystal layer in which a cholesteric liquid-crystal phase is fixed (the layer may be hereinafter abbreviated as a liquid-crystal layer).

In the invention, it is desirable that the laminate has four or more liquid-crystal layers each having a fixed cholesteric liquid-crystal phase therein. Specifically, it is desirable that the liquid-crystal layer comprises four or more layers each having a fixed cholesteric liquid-crystal phase therein. FIG. 4 shows one example of the laminate configuration of the liquid-crystal layer with a cholesteric liquid-crystal phase fixed therein, in which 1 is the liquid-crystal layer having a cholesteric liquid-crystal phase fixed therein, and 15a, 15b, 16a and 16b each indicate a light reflection layer.

Preferably, the light reflection layers 15a, 15b, 16a and 16b are liquid-crystal layers each with a cholesteric liquid-crystal phase fixed therein, and also preferably, these layers exhibit a selective reflection characteristic of reflecting light having a specific wavelength. In one embodiment of the invention, the helical direction of the cholesteric liquid-crystal phase is opposite to each other in the neighboring light reflection layers 15a and 15b, and the two layers are the same in point of the reflection center wavelength $\lambda_{15}$ thereof. Similarly, in the neighboring light reflection layers 16a and 16b, the helical direction of the cholesteric liquid-crystal phase is opposite to each other, and the two layers are the same in point of the reflection center wavelength $\lambda_{16}$ thereof. In this embodiment, the constituent layers satisfy $\lambda_{15} \neq \lambda_{16}$, and therefore, the light reflection layers 15a and 15b selectively reflect the left-handed circularly-polarized light and the right-handed circularly-polarized light at a predetermined wavelength $\lambda_{15}$, while the light reflection layers 16a and 16b selectively reflect the left-handed circularly-polarized light and the right-handed circularly-polarized light at a wavelength $\lambda_{16}$ that differs from the wavelength $\lambda_{15}$, and as a whole, the liquid-crystal layer of this embodiment exhibits a broadband reflection characteristic.

In FIG. 4, the selective reflection center wavelength $\lambda_{15}$ of the light reflection layers 15a and 15b may fall, for example, in a range of from 1010 to 1070 nm, while the selective reflection center wavelength $\lambda_{16}$ of the light reflection layers 16a and 16b may fall, for example, in a range of from 1190 to 1290 nm; or that is, the two may differ from each other. Using such two pairs of IR reflection layers, of which the selective reflection wavelength differently falls within the above-mentioned range, improves the IR reflection efficiency of the laminate structure. The spectral distribution of sunlight energy intensity shows a general tendency of such that the shorter wavelength has a higher energy level, while the spectral distribution in an IR wavelength region has two energy intensity peaks at a wavelength of from 950 to 1130 nm and at a wavelength of from 1130 to 1350 nm. Consequently, using at least one pair of IR reflection layers of which the selective reflection center wavelength falls within a range of from 1010 to 1070 nm (more preferably from 1020 to 1060 nm) and at least one pair of IR reflection layers of which the selective reflection center wavelength falls within a range of from 1190 to 1290 nm (more preferably from 1200 to 1280 nm) makes it possible to more efficiently reflect light corresponding to the two peaks, and, as a result, the heat shieldability of the laminate structure of the type can be thereby improved more.

The helical pitch of the cholesteric liquid-crystal phase of which the reflection center wavelength falls within the above-mentioned IR region is, in general, from 650 to 690 nm or so when the wavelength $\lambda_{15}$ is within the above-mentioned range of from 1010 to 1070 nm, and is from 760 nm to 840 nm or so when the wavelength $\lambda_{16}$ is within the above-mentioned range of from 1190 to 1290 nm.

On the other hand, in case where the film of the invention exhibits a selective reflection characteristic in a UV wavelength region, it is desirable to use a pair of light reflection layers of which the selective reflection center wavelength falls within a UV region of from 10 to 400 nm, more preferably from 315 to 400 nm (UVA region), even more preferably from 370 to 400 nm. In general, a UV absorbent is used as a UV-cut material. However, many UV absorbents capable of effectively absorbing a UV ray at 400 nm are yellowish, and therefore, such yellowish UV absorbents or other UV absorbents capable of transmitting a UV ray at 400 nm are mainly distributed on the market. Accordingly, selective reflection in a UV wavelength region of from 370 to 400 nm satisfies both 400-nm UV shieldability and yellowing prevention. In addition, using together with a layer that contains an ordinary UV absorbent (TINUVIN 326 (by BASF) or the like) could make it possible to block the entire UVA region.

In case where the film of the invention exhibits a selective reflection characteristic in a visible light region, it is desirable to use at least one pair of light reflection layers of which the selective reflection center wavelength falls with a visible light region of from 380 to 780 nm.

The thickness of each light reflection layer is from 1 µm to 8 µm or so (preferably from 3 to 7 µm or so). However, the thickness is not limited to the range. By suitably selecting the type of the material for use in forming the layers and by suitably controlling the concentration thereof, it is possible to form a light reflection layer having a desired helical pitch. In addition, the thickness of the layer may be controlled to fall within a desired range by controlling the coating amount for the layer.

As described above, it is desirable that, in the neighboring light reflection layers 15a and 15b, the helical direction of the cholesteric liquid-crystal phase is opposite to each other, and similarly, in the neighboring light reflection layers 16a and 16b, the helical direction of the cholesteric liquid-crystal phase is opposite to each other. In that manner, providing the light reflection layers, in which the direction of the cholesteric liquid-crystal phase is opposite to each other but which are the same in point of the selective reflection center wavelength thereof, near to each other secures reflection of both the two of the left-handed circularly-polarized light and the right-handed circularly-polarized light at the same wavelength.

For example, in case where the light having passed through the light reflection layer 16b (which has reflected the right-handed circularly-polarized light having a wavelength $\lambda_{16}$ has transmitted only the left-handed circularly-polarized light having that wavelength) does not pass through 16b but passes through 15a or 15b of which the selective reflection center wavelength is not $\lambda_{16}$, the left-handed circularly-polarized light component at a wavelength of $\lambda_{16}$ shall pass through the cholesteric liquid-crystal layer that differs in point of the size of the helical pitch. In this case, the left-handed circularly-polarized light component is, though only slightly, influenced by the optical rotation of the cholesteric liquid-crystal phase in the other light reflection layers, therefore providing a change that the wavelength of the left-handed circularly-polarized light component would be shifted. Naturally, this phenomenon is not limited to the "left-handed circularly-polarized light component having a wavelength of $\lambda_{16}$, or that is, the phenomenon is a change that may occur in any case where a circularly-polarized light at a wavelength passes through a cholesteric liquid-crystal phase having a different helical pitch. The present inventors made various investigations and, as a result, though from the data of an experimental rule, have found that, when one circularly-polarized light component is, while not reflected by the cholesteric liquid-crystal layer having a predetermined helical pitch, to pass through any other cholesteric liquid-crystal layer having a different helical pitch, and when the number of the layers through which the light passes is 3 or more, then the negative influence on the circularly-polarized light component that passes through the layers would be augmented and, after that, even when the circularly-polarized light could reach the cholesteric liquid-crystal layer that could reflect the light, the reflectance of the layer greatly lowers. In the invention, even when the pair of light reflection layers which are the same in point of the selective reflection center wavelength but which differ from each other in point of the helical direction are not disposed adjacent to each other, the configuration could enjoy the advantageous effects of the invention; but preferably, the number of the other light reflection layer to be arranged between that pair of light reflection layers (that is, a light reflection layer which is formed by fixing a cholesteric liquid-crystal phase having a different helical pitch and which differs in point of the selective reflection center wavelength) is 2 or less. Needless-to-say, it is desirable that the pair of light reflection layers are adjacent to each other.

In the configuration of the invention having a $\lambda/2$ layer therein, it is desirable that the liquid-crystal layer with the cholesteric liquid-crystal phase fixed therein is a laminate of two or more layers. This configuration is composed of liquid-crystal layer with cholesteric liquid-crystal phase fixed therein:$\lambda/2$ layer:liquid-crystal layer with cholesteric liquid-crystal phase fixed therein, and as a whole, this is a laminate of four or more cholesteric liquid-crystal layers.

The embodiment of the cholesteric liquid-crystal phase is not limited to the above-mentioned one. The layer may have a laminate configuration of 5 or more light reflection layers laminated on one surface of a substrate, or may have a laminate configuration having, on both surfaces of a substrate, at least one pair of light reflection layers (at least 5 layers in total). In addition, the layer may also have another configuration embodiment that has at least two pairs of light reflection layers each having the same reflection center wavelength.

The thickness of each light reflection layer that constitutes the liquid-crystal layer in which the cholesteric liquid-crystal phase is fixed is preferably from 1 to 10 µm, more preferably from 2 to 7 µm. The total thickness of the liquid-crystal layer is preferably from 10 to 50 µm, more preferably from 20 to 40 µm.

(Characteristics of Film)

In the method for producing the laminated glass of the invention to be mentioned below, the thermal shrinkage of the liquid-crystal layer in which the cholesteric liquid-crystal phase is fixed, before and after the step of heating and pressing the laminate of the invention in which the liquid-crystal layer is sandwiched between the above-mentioned glass sheets, is preferably from 0.1 to 5% in the range of the heating temperature during the stage, more preferably from 0.1 to 3%, even more preferably from 0.5 to 2%.

Through varying depending on the number of the laminated light reflection layers, the thickness of the film is preferably from 5 to 100 µm, more preferably from 10 to 50 µm, even more preferably from 20 to 40 µm.

In the invention, the material for the liquid-crystal layer in which the cholesteric liquid-crystal phase is fixed may be a brittle one. Such a brittle liquid-crystal layer includes, for example, the light reflection layer of the above-mentioned cholesteric liquid-crystal layer.

(Support)

In the step of producing the laminate sandwiched between the glass sheets in the production method of the invention, it is desirable that the resin film includes a support of a transparent thermoplastic resin film or the like, from the viewpoint of stably forming the light reflection layer of the liquid-crystal layer in which the cholesteric liquid-crystal phase is fixed. However, the support may remain or may not remain in the laminate of the invention or in the laminated glass of the invention to be mentioned hereinunder.

Above all, in the laminate of the invention or in the laminated glass of the invention to be mentioned below, it is desirable that the support does not remain in the film of the invention. Specifically, in the laminate of the invention or in the laminated glass of the invention to be mentioned below, it is desirable that the liquid-crystal film in which the cholesteric liquid-crystal phase is fixed is kept in contact with the first interlayer to be mentioned below and that the liquid-crystal film in which the cholesteric liquid-crystal phase is fixed is also kept in contact with the second interlayer to be mentioned below. However, the laminate of the invention or the laminated glass of the invention to be mentioned below may have a support or any other thermoplastic resin between the liquid-crystal layer in which the cholesteric liquid-crystal phase is fixed and the second interlayer therein; and the embodiment of the type could also sufficiently enjoy the advantageous effects of the invention.

Not specifically defined at all, the support may be any one having a self-supporting capability and capable of supporting the above-mentioned light reflection layers. In particular, in case where multiple light reflection films are laminated to form a light reflection layer, the support may include underlying light reflection layers and overlying light reflection layers may be laminated in order on the underlying light reflection layers.

In the production method of the invention, preferably, the support is a plastic one, from the viewpoint of roll-to-roll production of the support.

The support may be transparent or may not be transparent. Above all, the support is preferably a transparent thermoplastic resin film. However, in case where the support is peeled away in the production method of the invention, the support may not be transparent. The haze of the support is preferably at most 3%, more preferably at most 1%. The support maybe a special retardation plate such as a $\lambda/2$ plate or the like to be produced in a controlled process, or may also be a polymer film or the like which has a great in-plane retardation fluctuation level, concretely, in terms of the plate retardation Re(1000) fluctuation at a wavelength of 1000 nm, the support may be a polymer film or the like which has an Re(1000) fluctuation level of at least 20 nm, even at least 100 nm and which is therefore useless as predetermined retardation plates. In addition, the in-plane retardation of the support is not also specifically defined, and for example, a retardation plate or the like having an in-plane retardation Re(1000) at a wavelength of 1000 nm of from 800 to 13000 nm is employable here.

Preferably, the support for use in the invention is rigid enough to be resistant to pressure bonding thereof to the first and second interlayers of polyvinyl butyral resin films or the like, or in case where the support remains in the resin film, resistant to the contraction or elongation of the polyvinyl butyral resin during formation of laminated glass; and it is desirable that the Young's modulus of the support is approximately from 100 times to 1000 times that of the polyvinyl butyral resin. Having the configuration, the resin film including the peripheral part thereof can be prevented from being cracked or wrinkled, and therefore the reflection unevenness of the laminated glass to be obtained can be more effectively inhibited.

As the polymer film having a high visible light transmittance, there are mentioned polymer films for various optical films for use as members of display devices such as liquid-crystal display devices, etc. Examples of the transparent thermoplastic resin film include, for example, those comprising, as the main ingredient thereof, polyesters such as polyethylene terephthalate (PET), polybutylene terephthalate, polyethylene naphthalate (PEN), etc.; polycarbonate (PC), polymethyl methacrylate; polyolefins such as polyethylene, polypropylene, etc.; polyimide, triacetyl cellulose (TAC), etc. Of those, preferred are films comprising, as the main ingredient thereof, polyethylene terephthalate and/or triacetyl cellulose.

The material to form the support is determined, depending on whether or not the support is an optically isotropic support or an optically anisotropic support. For an optically isotropic support, in general, used is glass or cellulose ester. For an optically anisotropic support, in general, used is synthetic polymer (e.g., polycarbonate, polysulfone, polyether sulfone, polyacrylate, polymethacrylate, norbornene resin). However, as described in EP 0911656 A2, it is possible to produce an optically-anisotropic (high-retardation) cellulose ester film according to (1) use of a retardation enhancer, (2) reduction in the degree of acetylation of cellulose acetate or (3) film production in a cooling dissolution method. Preferably, the support formed of a polymer film is produced according to a solvent casting method.

For obtaining an optically anisotropic support, preferably, a polymer film is stretched. In producing an optically monoaxial support, employable is any ordinary monoaxial stretching treatment or biaxial stretching treatment. For producing an optically biaxial support, preferred is unbalanced biaxial stretching treatment. In unbalanced biaxial stretching treatment, a polymer film is stretched in a certain direction at a predetermined stretch ratio (for example, by from 3 to 100%, preferably from 5 to 30%), and then further stretched in the direction perpendicular to the former direction at a stretch ratio higher than the former stretch ratio (for example, by from 6 to 200%, more preferably from 10 to 90%). The stretching treatment in two directions may be carried out at the same time. Preferably, the stretching direction (in unbalanced biaxial stretching, the direction in which the stretch ratio is higher) and the in-plane slow axis of the stretched film could be substantially the same directions. Preferably, the angle between the stretching direction and the slow axis is less than 10°, more preferably less than 5°, most preferably less than 3°.

The optically anisotropic support may be given a desired retardation and can be used as a $\lambda/2$ plate. In this case, the retardation is preferably from 350 nm to 700 nm, more preferably from 400 to 650 nm.

Preferably, the thickness of the support is from 30 µm to 200 µm, more preferably from 100 to 200 µm. Using the support that has the thickness falling within the range makes it possible to stably produce the above-mentioned IR reflection layer. In case where the laminate sandwiched between glass plates contains the support, the resin film including its peripheral part can be prevented from being cracked or wrinkled, and therefore the laminated glass to be obtained can be effectively prevented from being troubled by reflection unevenness.

For improving the adhesion of the support to the overlying layers (adhesive layer, alignment layer or optically anisotropic layer), the support may undergo surface treatment (e.g., glow discharge treatment, corona discharge treatment, UV treatment, flame treatment). A UV absorbent may be added to the support. An adhesive layer (undercoat layer) may be formed on the support. The adhesive layer is described in JP-A 7-333433. The thickness of the adhesive layer is preferably from 0.1 to 2 µm, more preferably from 0.2 to 1 µm.

(Use of Film of Invention)

One embodiment of the film of the invention is an optically anisotropic film, in which the alignment (for example, horizontal alignment, vertical alignment, hybrid alignment, etc.) of the liquid-crystal phase of the polymerizable composition of the invention is fixed. The film of the type is used as a reflection film, an optical compensatory film in liquid-crystal display devices, etc.

One embodiment of the film of the invention is a film, in which the cholesteric liquid-crystal phase of the polymerizable composition of the invention is fixed and which exhibits a selective reflection characteristic to light falling within a predetermined wavelength region.

The film of the type which exhibits a selective reflection characteristic in an IR wavelength region (wavelength of from 800 to 1300 nm) can be used as a heat-shielding member, for example, as stuck to windowpanes of buildings or vehicles, or incorporated in laminated glass.

Another embodiment of the film of the invention is a film that exhibits a selective reflection characteristic in a UV wavelength region. The film that exhibits a selective reflection characteristic in a UV wavelength region can be used as a UV-cut member of the like, for example, as stuck to windowpanes of buildings or vehicles, or incorporated in laminated glass.

Another embodiment of the film of the invention is a film that exhibits a selective reflection characteristic in a visible light wavelength region. The film that exhibits a selective reflection characteristic in a visible light wavelength region can be used, for example, as a color filter, etc.

In addition, the film of the invention can also be used in other various applications, for example, as polarizing elements, selective reflection films, antireflection films, view angle compensation films, holography, alignment films and the like that are constituent elements of optical devices.

[Selective Reflector]

The selective reflector of the invention contains the film of the invention.

Preferably, the selective reflector of the invention contains a λ/2 plate. Not specifically defined, the λ/2 plate maybe any one suitably selected in accordance with the intended use thereof.

The 1/2 wavelength plate is, for example, obtained by stretching a film of a transparent resin.

Not specifically defined, the transparent resin may be any one having a whole light transmittance of at least 80% as a 0.1-mm film thereof, and there are mentioned acetate resin such as triacetyl cellulose, and polyester resin, polyether sulfone resin, polycarbonate resin, linear polyolefin resin, alicyclic structure-having polymer resin, acrylic resin, polyvinyl alcohol resin, polyvinyl chloride resin, etc. Above all, preferred are polycarbonate resin and alicyclic structure-having polymer resin. Concretely, the alicyclic structure-having polymer resin includes (1) norbornene polymer, (2) monocyclic olefin polymer, (3)cyclic conjugated diene polymer, (4) vinyl-alicyclic hydrocarbon polymer, and hydrogenated derivatives thereof.

If desired, any known additive, such as antioxidant, heat stabilizer, light stabilizer, UV absorbent, antistatic agent, dispersant, chlorine scavenger, flame retardant, crystallization nucleating agent, antiblocking agent, antifogging agent, mold release agent, pigment, organic or inorganic filler, neutralizing agent, lubricant, decomposing agent, metal inactivator, antifouling agent, antimicrobial agent, thermoplastic elastomer and the like, may be added to the resin.

In addition, as the 1/2 wavelength plate, also usable here are one prepared by applying a liquid-crystal compound onto a transparent resin, and aligning and fixing it thereon; an inorganic crystal such as quartz, sapphire or the like; and a structural birefringent plate prepared by working the surface of a resin or glass substrate to make it have fine irregularities thereon.

In place of the glass plates between which the selective reflector is sandwiched, also usable here are a glass-substitute resin shaped articles, as well as combination of glass-substitute resin shaped articles with glass. Examples of the glass-substitute resin include polycarbonate resin, acrylic resin, methacrylic resin, etc. Also usable here are those prepared by coating such a glass-substitute resin with a hard coat layer. Examples of the hard coat layer include an acrylic hard coat material, a silicone hard coat material, a melamine hard coat material, and those prepared by dispersing inorganic particles of silica, titania, alumina, zirconia or the like in those hard coat materials.

[Laminate]

The laminate of the invention is formed by the use of the selective reflector of the invention, and has at least a liquid-crystal layer formed by fixing the cholesteric liquid-crystal phase of the selective reflector. Preferably, the laminate of the invention contains an interlayer in at least one outermost layer thereof, from the viewpoint of facilitating the production of laminated glass.

(Interlayer)

Preferably, the laminate of the invention contains an interlayer and further contains a second interlayer. In an ordinary laminated glass, the first and the second interlayers on both sides of the liquid-crystal layer therein have the same thickness; however, the invention is not limited to the production method for the laminate for the laminated glass of that embodiment. In the invention, there can be produced a laminate of an embodiment where the thickness of the first interlayer differs from that of the second interlayer. In this, the composition of the first interlayer may be the same as or may differ from that of the second interlayer.

The thermal shrinkage of the first and second interlayers before and after the step of thermally pressing the laminate under heat is preferably from 1 to 20% at the heating temperature during the time, more preferably from 2 to 15%, particularly preferably from 2 to 10%.

Preferably, the thickness of the first and second interlayers is from 100 to 1000 µm each, more preferably from 200 to 800 µm, even more preferably from 300 to 500 µm. The first and second interlayers may be thickened by laminating multiple sheets.

Regarding the standard of the brittleness of the first and second interlayers, it is desirable that the elongation at break of each film in a tensile test is from 100 to 800%, more preferably from 100 to 600%, even more preferably from 200 to 500%.

Preferably, the first and second interlayers are resin interlayers. Preferably, the resin interlayers are resin films of which the main ingredient is a polyvinyl acetal resin. The polyvinyl acetal resin film is not specifically defined, for which, for example, herein usable are those described in JP-A 6-000926 and 2007-008797. Of the polyvinyl acetal resin film, more preferred for use herein is a polyvinyl butyral resin film. Not specifically defined, the polyvinyl butyral resin film may be any resin film in which the main ingredient is polyvinyl butyral. Any polyvinyl butyral resin film widely known in the art for laminated glass is employable here. Above all, in the invention, polyvinyl butyral or ethylene vinyl acetate is preferred for the interlayer. The resin of the main ingredient is meant to indicate the resin that accounts for at least 50% by mass of the resin interlayer layer.

Additive:

Within a range overstepping the spirit and the scope of the invention, the first and second interlayers may contain additive.

The additive includes, for example, heat ray-shielding fine particles, sound-shielding fine particles, and plasticizer. As the heat ray-shielding fine particles and the sound-shielding fine particles, for example, inorganic fine particles and metal fine particles are usable here. Dispersing and mixing such fine particles in the elastic material of the first or second interlayer provides the intended heat-shielding effect. Simultaneously, the constitution inhibits sound wave propagation, therefore favorably providing an additional vibration attenuating effect. The fine particles are preferably spherical ones, but may not be true-spherical ones. Their shape may be suitably changed or modified. Preferably, the fine particles are dispersed in the interlayer (preferably PVB), and they may be added to the film by encapsulating in suitable capsules or may be added thereto along with a dispersant. In this case, the amount to be added is not specifically defined. Preferably, the amount is from 0.1 to 10% by mass of the resin component.

As the fine particles, there are mentioned calcium carbonate, alumina, kaolin clay, calcium silicate, magnesium oxide, magnesium hydroxide, aluminium hydroxide, magnesium carbonate, talc, feldspar powder, mica, barite, barium carbonate, titanium oxide, silica, glass beads, etc. One type alone or two or more different types of these may be used here either singly or as combined.

As the heat ray-shielding fine particles, there are mentioned tin-doped indium oxide (ITO), antimony-doped tin oxide (ATO), aluminium-doped zinc oxide (AZO), indium-doped zinc oxide (IZO), tin-doped zinc oxide, silicon-doped zinc oxide, zinc antimonate, lanthanum hexaboride, cerium hexaboride, gold powder, silver powder, platinum powder, aluminium powder, iron, nickel, copper, stainless, tin, cobalt, and alloy powders containing these, etc. As the light-shielding agent, there are mentioned carbon black, red iron oxide, etc. As the pigment, there are mentioned a dark reddish, mixed pigment prepared by mixing four pigments of a black pigment carbon black, a red pigment (C.I. Pigment Red), a blue pigment (C.I. Pigment Blue) and a yellow pigment (C.I. Pigment Yellow), etc.

The plasticizer is not specifically defined. Any known plasticizer generally used as the plasticizer for the interlayers of the type is employable here. For example, there are mentioned triethylene glycol di-2-ethyl butyrate (3GH), triethylene glycol di-2-ehtylhexanoate (3GO), triethylene glycol di-n-heptanoate (3G7), tetraethylene glycol di-2-ehtylhexanoate (4GO), tetraethylene glycol di-n-heptanoate (4G7), oligoethylene glycol di-2-ethylhexanoate (NGO), etc. In general, the plasticizer is used here in an amount of from 25 to 70 parts by mass relative to 100 parts by mass of the main ingredient resin (preferably polyvinyl acetal resin) of the resin interlayer.

<Step of Thermally Bonding Interlayer to Liquid-Crystal Layer of Film of the Invention>

Preferably, the method for producing the laminate of the invention includes, after the step of laminating the support/liquid-crystal layer/interlayer in that order, a step of thermally bonding the interlayer to the liquid-crystal layer-attached support. In the production method for the laminate of the invention, the thermal bonding step is carried out before the support-peeling step to be mentioned below, and therefore in the production method, position gap can be evaded in peeling the support.

The thermal bonding method is not specifically defined, for which employable here is thermal pressure bonding that uses a heating unit, a thermal fusion by laser irradiation, etc. Above all, in the production method for the laminate of the invention, it is desirable that the step of thermally bonding the liquid-crystal layer to the interlayer is attained by thermal pressure bonding.

The thermal pressure bonding method is not specifically defined. For example, preferred is a method where a heating unit at from 80 to 140° C. is pressed against the film. The heating unit may be a flat or curved one, or may also be a roller. For the thermal pressure bonding, there may be employed multiple heating rollers or heatable flat pinching surfaces, as well as combinations thereof. The thermal pressure bonding may be applied to one side of the support/liquid-crystal layer/interlayer, or that is, maybe applied to only one surface thereof; and in the case, one of the rollers for use for the thermal pressure bonding may be a roller or a pinching surface that is not heated. Of the above, it is desirable that, in the production method for the laminate of the invention, a heating roller is used in the thermal pressure bonding step, and more preferably, a heating roller and a non-heating roller are used as combined.

In the production method for the laminate of the invention, it is desirable that the thermal pressure bonding step includes a step of thermally bonding the start position of the support at which the support is peeled in the peeling step. Here, it is desirable that the start position of the support at which the support is peeled in the peeling step is concretely within 10 mm from the edge of the support, more preferably within 5 mm, even more preferably within 1.5 mm.

Spot-laminating the laminate of support/liquid-crystal layer/interlayer as laminated in that order, at a desired position could make it possible to prevent position gap in support peeling, and in the invention, a specific position of the edge of the support that may be a trigger of peeling is laminated, therefore more facilitating the support peeling.

(Details of Method of Thermal Pressure Bonding of Interlayer and Liquid-Crystal Layer of Liquid-Crystal Layer-Attached Support)

Preferably, the interlayer and the liquid-crystal layer of the liquid-crystal layer-attached support are thermally bonded under pressure with a thermal pressure bonding roller.

In general, the temperature is room temperature. The temperature of the thermal pressure bonding roller may be, for example, from 60 to 120° C. when the liquid-crystal layer 1 and the first interlayer 3 are adjacent to each other.

In general, the surface of the interlayer is roughened by embossing in order that air could readily have an escape in bonding. The bonded surface could be smooth, following the surface to which it has been bonded, and therefore could have a bettered optical property; however, the other surface must be kept roughened in order that it is bonded to a glass sheet or the like. Accordingly, it is desirable that, of the thermal pressure bonding rollers, the surface of the roller that is to be kept in contact with the interlayer is roughened so as to secure the roughened surface of the interlayer. Specifically, it is desirable that at least one surface of the interlayer is embossed and that the embossed surface of the interlayer is kept in contact with the liquid-crystal layer of the film of the invention in laminating the layers. After the thermal pressure bonding, the surface of the interlayer not kept in contact with the liquid-crystal layer may be positively embossed.

<Step of Peeling Support from Liquid-Crystal Layer>

Preferably, the production method for the laminate of the invention includes a step of peeling the support from the liquid-crystal layer after thermal pressure bonding.

Preferably, in the production method for the laminate of the invention, peeling the support is initiated at least from one corner of the support. In case where the support peeling is carried out continuously by the use of a peeling roller, it is more desirable that the support peeling is initiated from the entire one side of the support.

<Step of Laminating Second Interlayer>

Preferably, the production method for the laminate of the invention includes a step of laminating a second interlayer on the side of the liquid-crystal layer from which the support has been peeled, after the step of peeling the support therein. Specifically, it is desirable that the laminate of the invention further has a second interlayer.

The liquid-crystal layer 1 and the second interlayer 3' may be adjacent to each other, or may have any other constituent layer therebetween. Preferably, however, the liquid-crystal layer 1 and the second interlayer 3' are adjacent to each other. The other constituent layer in the case may be an adhesive layer. In general, the adhesive layer is provided on the side of the second interlayer.

Preferably, the laminate is thermally bonded under pressure with a thermal pressure bonding roller.

In this case, the temperature is generally room temperature. The temperature of the thermal pressure bonding roller may be from 60 to 120° C., for example, in case where the liquid-crystal layer 1 and the second interlayer are adjacent to each other.

In working it, the laminate including the liquid-crystal layer and the interlayer may be cut with an edge tool, or may be cut by a laser, a water jet or heat.

[Laminated Glass]

The use of the laminated glass of the invention is not specifically defined. Preferably, the laminated glass is for windowpanes for houses, automobiles, etc.

The laminated glass of the invention has the laminate of the invention obtained in the above and at least two glass sheets, in which the laminate is inserted into the two glass sheets. Preferably, the glass sheets are first and second glass sheets. Preferred embodiments of the case are described below.

The laminated glass of the invention may be favorably cut into any desired size, and also in the case, the liquid-crystal layer in the laminated glass of the invention is prevented from being cracked including the peripheral part thereof, and therefore, even when the laminated glass of the invention is cut into a desired size, wrinkling or cracking could hardly spread in the entire region of the laminated glass.

The method of laminating the laminate of the invention, which includes the liquid-crystal layer and the interlayer mentioned above, with the first and second glass sheets is not specifically defined. The laminate may be inserted into two glass sheets according to a known method for the intended lamination.

The laminate thus sandwiched between the glass sheets has a configuration of glass sheet/interlayer/liquid-crystal layer with cholesteric liquid-crystal phase fixed therein/interlayer/glass sheet as laminated in that order.

Figure 2:
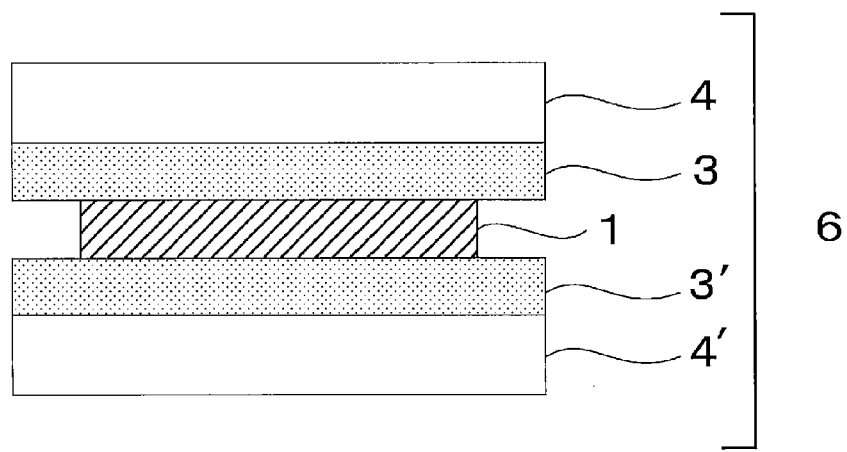
FIG. 2 is a schematic view showing a cross section of another example of the laminated glass of the invention.
Figure 3:
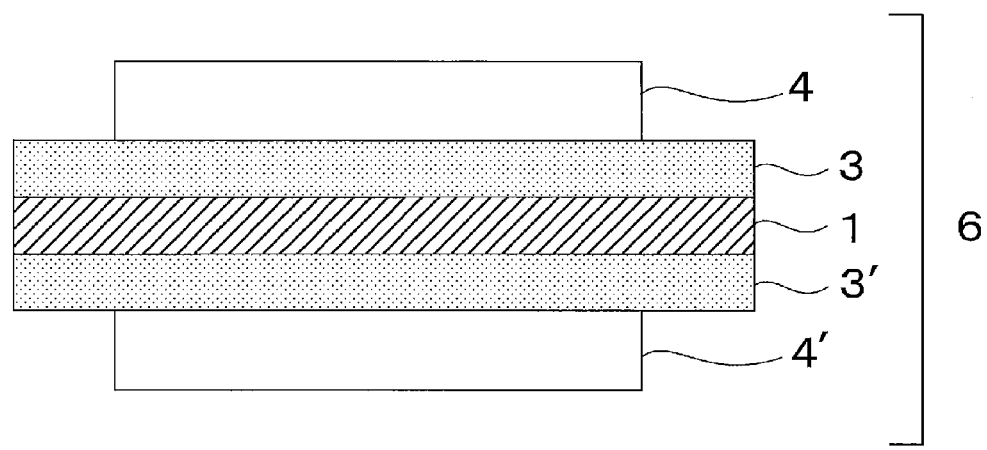
FIG. 3 is a schematic view showing a cross section of another example of the laminated glass of the invention.

FIG. 1 to FIG. 3 are schematic views showing examples of the configuration of the laminated glass which contains the laminate sandwiched between glass sheets and which is obtained according to the production method of the invention. In FIG. 1 to FIG. 3, 1 is a liquid-crystal layer in which the cholesteric liquid-crystal phase is fixed; 3 is an interlayer; 3' is a second interlayer; 4 is a first glass sheet; and 4' is a second glass sheet. FIG. 2 shows an embodiment in which, in the laminate sandwiched between the glass sheets, the edges of the liquid-crystal layer with the cholesteric liquid-crystal phase fixed therein are on the inner side than the edges of the glass sheets 4 and 4' and the edges of the first interlayer 3 and the second interlayer 3'. The edges of the glass sheets 4 and 4' may be on the same position as that of the edges of the first interlayer 3 and the second interlayer 3', or any of them may protrude from the others.

In the laminate sandwiched between the glass sheets, the edges of the liquid-crystal layer with the cholesteric liquid-crystal phase fixed therein maybe on the same position as that of the edges of the glass sheets and the edges of the interlayers, as in FIG. 1. For example, in the configuration of the type where the laminate sandwiched between the glass sheets has four sides, the edges of the liquid-crystal layer 1 with the cholesteric liquid-crystal phase fixed therein are on the same positions as those of the edges of the glass sheets 4 and 4' and the edges of the first interlayer 3 and the second interlayer 3' in all of the four sides thereof, as in FIG. 1.

On the other hand, the invention may have another configuration in which the edges of the liquid-crystal layer 1 with the cholesteric liquid-crystal phase fixed therein protrude from the edges of the glass sheets 4 and 4' and the edges of the first interlayer 3 and the second interlayer 3' in all of the four sides thereof, as in FIG. 3.

In the laminate sandwiched between the glass sheets, the liquid-crystal layer 1 with the cholesteric liquid-crystal phase fixed therein and the first interlayer 3 as well as the liquid-crystal layer 1 with the cholesteric liquid-crystal phase fixed therein and the second interlayer 3' may adjacent to each other, or may have any other constituent layer therebetween. In case where the liquid-crystal layer 1 with the cholesteric liquid-crystal phase fixed therein contains a light reflection layer to be mentioned below and when the production method for the laminate of the invention includes the step of peeling the substrate mentioned above, the laminate maybe further thinned. The laminate of the type not containing the transparent plastic support is brittle and therefore it is considered that its production would be difficult, however, the production method of the invention can solve the problem.

The laminate sandwiched between the glass sheets may have a configuration of glass sheet/interlayer/liquid-crystal layer with cholesteric liquid-crystal phase fixed therein/λ/2 film/liquid-crystal layer with cholesteric liquid-crystal phase fixed therein/interlayer/glass sheet as laminated in that order. In this case, it is desirable that the helical direction of the liquid-crystal layer with the cholesteric liquid-crystal phase fixed therein on both sides of the λ/2 film is the same direction when the reflection center wavelength thereof is the same.

(Glass Sheet)

In the production method for the laminated glass of the invention, the glass sheet may not have a curvature, but is preferably a curved glass sheet. In case where the glass sheet does not have a curvature, the peripheral part of the laminated glass may be often wrinkled or cracked especially when the size of the laminated glass is large; and the production method of the laminated glass of the invention is favorably applied to the case.

On the other hand, in case where the glass sheet is a curved one, the liquid-crystal layer with the cholesteric liquid-crystal phase fixed therein would be more readily wrinkled or cracked as compared with the other case where the glass sheet does not have a curvature. In the production method for the laminated glass of the invention, especially when the glass sheet has a curved surface (that is, when the sheet is a curved glass sheet), it is possible to prevent the trouble of wrinkling or cracking.

The two glass sheets between which the liquid-crystal layer with the cholesteric liquid-crystal phase fixed therein is sandwiched may have a different thickness or may be colored. In particular, in case where the laminated glass is used in windshields of vehicles or the like for the purpose of shielding from heat, a colorant component such as metal or the like may be mixed in the glass in such a degree that the visible light transmittance of the resulting laminated glass is not lower than 70% as defined in JIS-R3211; and in general, using green glass effectively enhances the heat shieldability of the laminated glass. Preferably, the color density of the green glass for use herein is controlled to a desired level by controlling the amount of the metal component to be added or by controlling the thickness of the glass.

The curved glass sheet may be obtained by heating and bending the soda lime glass prepared according to a float process, at a temperature not lower than the softening point thereof, and it is simple to use here a three-dimensionally curved glass sheet obtained by bending.

Regarding the shape thereof, the three-dimensionally curved glass sheet is a glass sheet of which the radius of curvature differs in different sites therein, such as a spherical glass sheet, an oval spherical glass sheet or a windshield glass sheet for vehicles.

Not specifically defined, the radius of curvature of the curved glass sheet is preferably from 0.9 m to 3 m. When the radius of curvature is smaller than 0.9 m, in general, the resin film may be readily wrinkled during lamination. However, according to the production method of the invention, even though the radius of curvature is less than 0.9 m, the resin film can be prevented from being wrinkled. On the other hand, when the radius of curvature is large, the shape of the glass plate would be nearly flat, and therefore, in general, the resin film would be hardly wrinkled, but the peripheral part of the resin film may be cracked. Consequently, in the production method of the invention, even the curved glass having a radius of curvature of 3 m or more could enjoy the advantageous effects of the invention; however, from the viewpoint of preventing the resin film from being cracked and additionally from being wrinkled, the radius of curvature of the curved glass sheet for use in the invention is especially preferably 3 m.

The laminated glass to be obtained according to the laminated glass production method of the invention includes at least two above-mentioned glass sheets. Even though the radius of curvature differs between the two glass sheets, the laminated glass production method of the invention is applicable to the case.

<Step of Pressing Under Heat the Laminate Sandwiched Between Glass Sheets>

Preferably, the laminated glass production method of the invention includes a step of thermally pressing the laminate of the invention sandwiched between the glass sheets.

Bonding the laminate of the invention sandwiched between the glass sheets to the glass sheets may be attained, for example, by prebonding them under reduced pressure, using a vacuum bag or the like, at a temperature of from 80 to 120° C. for a period of from 30 to 60 minutes, and thereafter bonding them in an autoclave under a pressure of from 1.0 to 1.5 MPa at a temperature of from 120 to 150° C. thereby giving a laminated glass in which the laminate is sandwiched between the two glass sheets. If desired, they may be bonded to each other via an adhesive or the like.

In this case, preferably, the pressure is from 1.0 to 1.5 MPa, the temperature is from 120 to 150° C., and the thermally bonding time is from 20 to 90 minutes.

After the thermal bonding, the cooling mode is not specifically defined. While the pressure is suitably purged, the laminated glass to be obtained may be spontaneously kept cooled. In the invention, it is desirable that the system is cooled while the pressure therein is kept as such after the thermal bonding, from the viewpoint of preventing the laminated glass to be obtained from being wrinkled or cracked. The mode of cooling the system while the pressure is kept as such means that the apparatus is so cooled that the inner pressure inside the apparatus at 40° C. could be from 75% to 100% of the inner pressure inside the apparatus where the laminated glass has been thermally bonded (preferably at 130° C.). The method of cooling the system while the pressure therein is kept as such is not specifically defined so far as the pressure in the system when cooled to 40° C. could fall within the above range. However, preferred is an embodiment where the inner area of the apparatus is gradually cooled with no pressure leak therethrough in such a manner that the inner pressure inside the apparatus could naturally lower with the decrease in the temperature therein, or an embodiment where the system is cooled with further externally pressurizing it in such a manner that the inner pressure inside the apparatus could not lower with the decrease in the temperature therein. In case where the system is cooled while the pressure therein is kept as such, it is desirable that the laminated glass is thermally bonded at from 120 to 150° C. and the left cooled to 40° C. taking from 1 to 5 hours.

Preferably, the method of the invention includes a step of cooling the system while the pressure therein is kept as such, and then purging the pressure. Concretely, it is desirable that the system is first cooled while the pressure therein is kept as such, and then after the temperature inside the autoclave has reached 40° C. or lower, the system is cooled by purging the pressure.

From the above, it is desirable that the laminated glass production method of the invention includes a step of sandwiching the laminate of the invention with at least two glass sheets, a step of thermally bonding them under a pressure of from 1.0 to 1.5 MPa at a temperature of from 120 to 150° C., a step of cooling the system while the pressure therein is kept as such, and a step of purging the pressure.

The range of thermally bonding the laminate of the invention to the glass plates may be the range that covers the entire area of the glass sheets, but maybe the peripheral area of the glass sheets. Thermally bonding the two at the peripheral area prevents the laminated glass from being wrinkled.

EXAMPLES

The characteristics of the invention are described more concretely with reference to the following Examples and Comparative Examples. In the following Examples, the material used, its amount and ratio, the details of the treatment and the treatment process may be suitably modified or changed not overstepping the spirit and the scope of the invention. Accordingly, the scope of the invention should not be limitatively interpreted by the Examples mentioned below.

Examples 1 and 2, and Comparative Examples 1 to 8

Preparation of Cholesteric Liquid-Crystal Mixture (R1)

The following compound A, compound B, fluorine-containing horizontal alignment agent, chiral agent, polymerization initiator, and solvent methyl ethyl ketone were mixed to prepare a coating liquid having the composition mentioned below. Thus obtained, the coating liquid is referred to as a cholesteric liquid-crystal mixture (R1) of Examples and Comparative Examples.

| | |
|---|---|
| Compound A shown in Table 1 | 80 parts by mass |
| Compound B shown in Table 1 | 20 parts by mass |
| Fluorine-containing horizontal alignment agent shown below | 0.04 parts by mass |
| Chiral agent (A) shown below | 5.0 parts by mass |
| Polymerization initiator IRGACURE 819 (by Ciba Japan) | 3 parts by mass |
| Solvent (methyl ethyl ketone) | to make the solute concentration of 25% by mass |

(Compound A)
Compound 1

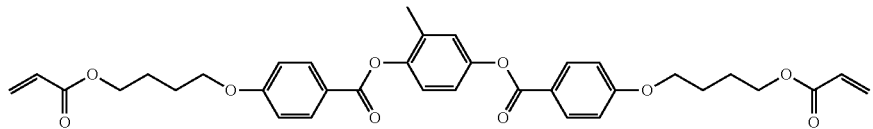

(Compound B)
Compound 2

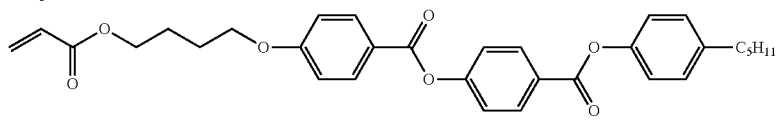

Compound 3

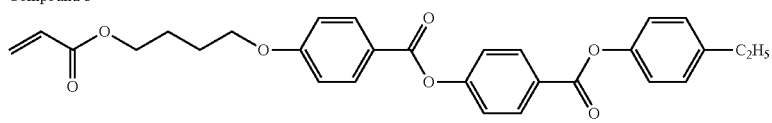

Compound 4

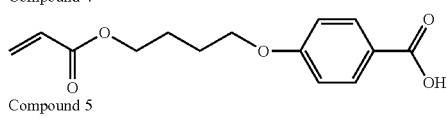

Compound 5

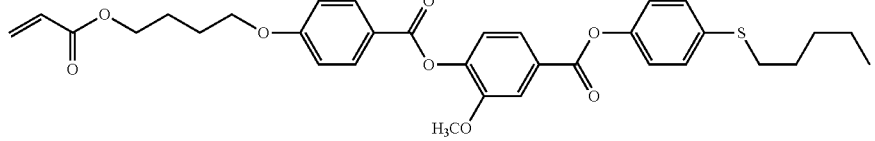

| Fluorine-containing horizontal alignment agent: compound described in JP-A 2005-99248 | | |
|---|---|---|
| 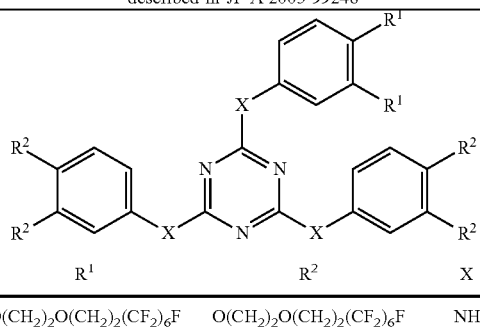 | | |
| $R^1$ | $R^2$ | X |
| $O(CH_2)_2O(CH_2)_2(CF_2)_6F$ | $O(CH_2)_2O(CH_2)_2(CF_2)_6F$ | NH |

Chiral agent (A)

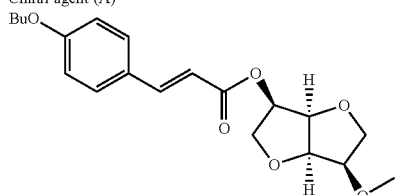

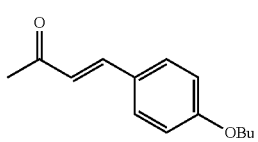

<Production of Film>
(Preparation of Coating Liquid for Undercoat Layer)
A coating liquid for undercoat layer (S1) having the composition shown below was prepared.
Composition of Coating Liquid for Undercoat Layer (S1):

| | |
|---|---|
| Acrylate resin Jurymer ET-410 (by Toa Gosei, solid concentration 30%) | 50 parts by mass |
| Methanol | 50 parts by mass |

(Preparation of Coating Liquid for Alignment Layer)
A coating liquid for alignment layer (H1) having the composition shown below was prepared.
Composition of Coating Liquid for Alignment Layer (H1):

| | |
|---|---|
| Modified polyvinyl alcohol PVA 203 (by Kuraray) | 10 parts by mass |
| Glutaraldehyde | 0.5 parts by mass |
| Water | 371 parts by mass |
| Methanol | 119 parts by mass |

(Coating, Drying and Film Formation)
Using a wire bar, the coating liquid for undercoat layer (S1) was applied onto the surface of a PET film (with no undercoat layer, by Fujifilm, thickness: 50 μm, size 320 mm×400 nm), in such a manner that the thickness thereof after drying could be 0.25 μm. Subsequently, this was heated at 150° C. for 10 minutes, dried and solidified to form an undercoat layer.

Next, also using a wire bar coater, the coating liquid for alignment layer (H1) was applied onto the thus-formed undercoat layer in such a manner that the thickness thereof after drying could be 1.0 Subsequently, this was heated at 100° C. for 2 minutes, dried and solidified to form an alignment layer. The alignment layer was rubbed (with rayon cloth, pressure: 0.1 kgf, number of rotations: 1000 rpm, conveying speed: 10 m/min, rubbing mode: one back-and-forth movement).

Next, using the polymerizable liquid crystal-containing (R1) prepared in the above, the cholesteric liquid-crystal phase was fixed according to the process mentioned below, thereby producing a liquid-crystal layer serving as an IR reflection layer, in which the cholesteric liquid-crystal was fixed.

(1) Using a wire bar, the coating liquid (R1) was applied onto the PET film at room temperature in such a manner that the thickness thereof after drying could be 6 μm.

(2) This was dried at room temperature for 30 seconds to remove the solvent, and heated in an atmosphere at 125° C. for 2 minutes, and then at 95° C. to form a cholesteric liquid-crystal phase. Next, using an electrodeless lamp, Fusion UV Systems' "D Bulb" (90 mW/cm), this was UV-irradiated at an output of 60% for 6 to 12 seconds to fix the cholesteric liquid-crystal phase, thereby forming a liquid-crystal layer (IR reflection layer) in which the cholesteric liquid-crystal phase was fixed.

(3) This was cooled to room temperature to give a film of Examples and Comparative Examples in which the liquid-crystal layer of the cholesteric liquid-crystal phase was formed on PET.

(Surface Treatment)

The surface of the liquid-crystal layer of the film of Examples and Comparative Examples was washed according to the following process.

The laminate produced in the above was dipped in a container containing 2-butanone, and washed therein at 40° C. for 10 minutes.

<Production of Laminate (Laminated Interlayer)>

The periphery of the film of Examples and Comparative Examples, which contained the liquid-crystal layer formed on PET, was trimmed in such a manner that the cut edge thereof could be in the perpendicular direction. On the other hand, separately as an interlayer film, the periphery of a PVB film embossed on both surfaces thereof was trimmed in such a manner that the cut edge thereof could be in the perpendicular direction. The interlayer film PVB was laminated on the liquid-crystal layer of the film of Examples and Comparative Examples to give a laminate. Using two lamination hot rollers arranged on both the surface side and the back side of the obtained laminate, the liquid-crystal layer-attached support was sandwiched between the two rollers in the position of not more than 1 mm from the entire periphery (4 sides) thereof, and the liquid-crystal layer and the interlayer were thus thermally bonded to each other. In this stage, the lamination hot roller on the interlayer side was controlled at 25° C. in order that the embosses on the back of the interlayer could not be crushed while, on the other hand, the lamination hot roller on the support (PET) side was controlled at 120° C. in order that the embosses on the surface of the interlayer on the surface side of the liquid-crystal layer could be fully crushed to thereby increase the adhesion between the interlayer 3 and the liquid-crystal layer 1.

Subsequently, PVB as a second interlayer was laminated.

<Laminated Glass Production>

The produced laminate was sandwiched between glass in such a manner of glass/interlayer/liquid-crystal layer with cholesteric liquid-crystal phase fixed therein/second interlayer/glass, thereby preparing a laminate sandwiched between glass sheets. Here the edge of the glass sheet and the edge of the interlayer were at the same position.

The glass sheet used here had a thickness of 2 mm. The radius of curvature of the curved glass sheets was from 0.9 m to 3.0 m.

Thus obtained, the laminate sandwiched between the glass sheets was pre-bonded at 95° C. for 30 minutes. After the prebonding, the laminate sandwiched between the glass sheets was thermally pressed in an autoclave under the condition of 1.3 MPa and 120° C. to produce a laminated glass. In that manner, there was produced a laminated glass of Examples and Comparative Examples having, as inserted thereinto, the laminate produced by sandwiching one IR reflection layer of cholesteric liquid-crystal phase (liquid-crystal layer 1) as formed by coating with the coating liquid (R1) alone, between two interlayers 3 and 3'.

Example 3

A film and a laminated glass of Example 3 were produced in the same manner as in Examples 1 and 2 and Comparative Examples 1 to 8, except that, in preparing the cholesteric liquid-crystal mixture (R1) in Examples 1 and 2 and Comparative Examples 1 to 8, the amount of the compound A shown in Table 1 below was changed to 65 parts by mass and the amount of the compound B shown in Table 1 below was changed to 35 parts by mass.

Example 4

A film and a laminated glass of Example 4 were produced in the same manner as in Examples 1 and 2 and Comparative Examples 1 to 8, except that, in preparing the cholesteric liquid-crystal mixture (R1) in Examples 1 and 2 and Comparative Examples 1 to 8, the amount of the compound A shown in Table 1 below was changed to 90 parts by mass and the amount of the compound B shown in Table 1 below was changed to 10 parts by mass.

Example 5

A film and a laminated glass of Example 5 were produced in the same manner as in Examples 1 and 2 and Comparative Examples 1 to 8, except that, in preparing the cholesteric liquid-crystal mixture (R1) in Examples 1 and 2 and Comparative Examples 1 to 8, the amount of the compound A shown in Table 1 below was changed to 70 parts by mass and the amount of the compound B shown in Table 1 below was changed to 30 parts by mass.

[Examples 6 and 7] A film and a laminated glass of Examples 6 and 7 were produced in the same manner as in Examples 1 and 2 and Comparative Examples 1 to 8, except that, in preparing the cholesteric liquid-crystal mixture (R1) in Examples 1 and 2 and Comparative Examples 1 to 8, the fluorine-containing horizontal alignment agent (compound described in JP-A 2005-99248) was changed to 0.05 parts by mass of the following horizontal alignment agent 1 or 2, respectively.

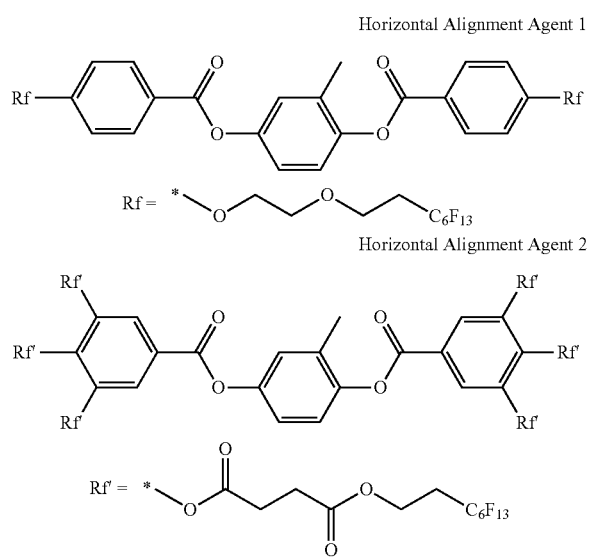

Horizontal Alignment Agent 1

Horizontal Alignment Agent 2

Example 8

A film and a laminated glass of Example 8 were produced in the same manner as in Example 7, except that, in preparing the cholesteric liquid-crystal mixture (R1) in Example 7, the fluorine-containing horizontal alignment agent (compound described in JP-A 2005-99248) described in Table 1 below was changed to a combination of 0.005 parts by mass of the horizontal alignment agent 2 and 0.1 parts by mass of the following horizontal alignment agent 3, and that the laminate was heated in an atmosphere at 75° C. for 2 minutes to form the cholesteric liquid-crystal phase.

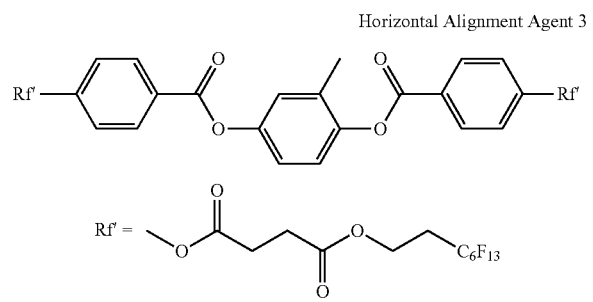

Horizontal Alignment Agent 3

<Evaluation>

The films produced in Examples and Comparative Examples were evaluated in point of precipitation of liquid-crystal compound-containing solid, haze, cholesteric reflection width and lightfastness, and the laminated glasses also produced in Examples and Comparative Examples were evaluated in point of lightfastness. The evaluation results are shown in Table 1 below.

(Precipitation of Liquid-Crystal Compound-Containing Solid in Film)

The precipitation of liquid-crystal compound-containing solid in the film of Examples and Comparative Examples produced by coating with the coating liquid (R1) alone was evaluated according to the criteria mentioned below.

Precisely, the coating liquid was applied continuously using a coating machine, and under the coating condition described in Examples and Comparative Examples, the samples were checked and evaluated as follows:

O: After continuous coating for 90 minutes, any coating streak to be caused by precipitation of liquid-crystal compound-containing solid crystals around the coating machine, could not be visually confirmed on the coated sample.

A: After continuous coating for 45 minutes, any coating streak to be caused by precipitation of liquid-crystal compound-containing solid crystals around the coating machine, could not be visually confirmed on the coated sample. However, after continuous coating for 90 minutes, coating streaks as caused by precipitation of liquid-crystal compound-containing solid crystals around the coating machine, were visually confirmed on the coated sample.

x: After continuous coating for 45 minutes, any coating streak to be caused by precipitation of liquid-crystal compound-containing solid crystals around the coating machine, could not be visually confirmed on the coated sample.

(Haze of Film)

The haze of the film of Examples and Comparative Examples, as produced by coating with the coating liquid (R1) alone, was measured using a haze meter Nippon Denshoku's NDH2000. The measured results were evaluated according to the criteria mentioned below.

O: Less than 0.4%.

x: 4% or more.

(Reflection Width of Film)

The reflection width of the film of Examples and Comparative Examples, as produced by coating with the coating liquid (R1) alone, was measured according to the method mentioned below.

Using a spectrophotometer, the transmission spectrum of the film was drawn, where the wavelength width between the two ends at which the cholesteric reflection peak transmittance is 70% is referred to as the reflection width.

Thus measured, the reflection width was divided by the mean value of the wavelengths at both ends each giving the transmittance 70%, and multiplied by 1000 nm to give the reflection width per 1000 nm of the sample.

(Lightfastness of Film)

The light transmittance at a wavelength of 420 nm of the film of Examples and Comparative Examples, as produced by coating with the coating liquid (R1) alone, was measured, and this is referred to as transmittance before test.

Using a UV tester (by Suga Test Instruments, UV irradiator for glass H75), the film was irradiated with UV light at 45° C. for 100 hours.

After the UV test, the light transmittance at a wavelength of 420 nm of the film of Examples and Comparative Examples was measured, and this is referred to as transmittance in 15 minutes after the UV irradiation test.

(Lightfastness of Laminated Glass)

The light transmittance of the laminated glass, as produced in the manner as above, before and after the UV test was measured and evaluated in the same manner as in the film lightfastness evaluation, except that the time for UV irradiation with the UV irradiator was changed to 100 hours. The results are shown in Table 1 below.

TABLE 1

| | Composition of Cholesteric Liquid-Crystal Mixture | | | Film Evaluation | | | Lightfastness (light transmittance at 420 nm after 15 minutes with UV irradiation/light transmittance at 420 nm before aging) [%] | Laminated Glass Evaluation Lightfastness (light transmittance at 420 nm after 100 hours with UV irradiation/light transmittance at 420 nm before aging) [%] |
|---|---|---|---|---|---|---|---|---|
| | Compound A | Compound B | Fluorine-Containing Horizontal Alignment Agent | Precipitation | Haze | Reflection Width [nm (per 1000 nm)] | | |
| Comparative Example 1 | Compound 1 | none | no | x | x | Not measured as haze was high. | Not measured as haze was high. | Not measured as haze was high. |
| Comparative Example 2 | Compound 1 | Compound 2 | no | ○ | x | Not measured as haze was high. | Not measured as haze was high. | Not measured as haze was high. |
| Comparative Example 3 | Compound 1 | Compound 3 | no | ○ | x | Not measured as haze was high. | Not measured as haze was high. | Not measured as haze was high. |
| Comparative Example 4 | Compound 1 | Compound 4 | no | ○ | x | Not measured as haze was high. | Not measured as haze was high. | Not measured as haze was high. |
| Comparative Example 5 | Compound 1 | Compound 5 | no | ○ | x | Not measured as haze was high. | Not measured as haze was high. | Not measured as haze was high. |
| Comparative Example 6 | Compound 1 | no | yes | x | ○ | 113.1 | 81.4/86.1 | 82.1/83.7 |
| Example 1 | Compound 1 | Compound 2 | yes | ○ | ○ | 120.3 | 82.0/85.8 | 81.4/82.7 |
| Example 2 | Compound 1 | Compound 3 | yes | ○ | ○ | 118.7 | 81.3/86.2 | 81.9/83.1 |
| Comparative Example 7 | Compound 1 | Compound 4 | yes | ○ | ○ | 113.1 | 80.5/86.0 | 82.1/83.6 |
| Comparative Example 8 | Compound 1 | Compound 5 | yes | ○ | ○ | 111.4 | 73.2/86.1 | 77.4/83.3 |
| Example 3 | Compound 1 | Compound 3 | yes | Δ | ○ | 123.1 | 82.1/86.4 | 81.1/83.5 |
| Example 4 | Compound 1 | Compound 3 | yes | ○ | ○ | 120 | 81.3/86.0 | 82.0/83.6 |
| Example 5 | Compound 1 | Compound 3 | yes | ○ | ○ | 122.5 | 82.1/86.4 | 81.2/83.2 |
| Example 6 | Compound 1 | Compound 3 | yes | ○ | ○ | 119.9 | 82.3/86.6 | 81.8/83.4 |
| Example 7 | Compound 1 | Compound 3 | yes | ○ | ○ | 120.5 | 82.0/86.1 | 81.2/82.6 |
| Example 8 | Compound 1 | Compound 3 | yes | ○ | ○ | 120.3 | 82.1/86.0 | 81.3/82.5 |

As shown in the above Table 1, Examples 1 and 2 show that, in the films of the invention each using the cholesteric liquid-crystal mixture of the invention, the precipitation of the liquid-crystal compound was prevented, and that the haze of the films was low and the reflection width thereof was broad.

On the other hand, it is known that the cholesteric liquid-crystal mixture in Comparative Example 1, which used only one compound 1 as the liquid-crystal compound and to which neither a compound satisfying the general formula (Ib) of the invention nor a fluorine-containing alignment control agent was added, provided the precipitation of the liquid-crystal compound in film production, and that the haze of the formed film was high. Comparative Examples 2 and 3 show that, when the cholesteric liquid-crystal mixture to which a fluorine-containing alignment control agent was not added was used in film formation, the haze of the formed film was high. On the other hand, it is known that, when the cholesteric liquid-crystal mixture of Comparative Examples 4 and 5, in which the compound 4 or 5 not satisfying the general formula (Ib) of the invention was used as the second liquid-crystal compound and to which a fluorine-containing alignment control agent was not added, was used in film formation, the haze of the formed film was high. It is known that the cholesteric liquid-crystal mixture in Comparative Example 6, which used only one compound 1 as the liquid-crystal compound, provided the precipitation of the liquid-crystal compound in film production, and that the reflection width of the formed film was small. Comparative Examples 7 and 8 show that, when the cholesteric liquid-crystal mixture using the compound 4 or 5 not satisfying the general formula (Ib) of the invention was used in film formation, the reflection width of the formed film was small.

Comparative Example 8 used the compound 5 containing a sulfur atom as P in the general formula (Ib), and it is known that also in this case, the lightfastness of the film was poor.

Example 11

Production of Laminated Glass Using Four Laminated Liquid-Crystal Layers of Cholesteric Liquid-Crystal Phase (Preparation of Coating Liquid)

A coating liquid (L1) was prepared in the same manner as in Examples 1 to 8, except that the chiral agent (A) in the polymerizable liquid crystal-containing coating liquid (R1) was changed to 3.0 parts by mass of LC-756 (by BASF).

Similarly, a coating liquid (R2) was prepared also in the same manner except that the amount of the chiral agent (A) in the polymerizable liquid crystal-containing coating liquid (R1) was changed to 4.0 parts by mass.

Further, a coating liquid (L2) was prepared also in the same manner except that the amount of the chiral agent LC-756 in the polymerizable liquid crystal-containing coating liquid (L1) was changed to 2.4 parts by mass.

(Formation of Four Layers-Laminated Sample)

The film of Examples 1 to 7 was cooled to room temperature, and then on the liquid-crystal layer formed on the PET film therein, the steps (1) and (2) for forming the liquid-crystal layer described in Examples 1 to 7 were repeated, thereby producing a four layers-laminated sample for laminated glass production, in which four cholesteric liquid-crystal phase layers were laminated on PET.

The coating liquids (R2), (L1) and (L2) were applied in that order to produce the four layers-laminated sample.

Subsequently, the surface of the thus-obtained, four layers-laminated sample was washed according to the same process as in Examples 1 to 8.

<Production of Laminate (Laminated Interlayer)>

The periphery of the four layers-laminated liquid-crystal film, which contained the liquid-crystal layers formed on PET, was trimmed in such a manner that the cut edge thereof could be in the perpendicular direction. On the other hand, separately as an interlayer film, the periphery of a PVB film embossed on both surfaces thereof was trimmed in such a manner that the cut edge thereof could be in the perpendicular direction. The interlayer film PVB was laminated on the liquid-crystal layer of the four layers-laminated sample, and in the same manner as in Examples 1 to 8, the liquid-crystal layers and the interlayer were thermally bonded, and thereafter in the same manner as in Example 1, the second interlayer PVB was laminated thereon.

<Laminated Glass Production>

In the same manner as in Examples 1 to 8 except that the laminated produced herein was used, a laminated glass of Example 11 was produced in which the four layers-laminated, cholesteric liquid-crystal phase IR reflection layer (liquid-crystal layer 1) was sandwiched between the two interlayers 3 and 3' and in which the laminate was inserted into glass sheets.

<Evaluation>

The laminated glass produced in Example 11 was tested for the performance thereof, and it was confirmed that the laminated glass could act as a good heat-shielding glass not having any significant defects or streaks.

Example 12

Samples were produced here in the same manner as above, except that in film production in Examples 1 and 2, only the coating liquid (R1) or (R2) was applied, and that in laminated glass production, a laminate of glass/interlayer/liquid-crystal layer with cholesteric liquid-crystal phase fixed therein/$\lambda$/2 plate (Nippon Zeon's Zeonoa Film ZF14-100)/second liquid-crystal layer with cholesteric liquid-crystal phase fixed therein/second interlayer/glass was produced by lamination in that order as sandwiched between the glass sheets.

The thus-produced laminated glass was tested for the performance thereof, and it was confirmed that the laminated glass could act as a good heat-shielding glass not having any significant defects or streaks.

Example 14

A film and a laminated glass of Example 14 were produced in the same manner as in Example 7, except that, in preparing the cholesteric liquid-crystal mixture (R1) in Example 7, 8.0 parts by mass of the chiral agent was used. As a result of reflection spectrometry, the reflection center wavelength was 546 nm (green in visual observation). The cholesteric liquid-crystal mixture did not precipitate, and the haze of the film and the laminated glass was low.

Example 15

A film and a laminated glass of Example 15 were produced in the same manner as in Example 7, except that, in preparing the cholesteric liquid-crystal mixture (R1) in Example 7, 11.4 parts by mass of the chiral agent was used. As a result of reflection spectrometry, the reflection center wavelength was 386 nm. The cholesteric liquid-crystal mixture did not precipitate, and the haze of the film and the laminated glass was low.

Example 16

Production of Six-Layers Laminate Film and Laminated Glass

In the same manner as in Example 8 except that the chiral agent (A) in the cholesteric liquid-crystal mixture (R1) therein was changed to 3.0 parts by mass, 2.5 parts by mass or 2.3 parts by mass of LC-756 (by BASF), a cholesteric liquid-crystal mixture (L1), a cholesteric liquid-crystal mixture (L2) and a cholesteric liquid-crystal mixture (L3) were prepared. Also in the same manner but the amount of the chiral agent (A) in the cholesteric liquid-crystal mixture (R1) was changed to 4.2 parts by mass or 3.8 parts by mass, a cholesteric liquid-crystal mixture (R2) and cholesteric liquid-crystal mixture (R3) were prepared.

Next, according to the same process as in Example 8, a selective reflection layer using the cholesteric liquid-crystal mixture (L1) was formed on a PET film, then the film was cooled to room temperature, and also in the same process as in Example 8, a selective reflection layer using the cholesteric liquid-crystal mixture (L2) was formed on the previous selective reflection layer. In that manner, the cholesteric liquid-crystal mixture (L3), the cholesteric liquid-crystal mixture (R1), the cholesteric liquid-crystal mixture (R2) and the cholesteric liquid-crystal mixture (R3) were laminated in that order to produce a six-layers laminated film of Example 16. Subsequently, in the same manner as in Example 8, a laminated glass was produced. Thus produced, the film and the laminated glass were both good, not having any significant defects and streaks, and it was confirmed that the two could serve as heat-shielding glass.

Example 17

A six-layers laminate film of Example 17 was produced in the same manner as in Example 16 except that the amount of LC-756 (by BASF) in the cholesteric liquid-crystal mixture (L1), the cholesteric liquid-crystal mixture (L2) and the cholesteric liquid-crystal mixture (L3) was changed to 6.0 parts by mass, 4.8 parts by mass and 4.2 parts by mass, respectively, and that the amount of the chiral agent (A) in the cholesteric liquid-crystal mixture (R1), the cholesteric liquid-crystal mixture (R2) and the cholesteric liquid-crystal mixture (R3) was changed to 10.0 parts by mass, 8.0 parts by mass and 7.0 parts by mass, respectively. Subsequently, a laminated glass was produced in the same manner as in Example 8. Thus produced, the film and the laminated glass were both good, not having any significant defects and streaks, and it was confirmed that the reflection color thereof was silver.

<Production of Two-Layers Laminate Film and Laminated Glass>

Example 18

A selective reflection layer was formed as in Example 15, in which, however, one prepared by changing the amount of LC-756 (by BASF) in the cholesteric liquid-crystal mixture (L1) in Example 16 to 6.9 parts by mass was used in place of the cholesteric liquid-crystal mixture (R1). The film was cooled to room temperature, and then in the same manner as in Example 8, a selective reflection layer using the cholesteric liquid-crystal mixture (R1) in Example 15 was formed on the previous selective reflection layer, thereby producing a two-layers laminate film of Example 18.

Example 19

A two-layers laminate film of Example 19 was produced according to the same process as in Example 18, except that the cholesteric liquid-crystal mixture (L1) and the cholesteric liquid-crystal mixture (R1) in Example 18 were changed to the cholesteric liquid-crystal mixture (L1) and the cholesteric liquid-crystal mixture (R1) in Example 16. Subsequently, a laminated glass was produced in the same manner as in Example 8. Thus produced, the film was good, not having any significant defects and streaks. As a result of reflection spectrometry, the reflection center wavelength was 439 nm and the reflection color was blue.

Example 20

A two-layers laminate film of Example 20 was produced according to the same process as in Example 18, except that the cholesteric liquid-crystal mixture (L1) and the cholesteric liquid-crystal mixture (R1) in Example 18 were changed to the cholesteric liquid-crystal mixture (L2) and the cholesteric liquid-crystal mixture (R2) in Example 16. Subsequently, a laminated glass was produced in the same manner as in Example 8. Thus produced, the film was good, not having any significant defects and streaks. The reflection center wavelength was 548 nm and the reflection color was green.

Example 21

A two-layers laminate film of Example 21 was produced according to the same process as in Example 18, except that the cholesteric liquid-crystal mixture (L1) and the cholesteric liquid-crystal mixture (R1) in Example 18 were changed to the cholesteric liquid-crystal mixture (L3) and the cholesteric liquid-crystal mixture (R3) in Example 16. Subsequently, a laminated glass was produced in the same manner as in Example 8. Thus produced, the film was good, not having any significant defects and streaks. The reflection center wavelength was 628 nm and the reflection color was red.
<Production of Three-Layers Laminate Film and Laminated Glass>

Example 22

The cholesteric liquid-crystal mixture (L1), the cholesteric liquid-crystal mixture (L2) and the cholesteric liquid-crystal mixture (L3) in Example 16 were used here. In the same manner as in Example 8, a selective reflection film using the cholesteric liquid-crystal mixture (L1) was formed on a PET film. Next, the film was cooled to room temperature, and then in the same manner as in Example 8, a selective reflection layer using the cholesteric liquid-crystal mixture (L2) was formed on the previous selective reflection layer. Further, the film was cooled to room temperature, and then a selective reflection layer using the cholesteric liquid-crystal mixture (L3) was formed to give a two-layers laminate film of Example 22. Subsequently, a laminated glass was produced in the same manner as in Example 8. Thus produced, the film and the laminated glass were both good, not having any significant defects and streaks. It was confirmed that the reflection color was silver.

Example 23

The cholesteric liquid-crystal mixture (R1), the cholesteric liquid-crystal mixture (R2) and the cholesteric liquid-crystal mixture (R3) in Example 16 were used here. In the same manner as in Example 8, a selective reflection film using the cholesteric liquid-crystal mixture (R1) was formed on a PET film. Next, the film was cooled to room temperature, and then in the same manner as in Example 8, a selective reflection layer using the cholesteric liquid-crystal mixture (R2) was formed on the previous selective reflection layer. Further, the film was cooled to room temperature, and then a selective reflection layer using the cholesteric liquid-crystal mixture (R3) was formed to give a two-layers laminate film of Example 23. Subsequently, a laminated glass was produced in the same manner as in Example 8. Thus produced, the film and the laminated glass were both good, not having any significant defects and streaks. It was confirmed that the reflection color was silver.

Example 24

Preparation of Coating Liquid (OC1) for Protective Layer

Using the compounds mentioned below, prepared was a coating liquid (OC1) for protective layer having the composition mentioned below.

| | |
|---|---|
| IRGACURE 819 (by BASF, photopolymerization initiator) | 1.6 parts by mass |
| KAYARAD DPHA (by Nippon Kayaku, 6-functional polymerizable monomer, mixture of dipentaerythritol penta- and hexaacrylate) | 40.5 parts by mass |
| MH-101-5 (by Fujikura Chemical, polymer, polymethyl methacrylate resin) | 77.7 parts by mass |
| TINUVIN 326 (by BASF, UV absorbent) | 30.0 parts by mass |
| MEGAFAC F-780F (by DIC, surfactant) | 0.6 parts by mass |
| Methyl ethyl ketone | 849.7 parts by mass |

<Formation of Protective Layer>

Using a wire bar, the coating liquid (OC1) for protective layer was applied onto the two-layers laminate film of Example 18 at room temperature in such a manner that the thickness thereof after dried could be 6 µm, then dried at room temperature for 30 seconds to remove the solvent, then heated in an atmosphere at 125° C. for 2 minutes, and thereafter UV-irradiated with an electrodeless lamp, Fusion UV Systems' "D Bulb" (90 mW/cm) at an output of 60% for 60 seconds, thereby producing a protective layer-attached, two-layered selective reflection film of Example 24. Subsequently, a laminated glass was produced according to the same process as in Example 8. As a result of reflection spectrometry, the reflection center wavelength was 386 nm, and the transmittance at a wavelength of 386 nm was less than 1%.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2012/

072594, filed Sep. 5, 2012; Japanese Application No. 2011-198264, filed Sep. 12, 2011, and Japanese Application No. 2012-084520, filed Apr. 3, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

REFERENCE SIGNS LIST

1 Liquid-Crystal Layer with Cholesteric Liquid-Crystal Phase Fixed therein (optionally containing support)
3 Interlayer
3' Second interlayer
4, 4' Glass Sheet
6 Laminated Glass
15a Light Reflection Layer with Cholesteric Liquid-Crystal Phase Fixed therein
15b Light Reflection Layer with Cholesteric Liquid-Crystal Phase Fixed therein
16a Light Reflection Layer with Cholesteric Liquid-Crystal Phase Fixed therein
16b Light Reflection Layer with Cholesteric Liquid-Crystal Phase Fixed therein

What is claimed is:

1. A cholesteric liquid-crystal mixture containing a compound represented by the following general formula (Ia), a compound represented by the following general formula (Ib), a fluorine-containing horizontal alignment agent and a polymerization initiator:

$$Z^1-Y^1-A^1-Y^3-M^1-Y^4-A^2-Y^2-Z^2 \quad \text{General Formula (Ia)}$$

$$Z^3-Y^5-A^3-Y^7-M^2-P \quad \text{General Formula (Ib)}$$

wherein, in the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of from 1 to 30, provided that the spacer represents an alkylene group, or a linking group of multiple alkylene groups bonding to each other via —O— or —CO—; $M^1$ and $M^2$ each independently represent $(-T^1-Y^8)_n-T^2-$; n indicates a natural number; when n is 2 or more, then multiple $(-T^1-Y^8)$'s may be the same or different; $T^1$ and $T^2$ each independently represent a saturated or unsaturated hydrocarbon ring, or a saturated or unsaturated hetero ring, provided that the hydrocarbon ring and the hetero ring may have a substituent; $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—; P represents a hydrogen atom or an alkyl group having from 1 to 15 carbon atoms, and wherein the fluorine-containing horizontal alignment agent is a compound represented by the following general formula (I):

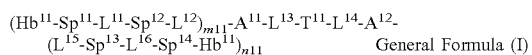
General Formula (I)

wherein $L^{11}$, $L^{12}$, $L^{13}$, $L^{14}$, $L^{15}$ and $L^{16}$ each independently represent a single bond, —O—, —S—, —CO—, —COO—, —OCO—, —COS—, —SCO—, —NRCO—, or —CONR—; R represents a hydrogen atom or an alkyl group having from 1 to 6 carbon atoms; $Sp^{11}$, $Sp^{12}$, $Sp^{13}$ and $Sp^{14}$ each independently represent a single bond or an alkylene group having from 1 to 10 carbon atoms; $A^{11}$ and $A^{12}$ each represent a trivalent or tetravalent aromatic hydrocarbon; $Hb^{11}$ represents a perfluoroalkyl group having from 2 to 30 carbon atoms; m11 and n11 each independently indicate from 0 to 3, and
m11+n11≥1; $T^{11}$ represents a divalent group represented by any of the following or represents a divalent aromatic heterocyclic group:

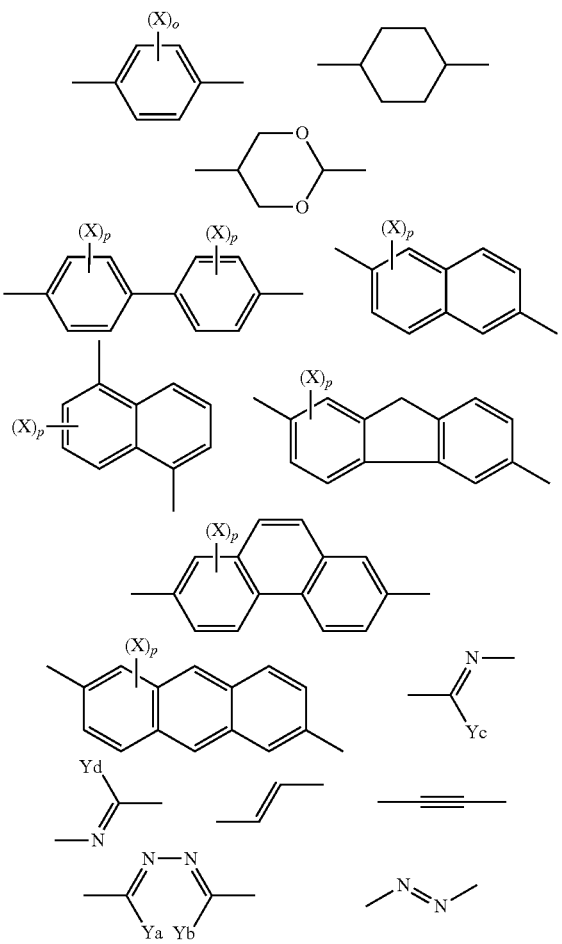

wherein X represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms; and o and p contained in $T^{11}$ each independently indicate an integer of 0 or more.

2. The cholesteric liquid-crystal mixture according to claim 1, wherein $T^1$ and $T^2$ in the general formulae (Ia) and (Ib) each independently represent a saturated or unsaturated hydrocarbon ring, or a saturated or unsaturated hetero ring, provided that the hydrocarbon ring and the hetero ring may have an alkyl group or an alkoxy group as the substituent.

3. The cholesteric liquid-crystal mixture according to claim 1, wherein the content of the compound represented by the general formula (Ib) relative to the content of the compound represented by the general formula (Ia) is from 5 to 40% by mass.

4. The cholesteric liquid-crystal mixture according to claim 1, wherein the compound represented by the general formula (Ia) is a compound in which at least one hydrocarbon ring or hetero ring of the hydrocarbon ring and the hetero ring represented by $T^1$ and $T^2$ has an alkyl group or an alkoxy group, and the compound represented by the general formula (Ib) is a compound in which the hydrocarbon ring and the hetero ring represented by $T^1$ and $T^2$ each are an unsubstituted hydrocarbon ring or hetero ring.

5. The cholesteric liquid-crystal mixture according to claim 1, wherein in the compound represented by the general formula (Ia), n that indicates $M^1$ is from 2 to 4.

6. A film comprising a support and, as formed on the support, a liquid-crystal layer in which a cholesteric liquid-crystal phase formed by polymerizing a cholesteric liquid-crystal mixture is fixed, wherein the cholesteric liquid-crystal mixture contains a compound represented by the following general formula (Ia), a compound represented by the following general formula (Ib), a fluorine-containing horizontal alignment agent and a polymerization initiator:

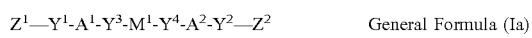

$Z^1$—$Y^1$-$A^1$-$Y^3$-$M^1$-$Y^4$-$A^2$-$Y^2$—$Z^2$      General Formula (Ia)

$Z^3$—$Y^5$-$A^3$-$Y^7$-$M^2$-P      General Formula (Ib)

wherein, in the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of from 1 to 30, provided that the spacer represents an alkylene group, or a linking group of multiple alkylene groups bonding to each other via —O— or —CO—; $M^1$ and $M^2$ each independently represent $(-T^1-Y^8)_n-T^2-$; n indicates a natural number; when n is 2 or more, then multiple $(-T^1-Y^8)$'s may be the same or different; $T^1$ and $T^2$ each independently represent a saturated or unsaturated hydrocarbon ring, or a saturated or unsaturated hetero ring, provided that the hydrocarbon ring and the hetero ring may have a substituent; $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—; P represents a hydrogen atom or an alkyl group having from 1 to 15 carbon atoms, and wherein the fluorine-containing horizontal alignment agent is a compound represented by the following general formula (I):

$(Hb^{11}$-$Sp^{11}$-$L^{11}$-$Sp^{12}$-$L^{12})_{m11}$-$A^{11}$-$L^{13}$-$T^{11}$-$L^{14}$-$A^{12}$-$(L^{15}$-$Sp^{13}$-$L^{16}$-$Sp^{14}$-$Hb^{11})_{n11}$      General Formula (I)

wherein $L^{11}$, $L^{12}$, $L^{13}$, $L^{14}$, $L^{15}$ and $L^{16}$ each independently represent a single bond, —O—, —S—, —CO—, —COO—, —OCO—, —COS—, —SCO—, —NRCO—, or —CONR—; R represents a hydrogen atom or an alkyl group having from 1 to 6 carbon atoms; $Sp^{11}$, $Sp^{12}$, $Sp^{13}$ and $Sp^{14}$ each independently represent a single bond or an alkylene group having from 1 to 10 carbon atoms; $A^{11}$ and $A^{12}$ each represent a trivalent or tetravalent aromatic hydrocarbon; $Hb^{11}$ represents a perfluoroalkyl group having from 2 to 30 carbon atoms; m11 and n11 each independently indicate from 0 to 3, and m11+n11≥1; $T^{11}$ represents a divalent group represented by any of the following or represents a divalent aromatic heterocyclic group:

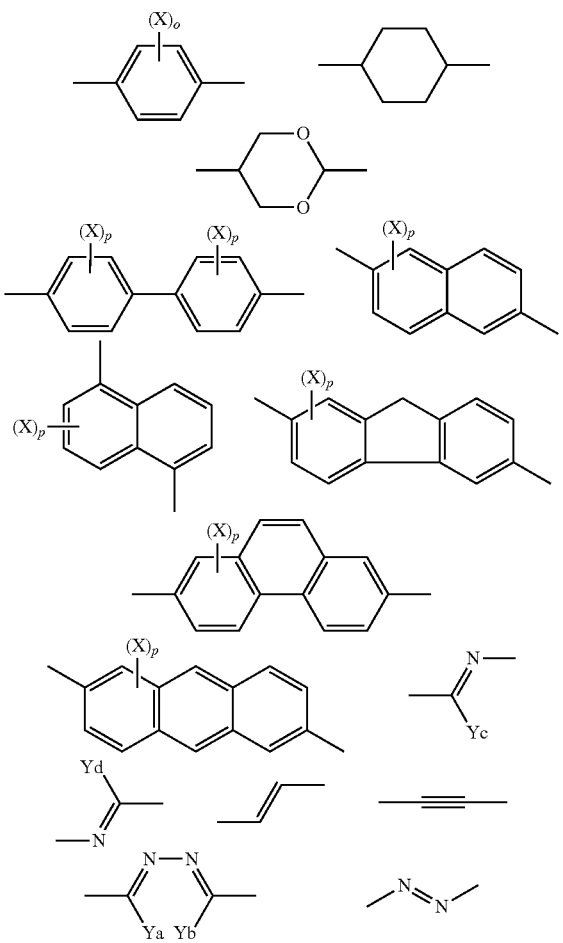

wherein X represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms; and o and p contained in $T^{11}$ each independently indicate an integer of 0 or more.

7. The film according to claim 6, containing two or more liquid-crystal layers each with the cholesteric liquid-crystal phase fixed therein.

8. The film according to claim 6, exhibiting a selective reflection characteristic in an IR wavelength region.

9. The film according to claim 6, exhibiting a selective reflection characteristic in a UV or visible wavelength region.

10. A selective reflector comprising a film comprising a support and, as formed on the support, a liquid-crystal layer in which a cholesteric liquid-crystal phase formed by polymerizing a cholesteric liquid-crystal mixture is fixed, wherein the cholesteric liquid-crystal mixture contains a compound represented by the following general formula (Ia), a compound represented by the following general formula (Ib), a fluorine-containing horizontal alignment agent and a polymerization initiator:

$Z^1$—$Y^1$-$A^1$-$Y^3$-$M^1$-$Y^4$-$A^2$-$Y^2$—$Z^2$      General Formula (Ia)

$Z^3$—$Y^5$-$A^3$-$Y^7$-$M^2$-P      General Formula (Ib)

wherein, in the general formulae (Ia) and (Ib), $Z^1$, $Z^2$ and $Z^3$ each independently represent a polymerizable group; $A^1$, $A^2$ and A³ each independently represent a spacer having an atom-bonding chain length of from 1 to 30, provided that the spacer represents an alkylene group, or a linking group of multiple alkylene groups bonding to each other via —O— or —CO—; M¹ and M² each independently represent $(-T^1-Y^8)_n-T^2-$; n indicates a natural number; when n is 2 or more, then multiple $(-T^1-Y^8)$'s may be the same or different; T¹ and T² each independently represent a saturated or unsaturated hydrocarbon ring, or a saturated or unsaturated hetero ring, provided that Y⁴, the hydrocarbon ring and the hetero ring may have a substituent; Y¹, Y², Y³, Y⁴, Y⁵, Y⁷ and Y⁸ each independently represent a single bond, —O—, —CO—, —O—CO—, —CO—O— or —O—CO—O—; P represents a hydrogen atom or an alkyl group having from 1 to 15 carbon atoms, and wherein the fluorine-containing horizontal alignment agent is a compound represented by the following general formula (I):

$(Hb^{11}-Sp^{11}-L^{11}-Sp^{12}-L^{12})_{m11}-A^{11}-L^{13}-T^{11}-L^{14}-A^{12}-(L^{15}-Sp^{13}-L^{16}-Sp^{14}-Hb^{11})_{n11}$    General Formula (I)

wherein L¹¹, L¹², L¹³, L¹⁴, L¹⁵ and L¹⁶ each independently represent a single bond, —O—, —S—, —CO—, —COO—, —OCO—, —COS—, —SCO—, —NRCO—, or —CONR—; R represents a hydrogen atom or an alkyl group having from 1 to 6 carbon atoms; Sp¹¹, Sp¹², Sp¹³ and Sp¹⁴ each independently represent a single bond or an alkylene group having from 1 to 10 carbon atoms; A¹¹ and A¹² each represent a trivalent or tetravalent aromatic hydrocarbon; Hb¹¹ represents a perfluoroalkyl group having from 2 to 30 carbon atoms; m11 and n11 each independently indicate from 0 to 3, and m11+n11≥1; T¹¹ represents a divalent group represented by any of the following or represents a divalent aromatic heterocyclic group:

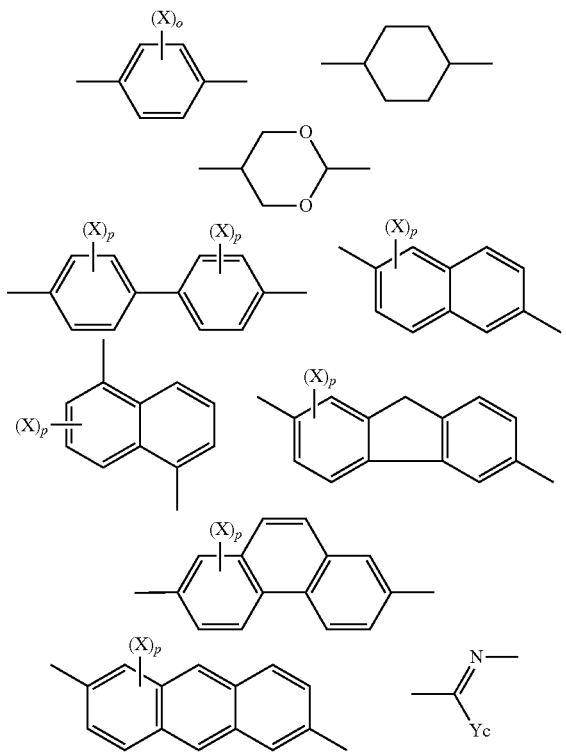

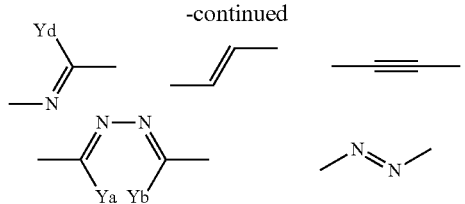

wherein X represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms; and o and p contained in T¹¹ each independently indicate an integer of 0 or more.

11. The selective reflector according to claim 10, containing a λ/2 plate.

12. The selective reflector according to claim 10, having a highly-adhesive layer as the outermost layer.

13. A laminate which is formed by the use of a selective reflector and which has at least a liquid-crystal layer formed by fixing a cholesteric liquid-crystal phase of the selective reflector, wherein the selective reflector comprises a film comprising a support and, as formed on the support, a liquid-crystal layer in which a cholesteric liquid-crystal phase formed by polymerizing a cholesteric liquid-crystal mixture is fixed, wherein the cholesteric liquid-crystal mixture contains a compound represented by the following general formula (Ia), a compound represented by the following general formula (Ib), a fluorine-containing horizontal alignment agent and a polymerization initiator:

$Z^1-Y^1-A^1-Y^3-M^1-Y^4-A^2-Y^2-Z^2$    General Formula (Ia)

$Z^3-Y^5-A^3-Y^7-M^2-P$    General Formula (Ib)

wherein, in the general formulae (Ia) and (Ib), Z¹, Z² and Z³ each independently represent a polymerizable group; A¹, A² and A³ each independently represent a spacer having an atom-bonding chain length of from 1 to 30, provided that the spacer represents an alkylene group, or a linking group of multiple alkylene groups bonding to each other via —O— or —CO—; M¹ and M² each independently represent $(-T^1-Y^8)_n-T^2-$; n indicates a natural number; when n is 2 or more, then multiple $(-T^1-Y^8)$'s may be the same or different; T¹ and T² each independently represent a saturated or unsaturated hydrocarbon ring, or a saturated or unsaturated hetero ring, provided that the hydrocarbon ring and the hetero ring may have a substituent; Y¹, Y², Y³, Y⁴, Y⁵, Y⁷ and Y⁸ each independently represent a single bond, —O—, —CO—, —O—CO—, —CO—O— or —O—CO—O—; P represents a hydrogen atom or an alkyl group having from 1 to 15 carbon atoms, and wherein the fluorine-containing horizontal alignment agent is a compound represented by the following general formula (I):

$(Hb^{11}-Sp^{11}-L^{11}-Sp^{12}-L^{12})_{m11}-A^{11}-L^{13}-T^{11}-L^{14}-A^{12}-(L^{15}-Sp^{13}-L^{16}-Sp^{14}-Hb^{11})_{n11}$    General Formula (I)

wherein L¹¹, L¹², L¹³, L¹⁴, L¹⁵ and L¹⁶ each independently represent a single bond, —O—, —S—, —CO—, —COO—, —OCO—, —COS—, —SCO—, —NRCO—, or —CONR—; R represents a hydrogen atom or an alkyl group having from 1 to 6 carbon atoms; Sp¹¹, Sp¹², Sp¹³ and Sp¹⁴ each independently represent a single bond or an alkylene group having from 1 to 10 carbon atoms; A¹¹ and A¹² each represent a trivalent or tetravalent aromatic hydrocarbon;

$Hb^{11}$ represents a perfluoroalkyl group having from 2 to 30 carbon atoms; m11 and n11 each independently indicate from 0 to 3, and m11+n11≥1; $T^{11}$ represents a divalent group represented by any of the following or represents a divalent aromatic heterocyclic group:

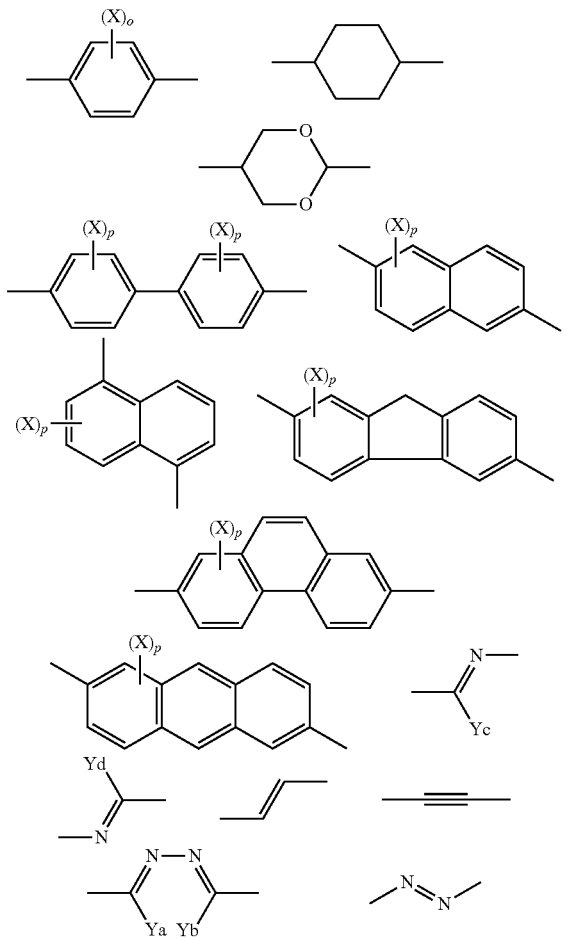

wherein X represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms; and o and p contained in $T^{11}$ each independently indicate an integer of 0 or more.

14. A laminated glass comprising a laminate and at least two glass sheets, wherein:
the laminate is sandwiched between the two glass sheets, the laminate is formed by the use of a selective reflector and has at least a liquid-crystal layer formed by fixing a cholesteric liquid-crystal phase of the selective reflector, and
the selective reflector comprises a film comprising a support and, as formed on the support, a liquid-crystal layer in which a cholesteric liquid-crystal phase formed by polymerizing a cholesteric liquid-crystal mixture is fixed, wherein the cholesteric liquid-crystal mixture contains a compound represented by the following general formula (Ia), a compound represented by the following general formula (Ib), a fluorine-containing horizontal alignment agent and a polymerization initiator:

$Z^1—Y^1-A^1-Y^3-M^1-Y^4-A^2-Y^2—Z^2$   General Formula (Ia)

$Z^3—Y^5-A^3-Y^7-M^2-P$   General Formula (Ib)

wherein, in the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of from 1 to 30, provided that the spacer represents an alkylene group, or a linking group of multiple alkylene groups bonding to each other via —O— or —CO—; $M^1$ and $M^2$ each independently represent $(-T^1-Y^8)_n-T^2-$; n indicates a natural number; when n is 2 or more, then multiple $(-T^1-Y^8)$'s may be the same or different; $T^1$ and $T^2$ each independently represent a saturated or unsaturated hydrocarbon ring, or a saturated or unsaturated hetero ring, provided that the hydrocarbon ring and the hetero ring may have a substituent; $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—; P represents a hydrogen atom or an alkyl group having from 1 to 15 carbon atoms, and
wherein the fluorine-containing horizontal alignment agent is a compound represented by the following general formula (I):

$(Hb^{11}-Sp^{11}-L^{11}-Sp^{12}-L^{12})_{m11}-A^{11}-L^{13}-T^{11}-L^{14}-A^{12}-$
$(L^{15}-Sp^{13}-L^{16}-Sp^{14}-Hb^{11})_{n11}$   General Formula (I)

wherein $L^{11}$, $L^{12}$, $L^{13}$, $L^{14}$, $L^{15}$ and $L^{16}$ each independently represent a single bond, —O—, —S—, —CO—, —COO—, —OCO—, —COS—, —SCO—, —NRCO—, or —CONR—; R represents a hydrogen atom or an alkyl group having from 1 to 6 carbon atoms; $Sp^{11}$, $Sp^{12}$, $Sp^{13}$ and $Sp^{14}$ each independently represent a single bond or an alkylene group having from 1 to 10 carbon atoms; $A^{11}$ and $A^{12}$ each represent a trivalent or tetravalent aromatic hydrocarbon; $Hb^{11}$ represents a perfluoroalkyl group having from 2 to 30 carbon atoms; m11 and n11 each independently indicate from 0 to 3, and m11+n11≥1; $T^{11}$ represents a divalent group represented by any of the following or represents a divalent aromatic heterocyclic group:

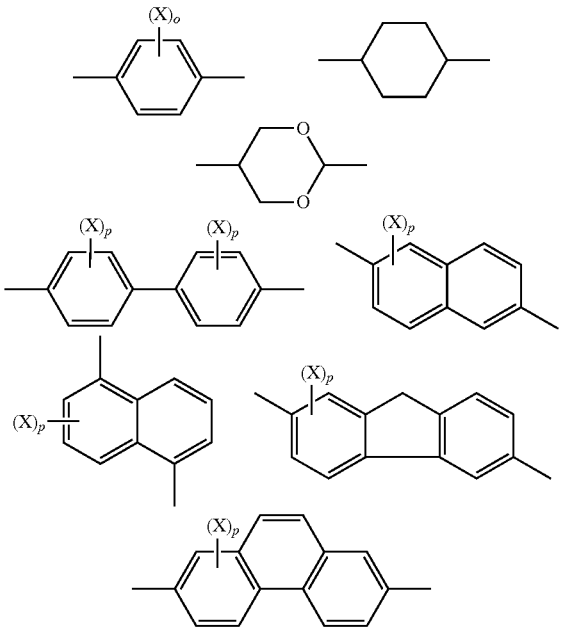

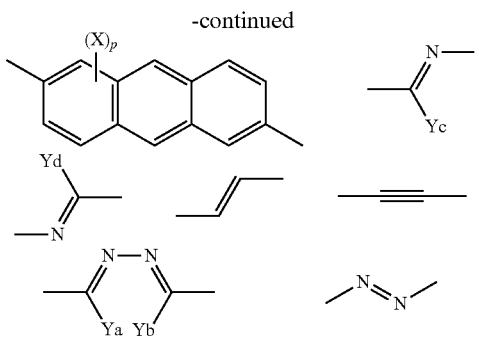

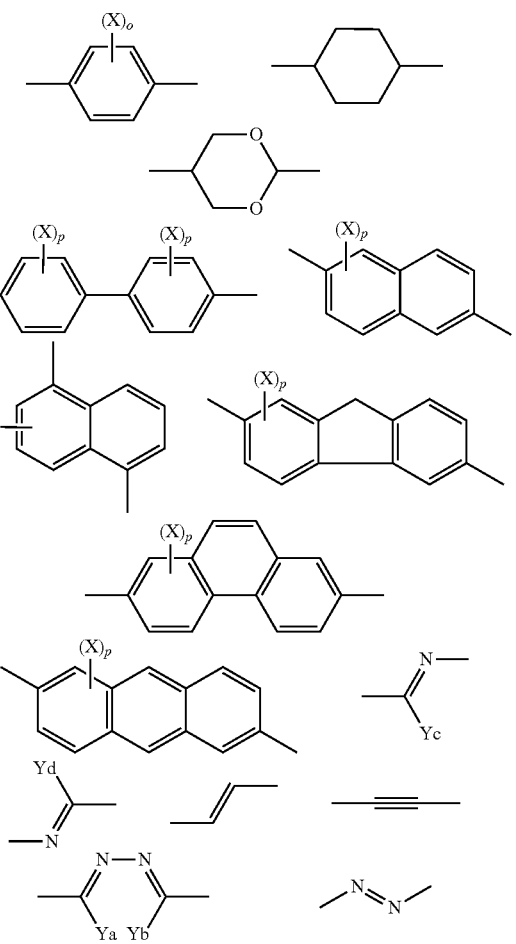

wherein X represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms; and o and p contained in $T^{11}$ each independently indicate an integer of 0 or more.

15. A windshield for automobiles, comprising a laminate glass comprising a laminate and at least two glass sheets, wherein:
the laminate is sandwiched between the two glass sheets, the laminate is formed by the use of a selective reflector and has at least a liquid-crystal layer formed by fixing a cholesteric liquid-crystal phase of the selective reflector, and
the selective reflector comprises a film comprising a support and, as formed on the support, a liquid-crystal layer in which a cholesteric liquid-crystal phase formed by polymerizing a cholesteric liquid-crystal mixture is fixed, wherein the cholesteric liquid-crystal mixture contains a compound represented by the following general formula (Ia), a compound represented by the following general formula (Ib), a fluorine-containing horizontal alignment agent and a polymerization initiator:

$$Z^1-Y^1-A^1-Y^3-M^1-Y^4-A^2-Y^2-Z^2 \qquad \text{General Formula (Ia)}$$

$$Z^3-Y^5-A^3-Y^7-M^2-P \qquad \text{General Formula (Ib)}$$

wherein, in the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of from 1 to 30, provided that the spacer represents an alkylene group, or a linking group of multiple alkylene groups bonding to each other via —O— or —CO—; $M^1$ and $M^2$ each independently represent $(-T^1-Y^8)_n-T^2-$; n indicates a natural number; when n is 2 or more, then multiple $(-T^1-Y^8)$'s may be the same or different; $T^1$ and $T^2$ each independently represent a saturated or unsaturated hydrocarbon ring, or a saturated or unsaturated hetero ring, provided that the hydrocarbon ring and the hetero ring may have a substituent; $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—; P represents a hydrogen atom or an alkyl group having from 1 to 15 carbon atoms, and
wherein the fluorine-containing horizontal alignment agent is a compound represented by the following general formula (I):

$$(Hb^{11}\text{-}Sp^{11}\text{-}L^{11}\text{-}Sp^{12}\text{-}L^{12})_{m11}\text{-}A^{11}\text{-}L^{13}\text{-}T^{11}\text{-}L^{14}\text{-}A^{12}\text{-} \\ (L^{15}\text{-}Sp^{13}\text{-}L^{16}\text{-}Sp^{14}\text{-}Hb^{11})_{n11} \qquad \text{General Formula (I)}$$

wherein $L^{11}$, $L^{12}$, $L^{13}$, $L^{14}$, $L^{15}$ and $L^{16}$ each independently represent a single bond, —O—, —S—, —CO—, —COO—, —OCO—, —COS—, —SCO—, —NRCO—, or —CONR—; R represents a hydrogen atom or an alkyl group having from 1 to 6 carbon atoms; $Sp^{11}$, $Sp^{12}$, $Sp^{13}$ and $Sp^{14}$ each independently represent a single bond or an alkylene group having from 1 to 10 carbon atoms; $A^{11}$ and $A^{12}$ each represent a trivalent or tetravalent aromatic hydrocarbon; $Hb^{11}$ represents a perfluoroalkyl group having from 2 to 30 carbon atoms; m11 and n11 each independently indicate from 0 to 3, and
m11+n11≥1; $T^{11}$ represents a divalent group represented by any of the following or represents a divalent aromatic heterocyclic group:

wherein X represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms; and o and p contained in $T^{11}$ each independently indicate an integer of 0 or more.

16. Glass for building materials, comprising a laminate glass comprising a laminate and at least two glass sheets, wherein:
the laminate is sandwiched between the two glass sheets, the laminate is formed by the use of a selective reflector and has at least a liquid-crystal layer formed by fixing a cholesteric liquid-crystal phase of the selective reflector, and
the selective reflector comprises a film comprising a support and, as formed on the support, a liquid-crystal layer in which a cholesteric liquid-crystal phase formed by polymerizing a cholesteric liquid-crystal mixture is fixed, wherein the cholesteric liquid-crystal mixture contains a compound represented by the following general formula (Ia), a compound represented by the following general formula (Ib), a fluorine-containing horizontal alignment agent and a polymerization initiator:

$Z^1—Y^1-A^1-Y^3-M^1-Y^4-A^2-Y^2—Z^2$  General Formula (Ia)

$Z^3—Y^5-A^3-Y^7-M^2-P$  General Formula (Ib)

wherein, in the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of from 1 to 30, provided that the spacer represents an alkylene group, or a linking group of multiple alkylene groups bonding to each other via —O— or —CO—; $M^1$ and $M^2$ each independently represent $(-T^1-Y^8)_n-T^2-$; n indicates a natural number; when n is 2 or more, then multiple $(-T^1-Y^8)$'s may be the same or different; $T^1$ and $T^2$ each independently represent a saturated or unsaturated hydrocarbon ring, or a saturated or unsaturated hetero ring, provided that the hydrocarbon ring and the hetero ring may have a substituent; $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—; P represents a hydrogen atom or an alkyl group having from 1 to 15 carbon atoms, and wherein the fluorine-containing horizontal alignment agent is a compound represented by the following general formula (I):

$(Hb^{11}-Sp^{11}-L^{11}-Sp^{12}-L^{12})_{m11}-A^{11}-L^{13}-T^{11}-L^{14}-A^{12}-(L^{15}-Sp^{13}-L^{16}-Sp^{14}-Hb^{11})_{n11}$  General Formula (I)

wherein $L^{11}$, $L^{12}$, $L^{13}$, $L^{14}$, $L^{15}$ and $L^{16}$ each independently represent a single bond, —O—, —S—, —CO—, —COO—, —OCO—, —COS—, —SCO—, —NRCO—, or —CONR—; R represents a hydrogen atom or an alkyl group having from 1 to 6 carbon atoms; $Sp^{11}$, $Sp^{12}$, $Sp^{13}$ and $Sp^{14}$ each independently represent a single bond or an alkylene group having from 1 to 10 carbon atoms; $A^{11}$ and $A^{12}$ each represent a trivalent or tetravalent aromatic hydrocarbon; $Hb^{11}$ represents a perfluoroalkyl group having from 2 to 30 carbon atoms; m11 and n11 each independently indicate from 0 to 3, and m11+n11≥1; $T^{11}$ represents a divalent group represented by any of the following or represents a divalent aromatic heterocyclic group:

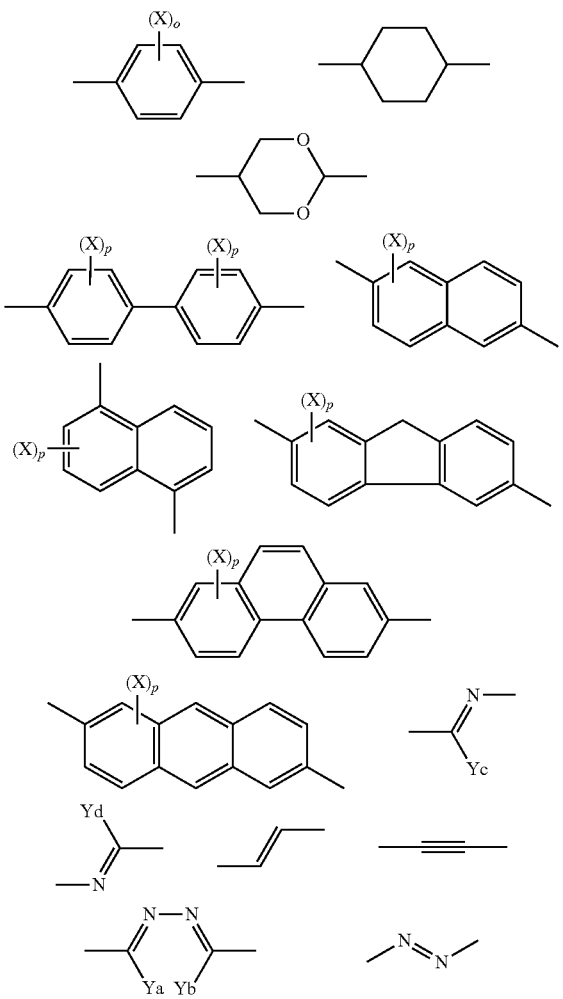

wherein X represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms; and o and p contained in $T^{11}$ each independently indicate an integer of 0 or more.

* * * * *